United States Patent [19]
Shimura et al.

[11] Patent Number: 5,850,465
[45] Date of Patent: Dec. 15, 1998

[54] ABNORMNAL PATTERN DETECTING OR JUDGING APPARATUS, CIRCULAR PATTERN JUDGING APPARATUS, AND IMAGE FINDING APPARATUS

[75] Inventors: Kazuo Shimura; Yuuma Adachi; Shoji Hara; Nobuyoshi Nakajima; Wataru Ito, all of Kanagawa-ken, Japan

[73] Assignee: Fuji Photo Film Co., Ltd., Kanagawa, Japan

[21] Appl. No.: 751,449

[22] Filed: Aug. 28, 1991

Related U.S. Application Data

[63] Continuation-in-part of Ser. No. 543,530, Jun. 26, 1990, abandoned.

[30] Foreign Application Priority Data

| Jun. 26, 1989 | [JP] | Japan | 64-162901 |
| Jun. 26, 1989 | [JP] | Japan | 64-162902 |
| Jun. 26, 1989 | [JP] | Japan | 62-162903 |
| Jun. 26, 1989 | [JP] | Japan | 64-162906 |
| Jun. 26, 1989 | [JP] | Japan | 62-162907 |
| Jun. 26, 1989 | [JP] | Japan | 64-162908 |
| Sep. 26, 1989 | [JP] | Japan | 64-230849 |
| Mar. 26, 1990 | [JP] | Japan | 2-75879 |

[51] Int. Cl.⁶ .................................................. G06F 159/00
[52] U.S. Cl. .................................. 382/132; 128/920
[58] Field of Search ................ 364/413.01, 413.02, 364/413.03; 382/6, 130, 132; 395/21, 23, 924; 128/922

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,618,989 | 10/1986 | Tsukune et al. | 382/25 |
| 4,710,875 | 12/1987 | Nakajima et al. | 364/413.23 |
| 4,736,448 | 4/1988 | Umemura | 382/54 |
| 4,790,023 | 12/1988 | Matsui et al. | 382/8 |
| 4,833,625 | 5/1989 | Fisher et al. | 364/413.13 |
| 4,839,807 | 6/1989 | Doi et al. | 364/413.13 |
| 4,851,984 | 7/1989 | Doi et al. | 364/413.23 |
| 4,907,156 | 3/1990 | Doi et al. | 364/413.13 |
| 4,965,725 | 10/1990 | Rutenberg | 364/413.1 |
| 5,033,100 | 7/1991 | Hara et al. | 382/25 |
| 5,123,054 | 6/1992 | Hara et al. | 382/6 |
| 5,133,020 | 7/1992 | Giger et al. | 382/6 |

FOREIGN PATENT DOCUMENTS

| A0225151 | 6/1981 | European Pat. Off. . |
| 0225151 | 6/1987 | European Pat. Off. . |
| 0269302 | 6/1988 | European Pat. Off. . |
| A269302 | 6/1988 | European Pat. Off. . |
| 0311368 | 4/1989 | European Pat. Off. . |
| 56-11395 | 2/1981 | Japan . |
| 61-5193 | 2/1986 | Japan . |

OTHER PUBLICATIONS

"Back–propegation" (Nideki Aso, Eomputrol, No. 24, pp. 53–60).
"Neutral Computer" (Kazuyuki Aihara, the publishing bureau of Tokyo Denki University).

(List continued on next page.)

*Primary Examiner*—Donald E. McElheny, Jr.
*Attorney, Agent, or Firm*—Sughrue, Mion, Zinn, Macpeak & Seas, PLLC

[57] ABSTRACT

An abnormal pattern detecting apparatus comprises a device for finding prospective abnormal patterns in a radiation image of an object from an image signal representing the radiation image, and a device for finding anatomical information about the object from the image signal. From the image signal components of the image signal, which represent the image information at positions in the vicinity of each prospective abnormal pattern, a characteristic measure calculating device calculates a plurality of characteristic measures for each prospective abnormal pattern. An abnormal pattern finding device utilizes the characteristic measures and the anatomical information in order to find a true abnormal pattern from the prospective abnormal patterns.

65 Claims, 18 Drawing Sheets

OTHER PUBLICATIONS

"Discrimination of Rib Images In X–ray Fluorographic Image of the Chest" (the Institute of Electronics and Communication Engineers of Japan, Oct. 26, 1972, material No. IT72–24 (a972–10).

*IEEE Cat. No. 88CH2632–8*, Egber et al., "Preprocessing of Biomedical Images . . . ", vol 1., 1988, pp. 561–568.

Conference Title: radiological Society of North America 73rd Scientific Assembly, Chicago IL, 29 Nov. 1987, Oldham, "Neural Network Recognition of . . . ", p. 318 (abstract only provided).

Automatic Threshold Value Selecting Process Based on Discrimination and Least Square Standards, (Nobuyuki Otsu, collected papers of The Institute of Electronics and Communications Engineers of Japan, 63–D–4, pp. 349–356, 1980).

Hashimoto et al., "Detecting the Edges of Lung Tumors by Classification Techniques," Proc. of The 6th International Conference On Pattern Recognition, Oct. 1982, pp. 276–279.

Lei et al., "A New Method for Computer Recognition of Small Rounded Pneumoconoisis Opacities in Chest X–Rays," Eight International Conference On Pattern Recognition, Oct. 1986, pp. 473–477.

Davies et al., "Radial Histograms as an Aid in the Inspection of Circular Objects," IEE Proceedings D. Control Theory & Applications, Jul. 1985, vol. 132, No. 4, pp. 158–163.

Khotanzad et al., "Distortion Invariant Character Recognition by a Multi–Layer Perceptron and Back–Propagation Learning," IEEE International Conference on Neural Networks, Jul. 1988, pp. I–625–I–632.

Kruger et al., "Dual Energy Film Substraction Technique for Detecting Calcification in Solitary Pulmonary Nodules," Radiology, Jul. 1981, vol. 140, pp. 213–219.

IEE Proceedings D. Control theory & Applications Stevenage GB, vol. 143, No. 4 Jul. 1985 pp. 158–163, E.R. Davies et al., 'Radial histograms s and aid in the inspection of circular objects'.

Radiology, vol. 140. Jul. 1981 pp. 213–219, R.A. Kruger et al, 'Dual Energy Film Substraction Technique for Detecting Calcification in Solitary Pulmonary Nodules'p. 218, right column, line 45—p. 219, left column, line 3 fig. 10.

9th International Conference On Pattern Recognition, vol. 1, 14 Nov. 1988, Rome, IT, pp. 462–464, XP 000094168 X. Chen, J. Hasewaga & J. Toriwaki 'Quantitative Diagnosis of Pneumoconiosis Based On Recognition Of Small Rounded Opacities In Chest X–Ray Images'.

6th International Conference On Pattern Recognition, 19–22 Oct. 1982, Muchen, DE, pp. 276–279, M. Hashimoto et al, 'Detecting the edges of Lung tumors by classification techniques'.

8th International Conference On Pattern Recognition, 27–31 Oct. 1986, Paris, FR, pp.475–477, G. Lei et al 'A new method for computer recognition of small rounded pneumoconiosis opacities in the chest x–rays'.

Learning internal representations by error propagation: Parallel Distributed Processing chapter 8 (E.E. Rumelhart, G.E. Hinton and R. J. Williams, vol. 1, J.L. McClell and D.E. Rumelhart and the PDP Research Group, MIT Press, (1986(b)0), pp. 319–362.

"Further Experiments of the Software System AISCR–V3 for computer Aided Screening of Chest Photofluorograms", Hasegawa et al., 6th Intl. Conf. on Pattern Recognition, 19 Oct. 1982, pp. 273–275.

"A Comparision of a Nearest Neighbor Classified and Neural Network for Numeric Handprint Character Recognition", Weidman et al., Intl. Jt. Conf. on Neural Networks, 19 Jun 1989, pp. I–117—FI–120.

"Quantitative Diagnosis of Pneumoconiosis Based on Recognition of Small Rounded Opacities in Chest X–Ray Images", Chen et al., 9th Intl. Conf. on Pattern Recognition, vol. 1, 14 Nov. 1988, pp. 462–464.

"Learning representations by back–propagating errors" (D.E. Rumelhart. G.E. Hinton and R.J. Williams, Nature, 323–9, 533–556, 1986a);.

1ST LAYER (INPUT LAYER)    2ND LAYER (HIDDEN LAYER)    3RD LAYER (OUTPUT LAYER)

F I G. 27
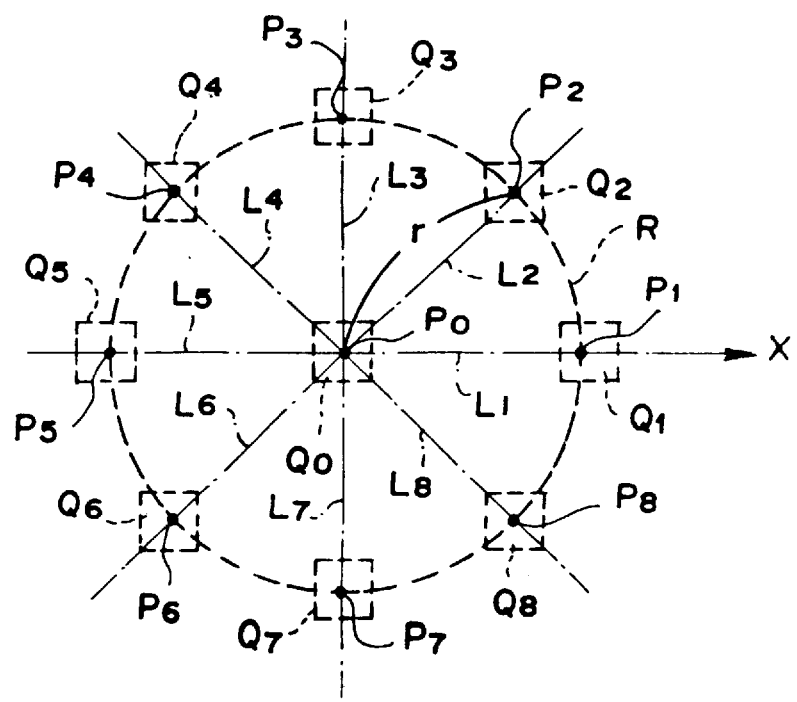

F I G. 30
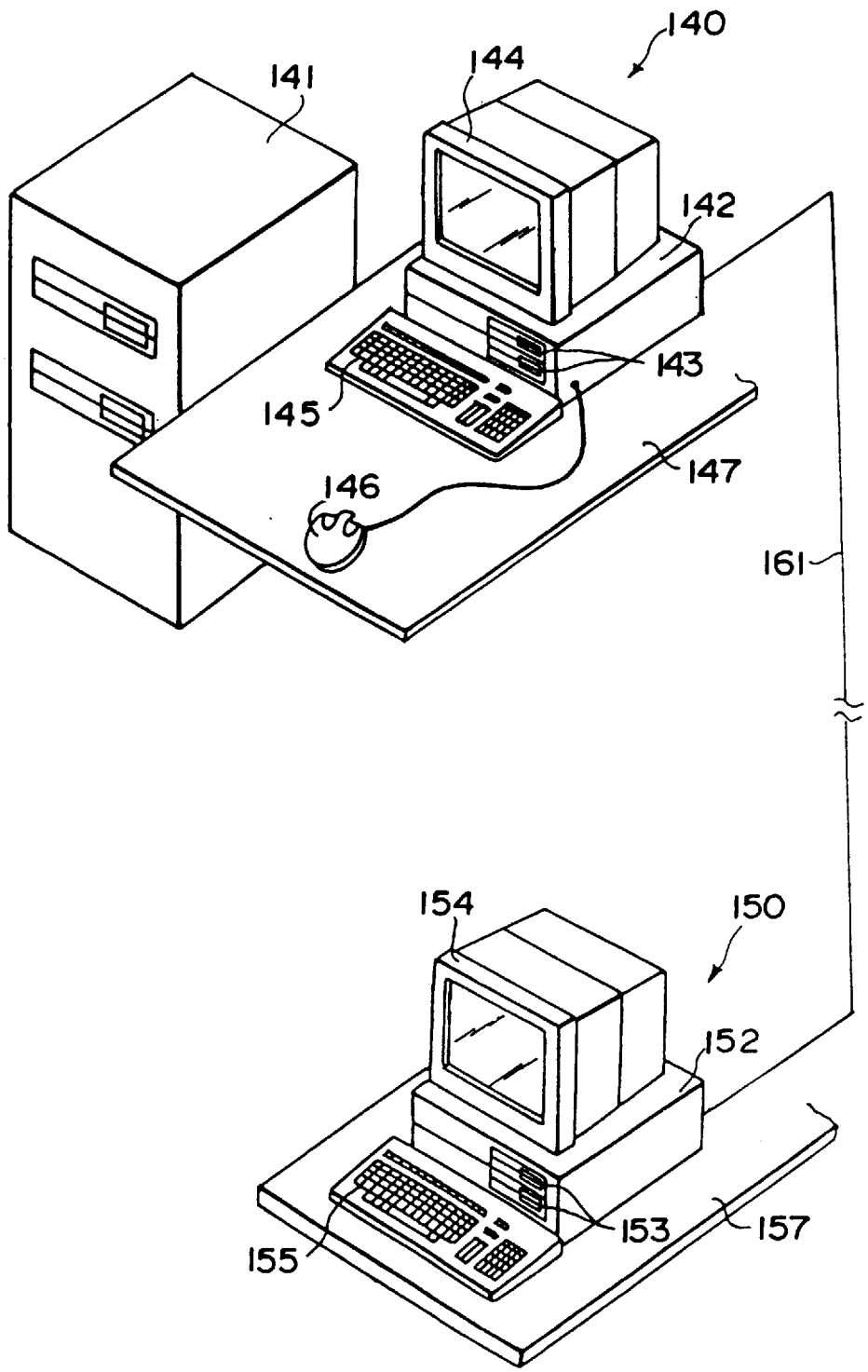

ABNORMNAL PATTERN DETECTING OR JUDGING APPARATUS, CIRCULAR PATTERN JUDGING APPARATUS, AND IMAGE FINDING APPARATUS

This is a continuation-in-part application of U.S. patent application Ser. No. 07/543,530 filed Jun. 26, 1990 now abandoned.

BACKGROUND OF THE INVENTION

1. Field of the Invention

This invention relates to an abnormal pattern detecting apparatus wherein an abnormal pattern in a radiation image of an object is detected from an image signal made up of a series of image signal components representing the radiation image. This invention also relates to an abnormal pattern judging apparatus wherein, from an image signal made up of a series of image signal components representing a radiation image of an object, a judgment is made as to whether a prospective abnormal pattern designated in the radiation image is or is not a true abnormal pattern. This invention further relates to a circular pattern judging method wherein a judgment is made as to the level of the probability that a predetermined region in a radiation image will fall within the region corresponding to a circular pattern in the radiation image, and an apparatus for carrying out the circular pattern judging method. This invention still further relates to an image finding apparatus wherein an image representing a tumor in a human body, which tumor image is present in a radiation image of the human body, is found from an image signal made up of a series of image signal components representing the radiation image. This invention also relates to an image display apparatus wherein an image signal is transmitted between a plurality of image display means, and images are simultaneously displayed with the plurality of the image display means.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT.

Recently, in the radiation image recording and reproducing systems which use X-ray film or stimulable phosphor sheets, particularly in such radiation image recording and reproducing systems designed to facilitate medical diagnoses, not only have image signals been processed in ways which ensure that the visible images produced from them will be of high quality, but image signals have also been processed in ways which allow certain image patterns to be extracted from radiation images. One type of processing which results in extraction of an image pattern is disclosed in, for example, U.S. Pat. No. 4,769,850.

Specifically, an image pattern can be detected in a complicated radiation image by processing the image signal representing it in various ways. The image signal is made up of a series of image signal components, and with appropriate processing the image signal components corresponding to a particular image pattern can be found. For example, from a very complicated radiation image, such as an X-ray image of the chest of a human body, which includes various linear and circular patterns, an image corresponding to a tumor, or the like, can be detected.

After a pattern, for example, a tumor image, is detected in a complicated radiation image, such as an X-ray image of the chest of a human body, a visible image is reproduced and displayed such that the detected pattern can be viewed clearly. Such a visible image can serve as an effective tool in, particularly, the efficient and accurate diagnosis of an illness.

U.S. Pat. No. 4,769,850 discloses an apparatus wherein an image signal representing an X-ray image of the chest of a human body, or the like, is processed with a specific filter, which does not change with positions in the X-ray image, and a circular pattern and a linear pattern are thereby detected. The detected circular pattern is displayed as a prospective tumor image, and the detected linear pattern is displayed as a blood vessel image.

However, radiation images of human bodies have very complicated configurations. For example, a tumor image appearing in close proximity to a rib image and a tumor image appearing at an intermediate position between two rib images in an X-ray image of the chest of a human body will have different patterns. Therefore, with the aforesaid conventional apparatus having a simple configuration, the problem occurs in that all of tumor images, which are present in an X-ray image, cannot be found accurately. Also, the problem occurs in that a pattern, which does not actually correspond to a tumor image, is found by mistake as a tumor image. After an image pattern is detected and a visible image showing the detected image pattern is reproduced in, for example, a radiation image recording and reproducing system designed to facilitate medical diagnoses, a physician will base his diagnosis primarily on how the detected pattern looks. If a certain pattern (a certain tumor image) is not detected accurately, a physician may fail to find a tumor. This is a very serious problem in making diagnoses.

In order for the aforesaid problem to be eliminated, the filter, which is used to process an image signal representing a radiation image, or the like, may be designed such that all of patterns, which are at least considered as being prospective tumor images, can be detected. However, if all of patterns, which are at least considered as being prospective tumor images, are detected, patterns (noise) which do not actually correspond to tumor images will also be detected as tumor images. Therefore, the reliability of the automatic image finding systems becomes bad, and the efficiency of diagnoses cannot be kept high.

Heretofore, in cases where no system for automatically finding the images is available, physicians, who make diagnoses from X-ray images of the chests of human bodies, which images are recorded on, for example, sheets of X-ray film, have considerably accurately detected tumor images, from their knowledge and experience, even when the tumor images are present at various positions in an X-ray image and have slightly deformed patterns.

Therefore, in the systems for automatically finding the images, patterns which do not actually correspond to tumor images, or the like, should be eliminated as much as possible from the patterns which have been found at least as being prospective tumor images, or the like. For this purpose, a higher level of processing than the filtering processing of an image signal representing a radiation image should be carried out.

SUMMARY OF THE INVENTION

The primary object of the present invention is to provide an abnormal pattern detecting apparatus wherein a pattern representing an abnormality, such as a tumor, in a radiation image is detected accurately from an image signal representing the radiation image.

Another object of the present invention is to provide an abnormal pattern judging apparatus wherein a judgment is made accurately as to whether a prospective abnormal pattern, such as a prospective tumor image, which has been designated in a radiation image on the basis of, for example, the results of the processing with a spatial-domain filter, is or is not a true abnormal pattern.

A further object of the present invention is to provide an abnormal pattern detecting apparatus wherein a pattern representing an abnormality, such as a tumor, in a radiation image is detected accurately from an image signal representing the radiation image, and the accuracy with which an abnormal pattern is detected is improved during the operation of the apparatus.

A still further object of the present invention is to provide a circular pattern judging method wherein a judgment is made as to whether a predetermined region, which has been designated in a radiation image, falls or does not fall in a region composed of a group of linear patterns, such as blood vessel images, and a judgment is thereby made accurately as to the level of the probability that the predetermined region will fall within the region corresponding to a circular pattern in the radiation image, and an apparatus for carrying out the circular pattern judging method.

Another object of the present invention is to provide an abnormal pattern detecting apparatus wherein an abnormal pattern is detected accurately from a radiation image representing a soft tissue.

A further object of the present invention is to provide an image finding apparatus wherein a tumor image in a radiation image of a human body, is found accurately.

A still further object of the present invention is to provide an image display apparatus wherein transmission and reception of signals between a plurality of image display means are carried out efficiently when images comprising a stationary image and images of marks, characters, or the like, superposed on the stationary image, such that the images of marks, characters, or the like, can be moved or altered, are displayed with a plurality of the image display means, or when enlarged images of a specific part are displayed with a plurality of the image display means.

FIG. 1 is a block diagram showing the configuration of the first abnormal pattern detecting apparatus in accordance with the present invention.

With reference to FIG. 1, an image signal S1, which is made up of a series of image signal components representing a radiation image of an object, is fed into a prospective abnormal pattern finding means 1 and an information operating means 2.

The prospective abnormal pattern finding means 1 carries out comparatively simple processing, for example, spatial-domain filtering processing, on the image signal S1 and finds prospective abnormal patterns C, C, . . . in the radiation image.

The term "abnormal pattern" as used herein for the first abnormal pattern detecting apparatus in accordance with the present invention means a pattern of an abnormality in the object, for example, an image of a tumor, a calcified part, a fattened and thickened pleura, or a pneumothorax. The prospective abnormal pattern finding means 1 need not necessarily find all types of abnormal patterns, but may find only the tumor images as the abnormal patterns.

If some prospective abnormal patterns are not found in the prospective abnormal pattern finding means 1, they will be left undetected ultimately. Therefore, in the prospective abnormal pattern finding means 1, a method should preferably be employed with which all of true abnormal patterns can be found. Specifically, slight noise (for example, prospective abnormal patterns which are not the object of detection, e.g. which are not actually the tumor images, or prospective abnormal patterns which do not actually represent abnormalities of the object) may be included in the found prospective abnormal patterns.

The information operating means 2 finds anatomical information D about the object from the image signal S1.

The term "anatomical information" as used herein for the first abnormal pattern detecting apparatus in accordance with the present invention means the information about the images of structures of the object, which images appear in the radiation image. Specifically, the term "anatomical information" as used herein means the information about the positions of images of the lung fields, the hilum of the lung, a rib, the heart, the diaphragm, or the like in an X-ray image of the chest. Of course, the information operating means 2 need not necessarily discriminate all of the images of the structures of the object, which images appear in the radiation image, but may find only the necessary anatomical information in accordance with the type of the abnormal patterns which are to be found. For example, in cases where a pattern representing an abnormality in the lungs is to be detected, the information operating means 2 may find only the anatomical information about the images of the lung fields and the hilum of the lung.

The information about the prospective abnormal patterns C, C, . . . , which have been found by the prospective abnormal pattern finding means 1, is fed into a characteristic measure calculating means 3 together with the image signal S1. From the image signal components of the image signal S1, which represent the image information at positions in the vicinity of each of the prospective abnormal patterns C, C, . . . , the characteristic measure calculating means 3 calculates a plurality of characteristic measures F1, F2, . . . , Fn for each of the prospective abnormal patterns C, C, . . .

The term "characteristic measure" as used herein for the first abnormal pattern detecting apparatus in accordance with the present invention means a measure which represents the level of the certainty that a prospective abnormal pattern C will be a true abnormal pattern. For example, the term "characteristic measure" as used herein for the first abnormal pattern detecting apparatus in accordance with the present invention means the area of a prospective abnormal pattern C, the extent of irregularity of the shape of a prospective abnormal pattern C, the mean value or the variance of the values of the image signal components representing a prospective abnormal pattern C, or the ratio of the mean value of the values of the image signal components representing a prospective abnormal pattern C to the mean value of the values of the image signal components representing the image information at positions surrounding the prospective abnormal pattern C (i.e. the contrast). No limitation is imposed on which characteristic measures the characteristic measure calculating means 3 should calculate and how many characteristic measures it should calculate. Which characteristic measures the characteristic measure calculating means 3 should calculate and how many characteristic measures it should calculate may be determined in accordance with the type of the abnormal patterns which are to be detected, the accuracy with which the abnormal patterns are to be detected, the time within which the operations are to be completed, or the like.

The information about a plurality of the characteristic measures F1, F2, . . . , Fn, which have been calculated by the characteristic measure calculating means 3, is fed into an abnormal pattern finding means 4. Also, the anatomical information D, which has been found by the information operating means 2, is fed into the abnormal pattern finding means 4. The abnormal pattern finding means 4 utilizes a plurality of the characteristic measures F1, F2, . . . , Fn and the anatomical information D in order to find a true abnormal pattern T from the prospective abnormal patterns C, C, . . . , which have been found by the prospective abnormal pattern finding means 1. In the first abnormal pattern detecting apparatus in accordance with the present invention, no limitation is imposed on how the true abnormal pattern T is found. By way of example, the following processes may be employed for this purpose:

1) A neural network is utilized which receives the information about a plurality of the characteristic measures F1, F2, . . . , Fn and which outputs a measure E representing the level of the probability that each of the prospective abnormal patterns C, C, . . . will be the true abnormal pattern.

2) By way of example, in an X-ray image of the chest, a tumor image appears more easily in regions corresponding to the lung fields than in the region corresponding to the hilum of the lung. Therefore, in cases where a tumor image in an X-ray image of the chest is to be found as an abnormal pattern, the information is utilized which has been obtained as the anatomical information D and which discriminates images of the lung fields and an image of the hilum of the lung from each other. Specifically, the measure E, which represents the level of the probability that each of the prospective abnormal patterns C, C, . . . will be the true abnormal pattern, is calculated and compared with a predetermined threshold value. Thereafter, from the results of the comparison, a judgment is made as to whether each of the prospective abnormal patterns C, C, . . . is or is not the true tumor image. The predetermined threshold value is changed in accordance with whether a prospective abnormal pattern C is located in the region corresponding to the image of the hilum of the lung or in the region corresponding to the images of the lung fields.

3) The information is utilized which has been obtained as the anatomical information D and which represents the positions of rib images. In cases where a prospective tumor image C is located at the intersection of two rib images, the prospective tumor image C is regarded as not being a true tumor image.

In the example described above, the information about a plurality of the characteristic measures F1, F2, . . . , Fn is utilized as the input to the neural network. Alternatively, the information about a plurality of the characteristic measures F1, F2, . . . , Fn may be utilized in a nearest neighbor process (NN process). As another alternative, the information about a plurality of the characteristic measures F1, F2, . . . , Fn may be utilized in a process with which each of the characteristic measures F1, F2, . . . , Fn is simply compared with a threshold value. As a further alternative, the information about a plurality of the characteristic measures F1, F2, . . . , Fn may be utilized in a process which is composed of a plurality of the processes described above, or the like. As a still further alternative, the information about a plurality of the characteristic measures F1, F2, . . . , Fn may be utilized together with the anatomical information D. For example, the anatomical information D may be fed into the neural network together with the information about a plurality of the characteristic measures F1, F2, . . . , Fn.

The information about the abnormal pattern T, which has ultimately been detected, is fed out of the first abnormal pattern detecting apparatus in accordance with the present invention. Thereafter, for example, specific image processing is carried out on the image signal components representing the abnormal pattern in the radiation image. Also, the image signal representing the radiation image is stored together with the information about the abnormal pattern. A visible image is then reproduced and displayed, in which the position of the abnormal pattern is shown clearly.

The functions of the first abnormal pattern detecting apparatus in accordance with the present invention need not necessarily be divided into the blocks 1 through 4 shown in FIG. 1. It is only necessary that the first abnormal pattern detecting apparatus in accordance with the present invention is substantially provided with the functions corresponding to the blocks 1 through 4 shown in FIG. 1. For example, in the first abnormal pattern detecting apparatus in accordance with the present invention, the spatial-domain filtering processing for finding the prospective abnormal patterns (i.e. the function of the prospective abnormal pattern finding means 1) and the process for finding the characteristic measures, such as the area and the shape of each prospective abnormal pattern (i.e. the function of the characteristic measure calculating means 3) may be carried out simultaneously.

With the first abnormal pattern detecting apparatus in accordance with the present invention, all of the prospective abnormal patterns are found regardless of whether noise is found together with them. On the basis of a plurality of the characteristic measures and the anatomical information, a true abnormal pattern is found from the prospective abnormal patterns. Therefore, all of the abnormal patterns, which are present in the radiation image, can be found reliably, and the problem does not occur in that a pattern, which is not actually an abnormal pattern, is detected as an abnormal pattern. Accordingly, true abnormal patterns can be detected accurately.

As described above, the abnormal pattern finding means 4 may be provided with the neural network, which receives the information about a plurality of the characteristic measures and which outputs a measure representing the level of the probability that each of the prospective abnormal patterns will be the true abnormal pattern. In such cases, the accuracy with which the abnormal patterns are detected can be improved even further by virtue of the learning function of the neural network.

The present invention also provides an abnormal pattern judging apparatus wherein, from an image signal made up of a series of image signal components representing a radiation image of an object, a judgment is made as to whether a prospective abnormal pattern designated in the radiation image is or is not a true abnormal pattern, the abnormal pattern judging apparatus comprising:
i) an operation means for calculating a plurality of characteristic measures from the image signal components of said image signal, which represent the image information at positions in the vicinity of said prospective abnormal pattern, and
ii) a neural network, which receives the information about the plurality of said characteristic measures and which outputs a measure representing the level of the probability that said prospective abnormal pattern will be the true abnormal pattern.

A plurality of the characteristic measures should preferably include at least one of the area, the shape, and the contrast of the prospective abnormal pattern.

The term "abnormal pattern" as used herein for the abnormal pattern judging apparatus in accordance with the present invention means a pattern of an abnormality in the object, for example, an image of a tumor, a calcified part, a fattened and thickened pleura, or a pneumothorax. The abnormal pattern judging apparatus in accordance with the present invention need not necessarily make judgments as to all types of abnormal patterns, but may make judgments as to only the tumor images.

No limitation is imposed on how the abnormal pattern is designated. For example, the abnormal pattern may be designated by processing the image signal, which represents the radiation image, with a spatial-domain filter. Alternatively, a person who observes the radiation image may manually designate the abnormal pattern.

The term "characteristic measure" as used herein for the abnormal pattern judging apparatus in accordance with the present invention means a measure which represents the level of the certainty that a prospective abnormal pattern, which has been designated, will be a true abnormal pattern. For example, the term "characteristic measure" as used herein for the abnormal pattern detecting apparatus in accordance with the present invention means the area of a prospective abnormal pattern, the extent of irregularity of the shape of a prospective abnormal pattern, the mean value or the variance of the values of the image signal components representing a prospective abnormal pattern, or the ratio of the mean value of the values of the image signal components representing a prospective abnormal pattern to the mean value of the values of the image signal components representing the image information at positions surrounding the prospective abnormal pattern (i.e. the contrast of the abnormal pattern with the surrounding image areas). No limitation is imposed on which characteristic measures the operation means should calculate and how many characteristic measures it should calculate. Which characteristic measures the operation means should calculate and how many characteristic measures it should calculate may be determined in accordance with the type of the abnormal pattern which is the object of the judgment, the accuracy with which the judgment is to be made as to whether the prospective abnormal pattern designated in the radiation image is or is not a true abnormal pattern, the time within which the operations are to be completed, or the like. As will be described later, the area, the shape, and the contrast of a prospective abnormal pattern represent the level of the certainty that the prospective abnormal pattern will be a true abnormal pattern. Therefore, as the input to the neural network, the information representing at least one of the area, the shape, and the contrast of a prospective abnormal pattern should preferably be employed.

The neural network utilizes the algorithms which model after the function of brains of the human.

With the abnormal pattern judging apparatus in accordance with the present invention, a plurality of characteristic measures F1, F2, . . . , Fn are calculated from the image signal components of the image signal, which represent the image information at positions in the vicinity of the designated prospective abnormal pattern. The information about a plurality of the characteristic measures is fed into the neural network. The neural network outputs a measure which represents the level of the probability that the prospective abnormal pattern will be the true abnormal pattern. In cases where the neural network is provided with the learning function by back propagation method, it can learn knowledge and experience, and therefore can accurately judge whether the prospective abnormal pattern is or is not a true abnormal pattern. The term "learning function by back propagation method" as used herein means the learning algorithms in a neural network, with which the output of the neural network is compared with a correct answer (an instructor signal), and the weight of connections (i.e. the weight of synapse connections) is corrected sequentially from the output side to the input side of the neural network. (Such functions are described in, for example, "Learning representations by back-propagating errors" by D. E. Rumelhart, G. E. Hinton and R. J. Williams, Nature, 323–9, 533–556, 1986a; "Back-propagation" by Hideki Aso, Computrol, No. 24, pp. 53–60; and "Neural Computer" by Kazuyuki Aihara, the publishing bureau of Tokyo Denki University.

Also, as described above, the area, the shape, and the contrast of a prospective abnormal pattern represent the level of the certainty that the prospective abnormal pattern will be a true abnormal pattern. Therefore, in cases where the characteristic measures include at least one of the area, the shape, and the contrast of a prospective abnormal pattern, the accuracy, with which the judgment is made as to whether the prospective abnormal pattern designated in the radiation image is or is not a true abnormal pattern, can be improved even further.

FIG. 14 is a block diagram showing the configuration of the second abnormal pattern detecting apparatus in accordance with the present invention.

With reference to FIG. 14, an image signal S1, which is made up of a series of image signal components representing a radiation image of an object, is fed into a first prospective abnormal pattern finding means 51.

The first prospective abnormal pattern finding means 51 carries out comparatively simple processing, for example, spatial-domain filtering processing, on the image signal S1 and finds prospective abnormal patterns C, C, . . . in the radiation image.

The term "abnormal pattern" as used herein for the second abnormal pattern detecting apparatus in accordance with the present invention means a pattern of an abnormality in the object, for example, an image of a tumor, a calcified part, a fattened and thickened pleura, or a pneumothorax. The first prospective abnormal pattern finding means 51 need not necessarily find all types of abnormal patterns, but may find only the tumor images as the abnormal patterns.

If some prospective abnormal patterns are not found in the first prospective abnormal pattern finding means 51, they will be left undetected ultimately. Therefore, in the first prospective abnormal pattern finding means 51, a method should preferably be employed with which all of true abnormal patterns can be found. Specifically, slight noise (for example, prospective abnormal patterns which are not the object of detection, e.g. which are not actually the tumor images, or prospective abnormal patterns which do not actually represent abnormalities of the object) may be included in the found prospective abnormal patterns.

The information about the prospective abnormal patterns C, C, . . . , which have been found by the first prospective abnormal pattern finding means 51, is fed into a characteristic measure calculating means 52 together with the image signal S1. From the image signal components of the image signal S1, which represent the image information at positions in the vicinity of each of the prospective abnormal patterns C, C, . . . , the characteristic measure calculating means 52 calculates a plurality of characteristic measures F1, F2, . . . , Fn for each of the prospective abnormal patterns C, C, . . .

The term "characteristic measure" as used herein for the second abnormal pattern detecting apparatus in accordance with the present invention means a measure which represents the level of the certainty that a prospective abnormal pattern C will be a true abnormal pattern. For example, the term "characteristic measure" as used herein for the second abnormal pattern detecting apparatus in accordance with the present invention means the area of a prospective abnormal pattern C, the extent of irregularity of the shape of a prospective abnormal pattern C, the mean value or the variance of the values of the image signal components representing a prospective abnormal pattern C, or the ratio of the mean value of the values of the image signal components representing a prospective abnormal pattern C to the mean value of the values of the image signal components representing the image information at positions surrounding the prospective abnormal pattern C (i.e. the contrast). No limitation is imposed on which characteristic measures the characteristic measure calculating means 52 should calculate and how many characteristic measures it should calculate. Which characteristic measures the characteristic measure calculating means 52 should calculate and how many characteristic measures it should calculate may be determined in accordance with the type of the abnormal patterns which are to be detected, the accuracy with which the abnormal patterns are to be detected, the time within which the operations are to be completed, or the like.

The information about a plurality of the characteristic measures F1, F2, . . . , Fn, which have been calculated by the characteristic measure calculating means 52, is fed into a second prospective abnormal pattern finding means 53. The second prospective abnormal pattern finding means 53 utilizes a plurality of the characteristic measures F1, F2, . . . , Fn in order to find a prospective abnormal pattern T, which has a high probability of being a true abnormal pattern, from the prospective abnormal patterns C, C, . . . , which have been found by the first prospective abnormal pattern finding means 51. (The prospective abnormal pattern T will hereinbelow be often referred to as the abnormal pattern T.) In the second abnormal pattern detecting apparatus in accordance with the present invention, no limitation is imposed on how the abnormal pattern T is found. For this purpose, by way of example, a neural network is utilized which receives the information about a plurality of the characteristic measures F1, F2, . . . , Fn and which outputs a measure E representing the level of the probability that each of the prospective abnormal patterns C, C, . . . will be the true abnormal pattern. From the measure E, a judgment is made as to whether each of the prospective abnormal patterns C, C, . . . is or is not an abnormal pattern T.

In the example described above, the information about a plurality of the characteristic measures F1, F2, . . . , Fn is utilized as the input to the neural network. Alternatively, the information about a plurality of the characteristic measures F1, F2, . . . , Fn may be utilized in a nearest neighbor process (NN process). As another alternative, the information about a plurality of the characteristic measures F1, F2, . . . , Fn may be utilized in a process with which each of the characteristic measures F1, F2, . . . , Fn is simply compared with a threshold value. As a further alternative, the information about a plurality of the characteristic measures F1, F2, . . . , Fn may be utilized in a process which is composed of a plurality of the processes described above, or the like.

The information about the abnormal pattern T, which has been detected in the manner described above, is fed into a display means 54 together with the image signal S1. The display means 54 displays a visible image in which the abnormal pattern T is shown clearly. No limitation is imposed on how the abnormal pattern T is displayed. For example, the abnormal pattern T may be indicated by an arrow in the visible image. Alternatively, the abnormal pattern T may be displayed in a different color and with different image density from the other part of the visible image. As another alternative, characters, marks, or the like, which indicate the position of the abnormal pattern T, may be displayed at a peripheral part of the visible image.

The second abnormal pattern detecting apparatus in accordance with the present invention is also provided with an input means 55. With the input means 55, a person, who observes the visible image displayed with the display means 54, inputs the information I about whether the abnormal pattern T shown in the visible image is or is not a true abnormal pattern.

The information I is fed into the second prospective abnormal pattern finding means 53. The second prospective abnormal pattern finding means 53 is provided with a learning function, with which the operations for finding the abnormal pattern T from the prospective abnormal patterns C, C, . . . are changed in accordance with the information I. In the second abnormal pattern detecting apparatus in accordance with the present invention, no limitation is imposed on the type of the learning function. By way of example, the second prospective abnormal pattern finding means 53 is provided with a neural network having the learning function by back propagation method, in which the information I is utilized as the instructor signal. The learning is carried out in which, as the information I is fed into the neural network, the weight of connections (i.e. the weight of synapse connections) is corrected.

The functions of the second abnormal pattern detecting apparatus in accordance with the present invention need not necessarily be divided into the blocks 51 through 55 shown in FIG. 14. It is only necessary that the second abnormal pattern detecting apparatus in accordance with the present invention is substantially provided with the functions corresponding to the blacks 51 through 55 shown in FIG. 14. For example, in the second abnormal pattern detecting apparatus in accordance with the present invention, the spatial-domain filtering processing for finding the prospective abnormal patterns C, C, . . . (i.e. the function of the first prospective abnormal pattern finding means 51) and the process for finding the characteristic measures F1, F2, . . . , Fn, such as the area and the shape of each of the prospective abnormal patterns C, C, . . . (i.e. the function of the characteristic measure calculating means 52) may be carried out simultaneously.

In an embodiment of the second abnormal pattern detecting apparatus in accordance with the present invention, the function of finding the anatomical information about the object may be provided as well as the functions of the blocks 51 through 55 shown in FIG. 14. The anatomical information is fed into the second prospective abnormal pattern finding means 53. When the abnormal pattern T is found from the prospective abnormal patterns C, C, . . . , the anatomical information is utilized together with the information about a plurality of characteristic measures F1, F2, . . . , Fn. For example, the information about a plurality of the characteristic measures F1, F2, . . . , Fn may be utilized together with the anatomical information D. For example, the anatomical information may be fed into the neural network together with the information about a plurality of the characteristic measures F1, F2, . . . , Fn. Alternatively, when the output of the neural network (i.e. the measure E, which represents the level of the probability that each of the prospective abnormal patterns C, C, . . . will be the true abnormal pattern) is processed with a threshold value, and thereafter a judgment is made, from the results of the comparison, as to whether each of the prospective abnormal patterns C, C, . . . is or is not the abnormal pattern T, the threshold value may be determined in accordance with the anatomical information.

The term "anatomical information" as used herein for the second abnormal pattern detecting apparatus in accordance with the present invention means the information about the images of structures of the object, which images appear in the radiation image. Specifically, the term "anatomical information" as used herein means the information about the positions of images of the lung fields, the hilum of the lung, a rib, the heart, the diaphragm, or the like in an X-ray image of the chest.

With the second abnormal pattern detecting apparatus in accordance with the present invention, all of the prospective abnormal patterns are found regardless of whether noise is found together with them. On the basis of a plurality of the characteristic measures, the abnormal pattern T is found from the prospective abnormal patterns. Therefore, all of the abnormal patterns, which are present in the radiation image, can be found reliably, and the problem does not occur in that a pattern, which is not actually an abnormal pattern, is detected as an abnormal pattern. Accordingly, true abnormal patterns can be detected accurately.

The second abnormal pattern detecting apparatus in accordance with the present invention is also provided with the display means 54 and the input means 55. Additionally, the second prospective abnormal pattern finding means 53 is provided with the learning function, with which the operations for finding the abnormal pattern T from the prospective abnormal patterns C, C, . . . are changed in accordance with the information I. Therefore, the operations can be altered in accordance with the facility, in which the second abnormal pattern detecting apparatus is located, the person who observes the visible image displayed with the display means 54, or the like, such that abnormal patterns can be detected more accurately.

As described above, in the second abnormal pattern detecting apparatus in accordance with the present invention, no limitation is imposed on the type of the learning function. In cases where the second prospective abnormal pattern finding means 53 is provided with the neural network having the learning function by back propagation method, in which the information I received from the input means 55 is utilized as the instructor signal, the accuracy with which the abnormal patterns are detected can be improved even further.

FIG. 15 is a block diagram showing the configuration of the third abnormal pattern detecting apparatus in accordance with the present invention.

With reference to FIG. 15, an image signal S1, which is made up of a series of image signal components representing a radiation image of an object, is fed into an operation means 61 and a detection means 63.

The operation means 61 finds anatomical regions D1, D2, . . . , Dn in the radiation image of the object from the image signal S1.

The term "anatomical regions" as used herein for the third abnormal pattern detecting apparatus in accordance with the present invention means the regions corresponding to the images of structures of the object, which images appear in the radiation image. Specifically, the term "anatomical regions" as used herein means the regions corresponding to images of the lung fields, a rib, the heart, the diaphragm, or the like in an X-ray image of the chest. Of course, the operation means 61 need not necessarily discriminate all of the regions corresponding to the images of the structures of the object, which images appear in the radiation image, but may find only the necessary anatomical regions in accordance with the type of the abnormal patterns which are to be found. For example, in cases where a pattern representing an abnormality in the lungs is to be detected, the operation means 61 may find only the regions corresponding to the images of the lung fields and the region outside of the images of the lung fields in a lung region image.

The information about the positions of the anatomical regions D1, D2, . . . , Dn, which have been found by the operation means 61, is fed into the detection means 63.

A storage means 62 stores the information about abnormal pattern detecting filters F1, F2, . . . , Fn, which correspond to the anatomical regions D1, D2, . . . , Dn and which are suitable for detecting the abnormal patterns located in the anatomical regions D1, D2, . . . , Dn.

The term "abnormal pattern" as used herein for the first abnormal pattern detecting apparatus in accordance with the present invention means a pattern of an abnormality in the object, for example, an image of a tumor, a calcified part, a fattened and thickened pleura, or a pneumothorax. The detection means 63 need not necessarily find all types of abnormal patterns, but may find only the tumor images as the abnormal patterns.

The abnormal pattern detecting filters need not necessarily be different for different anatomical regions D1, D2, . . . , Dn. For example, in cases where five anatomical regions D1 through D5 are found by the operation means 61, the same single filter may be employed for two anatomical regions D1 and D2. In cases where operation algorithms employed in the respective abnormal pattern detecting filters are substantially different from one another, it is, of course, regarded that the abnormal pattern detecting filters are different from one another. Also, in cases where factors, which affect the results of detection, are even slightly different in the abnormal pattern detecting filters, it is regarded that the abnormal pattern detecting filters are different from one another. For example, characteristic measures, which represent the level of the probability that an image will be an abnormal pattern, may be calculated from the filtering operations, and may then be processed with a threshold value. From the results of the comparison, a judgment may be made as to whether the image is or is not actually an abnormal pattern. In such cases, the abnormal pattern detecting filters, which employ different threshold values, are regarded as being different from one another.

The information about the abnormal pattern detecting filters F1, F2, . . . , Fn is fed from the storage means 62 into the detection means 63.

As described above, the detection means 63 receives the image signal S1 representing the radiation image, the information about the positions of the anatomical regions D1, D2, . . . , Dn, in the radiation image, which anatomical regions have been found by the operation means 61, and the information about the abnormal pattern detecting filters F1, F2, . . . , Fn, which correspond to the anatomical regions D1, D2, . . . , Dn. The detection means 63 processes the image signal components, which represent image information at the anatomical regions D1, D2, . . . , Dn in the radiation image, with the corresponding abnormal pattern detecting filters F1, F2, . . . , Fn. In this manner, the detection means 63 detects an abnormal pattern.

The information about the abnormal pattern T, which has been detected in the manner described above, is fed out of the third abnormal pattern detecting apparatus in accordance with the present invention. Thereafter, for example, specific image processing is carried out on the image signal components representing the abnormal pattern in the radiation image. Also, the image signal representing the radiation image is stored together with the information about the abnormal pattern. A visible image is then reproduced and displayed, in which the position of the abnormal pattern is shown clearly.

The functions of the third abnormal pattern detecting apparatus in accordance with the present invention need not necessarily be divided into the blocks 61 through 63 shown in FIG. 15. It is only necessary that the third abnormal pattern detecting apparatus in accordance with the present invention is substantially provided with the functions corresponding to the blocks 61 through 63 shown in FIG. 15.

How tumor images appear in an X-ray image of the chest vary in different locations in the lungs. With the third abnormal pattern detecting apparatus in accordance with the present invention, abnormal pattern detecting filters, which are suitable for detecting abnormal patterns appearing in the corresponding anatomical regions, are employed for the corresponding anatomical regions. Therefore, abnormal patterns can be detected accurately.

The present invention also provides a circular pattern judging method, which comprises the steps of:

i) from an image signal made up of a series of image signal components representing a radiation image of an object, calculating a plurality of differences between the values of the image signal components representing adjacent picture elements in each of predetermined regions in said radiation image, said picture elements being located along each of two different directions in said radiation image, ii) calculating a mean-level value of the absolute values of the plurality of said differences for each of two said different directions, or a mean-level value of the square values of the plurality of said differences for each of two said different directions, and iii) from said mean-level values, which have been calculated for two said different directions, making a judgment as to the level of the probability that each said predetermined region in said radiation image will fall within the region corresponding to a circular pattern in said radiation image.

The present invention further provides a circular pattern judging apparatus, which comprises:

i) a difference calculating means for calculating, from an image signal made up of a series of image signal components representing a radiation image of an object, a plurality of differences between the values of the image signal components representing adjacent picture elements in each of predetermined regions in said radiation image, said picture elements being located along each of two different directions in said radiation image, ii) a mean calculating means for calculating a mean-level value of the absolute values of the plurality of said differences for each of two said different directions, or a mean-level value of the square values of the plurality of said differences for each of two said different directions, and iii) a judgment means for making a judgment, from said mean-level values, which have been calculated for two said different directions, as to the level of the probability that each said predetermined region in said radiation image will fall within the region corresponding to a circular pattern in said radiation image.

The term "mean-level value" as used herein for the circular pattern judging method and apparatus in accordance with the present invention means one of various types of values which represent the mean level of the absolute values or the square values of the plurality of said differences for each of the two different directions. For example, the mean-level value may be the arithmetical mean, the geometric mean, or the median value of the absolute values or the square values of the plurality of said differences for each of the two different directions. Alternatively, the mean-level value may be calculated with the formula expressed as (maximum value−minimum value)/2.

The predetermined regions may be those which are found as prospective circular patterns by processing an image signal representing a radiation image with the filter described in, for example, U.S. Pat. No. 4,769,850 or with one of various other filters, which will be described later.

Alternatively, the predetermined regions may be those which are divided from one another by a plurality of imaginary vertical lines and a plurality of imaginary horizontal lines drawn in a radiation image. As another alternative, an operator may observe a radiation image and may manually designate the predetermined regions in the radiation image. After it is judged, with the circular pattern judging method in accordance with the present invention, that a predetermined region, which has been designated in a radiation image, has a high probability of falling within the region corresponding to a circular pattern, the level of the probability may be judged more accurately by processing the image signal components, which correspond to the predetermined region, or the image signal components, which correspond to positions in the vicinity of the predetermined regions, with a filter.

The inventors studied about circular patterns corresponding to tumor images and regions composed of many linear patterns, such as blood vessel images, in X-ray images of the chests. As a result, it was found that the image density is comparatively uniform in the tumor images, whereas the image density changes at short intervals along a single direction in the regions composed of many linear patterns. (In most cases, the blood vessel images, or the like, extend in an approximately constant direction.)

The circular pattern judging method and apparatus in accordance with the present invention are based on these findings. With the circular pattern judging method and apparatus in accordance with the present invention, from the aforesaid mean-level values, which have been calculated for two different directions, a judgment can be made as to whether the predetermined region is the one which is composed of many linear patterns, such as blood vessel images. Accordingly, a judgment can be made accurately as to whether the predetermined region falls or does not fall within the region corresponding to a circular pattern in a radiation image.

The present invention still further provides a fourth abnormal pattern detecting apparatus wherein, from an image signal made up of a series of image signal components representing a radiation image of an object which is constituted of soft tissues and bones, an abnormal pattern appearing as an approximately circular pattern in the radiation image is detected, the abnormal pattern detecting apparatus comprising:
i) an image operation means for obtaining a soft tissue image signal, which is made up of a series of soft tissue image signal components primarily representing an image of the soft tissues in said object, from a plurality of image signals representing a plurality of radiation images of said object, which radiation images have been formed with at least two kinds of radiation having different energy distributions, and
ii) an abnormal pattern finding means for finding an abnormal pattern, which appears in said soft tissue image, by processing said soft tissue image signal with an abnormal pattern finding filter, wherein said abnormal pattern finding filter comprises the steps of:
a) calculating the differences, $\Delta ij = fij - f0$, between the value of a soft tissue image signal component $f0$ representing a predetermined picture element P0 in said soft tissue image and the values of soft tissue image signal components $fij$ representing the picture elements Pij, which are located on each of a plurality of lines Li, where $i=1, 2, \ldots, n$, extending from said predetermined picture element P0 to peripheral parts of said soft tissue image, and which are spaced a plurality of predetermined distances rij, where $j=1, 2, \ldots, m$, from said predetermined picture element P0,
b) finding a representative value, which is representative of said differences $\Delta ij$, for each of said lines Li,
c) calculating a mean-level value of two said representative values for each set of two said lines which extend from said predetermined picture element P0 in approximately opposite directions, and
d) from the mean-level values, which have been calculated for a plurality of said sets of lines, judging whether said predetermined picture element P0 falls or does not fall within the region corresponding to said abnormal pattern.

No limitation is imposed on how a plurality of radiation images of the object are formed with at least two kinds of radiation having different energy distributions. For example, in cases where recording media, such as stimulable phosphor sheets or sheets of X-ray film, are exposed to radiation carrying image information, each of a plurality of recording media may be located with different timing at the position for image recording and exposed to the radiation, which has passed through the object, and a radiation image of the object may thereby be recorded on the recording medium. Alternatively, a filter, which filters out high-energy components of radiation and transmits low-energy components of radiation, may be interposed between a plurality of recording media, and a plurality of radiation images may then be recorded on the recording media with a single, simultaneous exposure to radiation.

In the fourth abnormal pattern detecting apparatus in accordance with the present invention, the number of lines Li, where $i=1, 2, \ldots, n$, i.e. the value of n, is not limited to a specific value, but may take any value which will satisfy the level of accuracy required of the judgment, which will allow the operations to be completed within a specified time, or the like.

Also, the number of predetermined distances rij, where $j=1, 2, \ldots, m$, i.e. the value of m, is not limited to a specific value.

The term "representative value" as used herein for the fourth abnormal pattern detecting apparatus in accordance with the present invention means a value which is suitable for expressing the presence or absence or amount of the differences $\Delta ij$ between the value of the soft tissue image signal component $f0$ representing the predetermined picture element P0 and the values of he soft tissue image signal components $fij$ representing the picture elements Pij, which are located on each of a plurality of lines Li extending from the predetermined picture element P0 to peripheral parts of the soft tissue image, and which are spaced a plurality of predetermined distances rij from the predetermined picture element P0. By way of example, in cases where, typically, the abnormal pattern has the characteristic that the value of the soft tissue image signal component corresponding to the center position of the abnormal pattern is smaller than the values of the soft tissue image signal components corresponding to the peripheral portions of the abnormal pattern, the maximum value of the differences Wij may be employed as the representative value. In cases where the abnormal pattern has the characteristic that the value of the soft tissue image signal component corresponding to the center position of the abnormal pattern is larger than the values of the soft tissue image signal components corresponding to the peripheral portions of the abnormal pattern, the minimum value of the differences $\Delta ij$ may be employed as the representative value. However, in cases where the maximum value of the differences Δij is employed as the representative value, if, for example, all of the differences Δij between the value of the soft tissue image signal component f0 representing the predetermined picture element P0 and the values of the soft tissue image signal components fij representing the picture elements Pij, which are located on a certain line Lk among a plurality of the lines Li extending from the predetermined picture element P0 to peripheral parts of the soft tissue image, and which are spaced a plurality of predetermined distances rij from the predetermined picture element P0, are negative, no effective maximum value of the differences Δij can be found for the line Lk. In such cases, a maximum value of the differences Δij may be found from some extra simple calculations and then employed as the representative value. Alternatively, for example, a value of 0.0 may be employed as the representative value. Accordingly, the term "representative value" as used herein for the fourth abnormal pattern detecting apparatus in accordance with the present invention can also mean a value employed in lieu of a representative value in cases where a representative value is obtained, which does not effectively represent the differences between the value of the soft tissue image signal component f0 representing the picture element P0 located at the center position of an abnormal pattern and the values of the soft tissue image signal components fij representing the picture elements Pij located at peripheral portions of the abnormal pattern. The term "representative value" as used herein for the fourth abnormal pattern detecting apparatus in accordance with the present invention further means a value which substantially represents the maximum value or the minimum value of the differences Δij, for example, a value calculated from a formula expressed as (maximum value)−(predetermined value) or (minimum value)+(predetermined value).

In the fourth abnormal pattern detecting apparatus in accordance with the present invention, the differences are calculated from a formula expressed as Δij=fij−f0. Such embodiments are substantially identical with embodiments wherein the differences are calculated from a formula expressed as Δij'=f0−fij, except that the maximum values and the minimum values of the differences are reversed. The fourth abnormal pattern detecting apparatus in accordance with the present invention is meant to embrace within its scope embodiments which are substantially identical.

The term "mean-level value" as used herein for the fourth abnormal pattern detecting apparatus in accordance with the present invention means a value which is suitable for expressing the presence or absence or amount of the differences between the value of the soft tissue image signal component f0 representing the picture element P0 located at the center position of the abnormal pattern and the two representative values found for each set of two lines, which extend from the picture element P0 in approximately opposite directions. By way of example, the mean-level value may be the arithmetical mean or the geometric mean of the two representative values. Alternatively, the two representative values may be weighted, and the mean value of the weighted representative values may be employed as the mean-level value.

The present invention also provides a fifth abnormal pattern detecting apparatus wherein, in lieu of the abnormal pattern finding filter used in the fourth abnormal pattern detecting apparatus in accordance with the present invention, an abnormal pattern finding filter is employed which comprises the steps of:

a) calculating the gradients $\nabla f_i$ of soft tissue image signal components fi representing the picture elements Pi, which are located on a plurality of lines Li, where i=1, 2, ..., n, extending from a predetermined picture element P0 in said soft tissue image to peripheral parts of said soft tissue image, and which are spaced a predetermined distance ri from said predetermined picture element P0, b) calculating the normalized gradients $\nabla f_i / |\nabla f_i|$ by dividing said gradients $\nabla f_i$ by their magnitudes $|\nabla f_i|$, c) calculating the projections of said normalized gradients $\nabla f_i / |\nabla f_i|$ on the vectors directed from said picture elements Pi to said predetermined picture element P0, the projections being expressed as $\nabla f_i / |\nabla f_i| * e_i$, where $e_i$ denotes the unit vectors directed from said picture elements Pi to said predetermined picture element P0, and * denotes the inner product, d) calculating a mean-level value from the values of said projections $\nabla f_i / |\nabla f_i| * e_i$, and e) from said mean-level value, judging whether said predetermined picture element P0 falls or does not fall within the region corresponding to said abnormal pattern.

In the fifth abnormal pattern detecting apparatus in accordance with the present invention, the number of the lines Li, where i=1, 2, ..., n, i.e. the value of n, is not limited to a specific value, but may take any value which will satisfy the level of accuracy required in the judgment, which will allow the operations to be completed within a specified time, or the like.

In the fifth abnormal pattern detecting apparatus in accordance with the present invention, the predetermined distance ri may vary for the respective lines Li. For example, in cases where the abnormal pattern, which is to be detected, has an elliptic pattern having a longer axis extending in a predetermined direction, the predetermined distance ri in said predetermined direction may be longer than the predetermined distance ri in the direction normal to said predetermined direction (i.e. in the direction along which the shorter axis of the elliptic pattern extends).

The term "gradient" as used herein means the vector expressed as $$\nabla f(m,n) = (f(m+1,n) - f(m,n), f(m,n+1) - f(m,n)) \quad (1)$$

In Formula (1), (m,n) denotes the x and y coordinates of a certain picture element P in a radiation image, (m+1,n) denotes the coordinates of a picture element P', which is adjacent to the picture element P in the x direction, and (m,n+1) denotes the coordinates of a picture element: P", which is adjacent to the picture element P in the y direction. Also, f(m,n), f(m+1,n), and f(m,n+1) respectively denote the values of the image signal components representing the picture elements P, P', and P".

In the fifth abnormal pattern detecting apparatus in accordance with the present invention, the projections $\nabla f_i / |\nabla f_i| * e_i$ are calculated. Such embodiments are substantially identical with embodiments wherein the projections $\nabla f_i / |\nabla f_i| * e_i'$ are calculated, where $e_i'$ denotes the unit vectors directed from the picture elements Pi away from the predetermined picture element P0 along the lines Li, except that the maximum values and the minimum values of the projections are reversed. The fifth abnormal pattern detecting apparatus in accordance with the present invention are meant to embrace within its scope embodiments which are substantially identical.

The term "mean-level value" as used herein for the fifth abnormal pattern detecting apparatus in accordance with the present invention typically means the arithmetical mean of the aforesaid projections. Alternatively, the mean-level value may be the geometric mean of the aforesaid projections. As another alternative, the aforesaid projections may be weighted, and the mean value of the weighted projections may be employed as the mean-level value.

The present invention further provides a sixth abnormal pattern detecting apparatus wherein, in lieu of the abnormal pattern finding filters used in the fourth and fifth abnormal pattern detecting apparatuses in accordance with the present invention, an abnormal pattern finding filter is employed which comprises the steps of:

a) calculating the gradients $\nabla fij$ of soft tissue image signal components fij representing the picture elements Pij, which are located on each of a plurality of lines Li, where i=1, 2, ..., n, extending from a predetermined picture element P0 in said soft tissue image to peripheral parts of said soft tissue image, and which are spaced a plurality of predetermined distances rij, where j=1, 2, ..., m, from said predetermined picture element P0, b) calculating the normalized gradients $\nabla fij/|\nabla fij|$ by dividing said gradients $\nabla fij$ by their magnitudes $|\nabla fij|$, c) calculating the projections of said normalized gradients $\nabla fij/|\nabla fij|$ on vectors which are directed from said picture elements Pij to said predetermined picture element P0, the projections being expressed as $\nabla fij/|\nabla fij| * e\, i$, where $e\, i$ denotes the unit vectors directed from said picture elements Pij to said predetermined picture element P0, and * denotes the inner product, d) finding a representative value $\{\nabla fij/|\nabla fij| * e\, i\}r$, which is representative of said projections $\nabla fij/|\nabla fij| * e\, i$, for each of said lines Li, e) calculating a mean-level value of said representative values $\{\nabla fij/|\nabla fij| * e\, i\}r$, which have been found for the plurality of said lines Li, and f) from said mean-level value, judging whether said predetermined picture element P0 falls or does not fall within the region corresponding to said abnormal pattern.

In the sixth abnormal pattern detecting apparatus in accordance with the present invention, the number of the lines Li, where i=1, 2, ..., n, i.e. the value of n, is not limited to a specific value, but may take any value which will satisfy the level of accuracy required in the judgment, which will allow the operations to be completed within a specified time, or the like.

In the sixth abnormal pattern detecting apparatus in accordance with the present invention, the number of the predetermined distances rij, where j=1, 2, ..., m, i.e. the value of m, is not limited to a specific value. Also, the value of m may vary for the respective lines Li, where i=1, 2, ..., n. For example, in cases where the abnormal pattern, which is to be detected, has an elliptic pattern having a longer axis extending in a predetermined direction, the value of m in said predetermined direction may be made larger than the value of m in the direction normal to said predetermined direction.

The term "gradient" as used herein means the vector expressed as Formula (1).

The term "representative value" as used herein for the sixth abnormal pattern detecting apparatus in accordance with the present invention means a value suitable for expressing the characteristics of an abnormal pattern, which appear on an image profile along each of the lines Li, on the basis of the projections $\nabla fij/|\nabla fij| * e\, i$. By way of example, in cases where, typically, the abnormal pattern has the characteristic that the value of the soft tissue image signal component corresponding to the center position of the abnormal pattern is smaller than the values of the soft tissue image signal components corresponding to the peripheral portions of the abnormal pattern, the maximum value of the projections $\nabla fij/|\nabla fij| * e\, i$ for each of the lines Li may be employed as the representative value. In cases where the abnormal pattern has the characteristic that the value of the soft tissue image signal component corresponding to the center position of the abnormal pattern is larger than the values of the soft tissue image signal components corresponding to the peripheral portions of the abnormal pattern, the minimum value of the projections $\nabla fij/|\nabla fij| * e\, i$ for each of the lines Li may be employed as the representative value. However, in cases where the maximum value of the projections $\nabla fij/|\nabla fij| * e\, i$ for each of the lines Li is employed as the representative value, if, for example, all of the projections $\nabla fij/|\nabla fij| * e\, i$ for a certain line Lk among a plurality of the lines Li are negative, no effective maximum value for the projections $\nabla fij/|\nabla fij| * e\, i$ will be found for the line Lk. In such cases, a maximum value of the projections $\nabla fij/|\nabla fij| * e\, i$ can be found from some extra simple calculations and employed as the representative value. Alternatively, for example, a value of 0.0 may be employed as the representative value. The term "representative value" as used herein for the sixth abnormal pattern detecting apparatus in accordance with the present invention may also mean a value which substantially represents the maximum value or the minimum value of the projections $\nabla fij/|\nabla fij| * e\, i$, for example, a value calculated from the formula expressed as (maximum value)−(predetermined value) or (minimum value)+(predetermined value).

In the sixth abnormal pattern detecting apparatus in accordance with the present invention, the projections $\nabla fij/|\nabla fij| * e\, i$ are calculated. Such embodiments are substantially identical with embodiments wherein the projections $\nabla fij/|\nabla fij| * e\, i'$ are calculated, where $e\, i'$ denotes the unit vectors directed from the picture elements Pij away from the predetermined picture element P0 along each of the lines Li, except that the maximum values and the minimum values of the projections are reversed. The sixth abnormal pattern detecting apparatus in accordance with the present invention are meant to embrace within its scope embodiments which are substantially identical.

The term "mean-level value" as used herein for the sixth abnormal pattern detecting apparatus in accordance with the present invention typically means the arithmetical mean of the representative values. Alternatively, the mean-level value may be the geometric mean of the representative values. As another alternative, the representative values may be weighted, and the mean value of the weighted representative values may be employed as the mean-level value.

The present invention still further provides a seventh abnormal pattern detecting apparatus wherein, in lieu of the abnormal pattern finding filters used in the fourth, fifth, and sixth abnormal pattern detecting apparatuses in accordance with the present invention, an abnormal pattern finding filter is employed which comprises the steps of:

a) calculating:
- (1) a mean-level value Q0 from the values of soft tissue image signal components representing a plurality of picture elements, which are located in a center region including a predetermined picture element P0 in said soft tissue image, and
- (2) mean-level values Qi, where i=1, 2, . . . , n, each representing the mean level of the values of soft tissue image signal components representing a plurality of picture elements, which are located in each of a plurality of peripheral regions surrounding said center region, b) calculating the differences Δi, where i=1, 2, . . . , n, between said mean-level value Q0 corresponding to said center region and the respective mean-level values Qi, where i=1, 2, . . . , n, corresponding to said peripheral regions, c) finding a first characteristic value, which is representative of said differences Δi, and a second characteristic value, which represents the amount of dispersion in said differences Δi, d) calculating the ratio of said first characteristic value to said second characteristic value, e) comparing said ratio with a predetermined threshold value, and f) from the results of the comparison, judging whether said predetermined picture element P0 falls or does not fall within the region corresponding to said abnormal pattern.

The term "mean-level value" as used herein for the seventh abnormal pattern detecting apparatus in accordance with the present invention typically means the arithmetical mean of the values of the soft tissue image signal components representing a plurality of picture elements located in each region. Alternatively, the mean-level value may be the geometric mean, the median value, or the like, of the values of the soft tissue image signal components representing a plurality of picture elements located in each region.

The term "first characteristic value" as used herein for the seventh abnormal pattern detecting apparatus in accordance with the present invention means a value which is representative of a plurality of the differences Δi. For example, the first characteristic value may be the mean-level value, the maximum value, or the minimum value of the differences Δi.

The term "second characteristic value" as used herein for the seventh abnormal pattern detecting apparatus in accordance with the present invention means a value which represents the amount of dispersion in a plurality of the differences Δi. For example, the second characteristic value may be the variance of the differences Δi, or the value given by the formula: (maximum value)−(minimum value).

In the seventh abnormal pattern detecting apparatus in accordance with the present invention, the number of lines Li, where i=1, 2, . . . , n, i.e. the value of n, is not limited to a specific value, but may take any value which will satisfy the level of accuracy required of the judgment, which will allow the operations to be completed within a specified time, or the like.

The present invention also provides an eighth abnormal pattern detecting apparatus wherein, in lieu of the abnormal pattern finding filters used in the fourth, fifth, sixth, and seventh abnormal pattern detecting apparatuses in accordance with the present invention, an abnormal pattern finding filter is employed which comprises the steps of:

a) calculating:
- (1) a mean-level value Q0 of the values of soft tissue image signal components representing a plurality of picture elements, which are located in a center region including a predetermined picture element P0 in said soft tissue image, and
- (2) mean-level values Qij, each representing the mean level of the values of soft tissue image signal components representing a plurality of picture elements located in each of a plurality of peripheral regions, each said peripheral region including each of picture elements Pij, which are located on each of a plurality of lines Li, where i=1, 2, . . . , n, extending from said predetermined picture element P0 to peripheral parts of said soft tissue image, and which are spaced a plurality of predetermined distances rij, where j=1, 2, . . . , m, from said predetermined picture element P0, b) finding a representative value Qi, which is representative of said mean-level values, for each of said lines Li, c) calculating the differences Δi, where i=1, 2, . . . , n, between said mean-level value Q0 corresponding to said center region and the respective representative values Qi, which have been found for the plurality of said lines Li, d) finding a first characteristic value, which is representative of said differences Δi, and a second characteristic value, which represents the amount of dispersion in said differences Δi, e) calculating the ratio of said first characteristic value to said second characteristic value, f) comparing said ratio with a predetermined threshold value, and g) from the results of the comparison, judging whether said predetermined picture element P0 falls or does not fall within the region corresponding to said abnormal pattern.

The term "mean-level value" as used herein for the eighth abnormal pattern detecting apparatus in accordance with the present invention typically mean, the arithmetical mean of the values of the soft tissue image signal components representing a plurality of picture elements located in each region. Alternatively, the mean-level value may be the geometric mean, the median value, or the like, of the values of the soft tissue image signal components representing a plurality of picture elements located in each region.

The term "first characteristic value" as used herein for the eighth abnormal pattern detecting apparatus in accordance with the present invention means a value which is representative of a plurality of the differences Δi. For example, the first characteristic value may be the mean-level value, the maximum value, or the minimum value of the differences Δi.

The term "second characteristic value" as used herein for the eighth abnormal pattern detecting apparatus in accordance with the present invention means a value which represents the amount of dispersion in a plurality of the differences Δi. For example, the second characteristic value may be the variance of the differences Δi, or the value given by the formula: (maximum value)−(minimum value).

In the eighth abnormal pattern detecting apparatus in accordance with the present invention, the number of lines Li, where i=1, 2, . . . , n, i.e. the value of n, is not limited to a specific value, but may take any value which will satisfy the level of accuracy required of the judgment, which will allow the operations to be completed within a specified time, or the like.

In the eighth abnormal pattern detecting apparatus in accordance with the present invention, the number of the predetermined distances rij, where j=1, 2, ..., m, i.e. the value of m, is not limited to a specific value. Also, the value of m may vary for the respective lines Li, where i=1, 2, ..., n. For example, in cases where the abnormal pattern, which is to be detected, has an elliptic pattern having a longer axis extending in a predetermined direction, the value of m in said predetermined direction may be larger than the value of m in the direction normal to said predetermined direction. In cases where the distance varies continuously from the minimum distance, rimin, to the maximum distance, rimax, along each of the lines, rij, where j=1, 2, ..., m, can be regarded as taking various values between rimin and rimax. Therefore, the term "a plurality of predetermined distances rij" as used herein for the eighth abnormal pattern detecting apparatus in accordance with the present invention also embraces the cases wherein the value of the distance, rij, varies continuously.

The term "representative value" as used herein for the eighth abnormal pattern detecting apparatus in accordance with the present invention means a value which is suitable for expressing the presence or absence or amount of the differences between the mean-level value Q0 of the values of soft tissue image signal components representing the picture elements, which are located in the center region including the predetermined picture element P0, and the mean-level values Qij, where j=1, 2, ..., m, each of which represents the mean level of the values of soft tissue image signal components representing the picture elements located in each of the peripheral regions, each said peripheral region including one of the picture elements Pij located on one of the lines Li. By way of example, in cases where, typically, the abnormal pattern has the characteristic that the value of the soft tissue image signal component corresponding to the center position of the abnormal pattern is smaller than the values of the soft tissue image signal components corresponding to the peripheral portions of the abnormal pattern, the maximum value of the mean-level values Qij corresponding to the peripheral regions located along each of the lines Li may be employed as the representative value. In cases where the abnormal pattern has the characteristic that the value of the soft tissue image signal component corresponding to the center position of the abnormal pattern is larger than the values of the soft tissue image signal components corresponding to the peripheral positions of the abnormal pattern, the minimum value of the mean-level values Qij corresponding to the peripheral regions located along each of the lines Li may be employed as the representative value. However, in cases where the maximum value of the mean-level values Qij corresponding to the peripheral regions located along each of the Lines Li is employed as the representative value, if, for example, all of the mean-level values Qij corresponding to the peripheral regions located along a certain line Lk among a plurality of the lines Li are negative, no effective maximum value of the mean-level values Qij will be found for the line Lk. In such cases, a maximum value of the mean-level values Qij found from some extra simple calculations may be employed as the representative value. Alternatively, for example, a value of 0.0 may be employed as the representative value. Accordingly, the term "representative value" as used herein for the eighth abnormal pattern detecting apparatus in accordance with the present invention also means a value employed in lieu of a representative value in cases where a representative value is obtained, which does not effectively represent the differences between the mean-level value Q0 corresponding to the center region and the mean-level values Qij corresponding to the peripheral regions located along each of the lines Li. The term "representative value" as used herein for the eighth abnormal pattern detecting apparatus in accordance with the present invention further means a value which substantially represents the maximum value or the minimum value of the mean-level values Qij corresponding to the peripheral regions located along each of the lines Li, for example, the value given by one of the formulas: (maximum value)−(predetermined value), and (minimum value)+(predetermined value).

Also, in the seventh abnormal pattern detecting apparatus in accordance with the present invention, in cases where the values of the differences Δi do not effectively represent the differences between the mean-level value Q0 corresponding to the center region and the mean-level values Qi corresponding to the peripheral regions surrounding the center region, a value of 0.0 or the like may be employed in lieu of the values obtained for the differences Δi.

The seventh and eighth abnormal pattern detecting apparatuses in accordance with the present invention can be embodied in various ways such that the aforesaid operations are substantially carried out. For example, in the eighth abnormal pattern detecting apparatus in accordance with the present invention, the maximum value Qi of the mean-level values Qij corresponding to the peripheral regions located along each of the lines Li may be found as the representative value. Thereafter, the differences between the mean-level value Q0 corresponding to the center region and the respective representative values Qi, which have been found for the plurality of the lines Li, may be calculated from the formula $$\Delta i = Qi - Q0 \tag{2}$$

Alternatively, the differences between the mean-level value Q0 and the respective mean-level values Qij may be calculated from the formula Δij=Qij−Q0, and thereafter the maximum value of the differences Δij corresponding to each of the lines Li may be found. The maximum value thus found is identical with the value calculated from Formula (2). The eighth abnormal pattern detecting apparatus in accordance with the present invention also embraces such embodiments in its scope.

The fourth through eighth abnormal pattern detecting apparatuses in accordance with the present invention should preferably be provided with a judgment means for calculating a plurality of differences between the values of the soft tissue image signal components representing adjacent picture elements in the abnormal pattern, which has been found by said abnormal pattern finding means, said picture elements being located along each of two different directions in said soft tissue image, calculating a mean-level value of the absolute values of the plurality of said differences for each of two said different directions, or a mean-level value of the square values of the plurality of said differences for each of two said different directions, and from said mean-level values, which have been calculated for two said different directions, making a judgment as to the level of the probability that said abnormal pattern, which has been found by said abnormal pattern finding means, will be a true abnormal pattern.

The term "mean-level value" as used herein for the judgment means described above means one of various types of values which represent the mean level of the absolute values or the square values of the plurality of said differences for each of the two different directions. For example, the mean-level value may be the arithmetical mean, the geometric mean, or the median value of the absolute values or the square values of the plurality of said differences for each of the two different directions. Alternatively, the mean-level value may be calculated with the formula expressed as (maximum value−minimum value) /2.

With the fourth through eighth abnormal pattern detecting apparatuses in accordance with the present invention, an abnormal pattern, which appears in the soft tissue image, is found by processing the soft tissue image signal obtained from the image operation means. Therefore, an abnormal pattern can be detected accurately without any adverse effects from bone images.

With the fourth abnormal pattern detecting apparatus in accordance with the present invention, the abnormal pattern finding filter works such that the differences, $\Delta ij = fij - f0$, are found between the value of a soft tissue image signal component f0 representing a predetermined picture element P0 and the values of the soft tissue image signal components fij representing the picture elements Pij. The picture elements Pij are located on each of a plurality of lines Li, where i=1, 2, . . . , n, extending from the predetermined picture element P0 to peripheral parts of the soft tissue image, and are spaced a plurality of predetermined distances rij, where j=1, 2, . . . , m, from the predetermined picture element P0. Thereafter, a representative value, which is representative of the differences $\Delta ij$, is found for each of the lines Li. Therefore, even when abnormal patterns are present in circular patterns having different sizes in a soft tissue image and even when the shapes of the abnormal patterns deviate slightly from circles, for example, are elliptic, a judgment can be made accurately as to whether the predetermined picture element P0 falls or does not fall within the region corresponding to an abnormal pattern. Also, with the fourth abnormal pattern detecting apparatus in accordance with the present invention, a representative value, which is representative of the differences $\Delta ij$, is found for each of the lines Li, and a calculation is made to find a mean-level value of two representative values for each set of two lines which extend from the predetermined picture element P0 in approximately opposite directions. Thereafter, from the mean-level values, which have been calculated for a plurality of the sets of lines, a judgment is made as to whether the predetermined picture element P0 falls or does not fall within the region corresponding to the abnormal pattern. Accordingly, even when the abnormal pattern is present in a region of the soft tissue image where the background image density changes sharply, a judgment can be made accurately as to whether the predetermined picture element P0 falls or does not fall within the region corresponding to the abnormal pattern.

With the fifth and sixth abnormal pattern detecting apparatuses in accordance with the present invention, the abnormal pattern finding filter works such that the normalized gradients $\nabla fi/|\nabla fi|$ or the normalized gradients $\nabla fij/|\nabla fij|$ are calculated. Thereafter, calculations are carried out which yield the projections of the normalized gradients on vectors directed from the picture elements Pi or the picture elements Pij to the predetermined picture element P0, the projections being expressed as $\nabla fi/|\nabla fi| * e_i$ or $\nabla fij/|\nabla fij| * e_i$. Therefore, adverse effects from the level of contrast of the circular pattern with the surrounding image areas can be eliminated, and an accurate judgment can be made with respect to the shape of the pattern.

Also, with the sixth abnormal pattern detecting apparatus in accordance with the present invention, the representative values are calculated from the soft tissue image signal components fij representing the picture elements Pij, which are located on each of a plurality of lines Li extending from a predetermined picture element P0 to peripheral parts of the soft tissue image, and which are spaced a plurality of predetermined distances rij from the predetermined picture element P0. Therefore, even when abnormal patterns having different sizes are present in a soft tissue image and even when the shapes of the abnormal patterns deviate slightly from circles, for example, are elliptic, an accurate judgment can be made as to whether the predetermined picture element P0 falls or does not fall within the region corresponding to an abnormal pattern. Even in such cases, adverse effects from the level of contrast of the abnormal pattern with the surrounding image areas can be eliminated, and an accurate judgment can be made with respect to the circular shape of the abnormal pattern.

With the fifth and sixth abnormal pattern. detecting apparatuses in accordance with the present invention, by processing the soft tissue image signal with the abnormal pattern finding filter, an abnormal pattern can be detected accurately without any adverse effects from bone images.

With the seventh and eighth abnormal pattern detecting apparatuses in accordance with the present invention, the abnormal pattern finding filter works such that the ratio of the first characteristic value to the second characteristic value is calculated and compared with a predetermined threshold value. From the results of the comparison, judgments are made as to whether predetermined picture elements fall or do not fall within the region corresponding to the abnormal pattern. Therefore, a circular pattern and a linear pattern, which are present in a soft tissue image, can be accurately discriminated from each other with a single filter. By processing the soft tissue image signal with the abnormal pattern finding filter, an abnormal pattern can be detected accurately without any adverse effects from bone images.

Also, with the eighth abnormal pattern detecting apparatus in accordance with the present invention, the abnormal pattern finding filter works such that the mean-level values Qij are calculated, each representing the mean level of the values of soft tissue image signal components representing the picture elements located in each of the peripheral regions, each said peripheral region including one of picture elements Pij. The picture elements Pij are located on each of the lines Li extending from a predetermined picture element P0 to peripheral parts of the soft tissue image, and are spaced a plurality of predetermined distances rij, where j=1, 2, . . . , m, from the predetermined picture element P0. The representative value Qi, which is representative of the mean-level values, is then found for each of the lines Li. Therefore, even when abnormal patterns having different sizes are present in a soft tissue image and even when the shapes of the abnormal patterns deviate slightly from circles, for example, are elliptic, an accurate judgment can be made as to whether a predetermined picture element P0 falls or does not fall within the region corresponding to an abnormal pattern.

A soft tissue image will also include linear patterns, such as blood vessel images. Therefore, there is the risk that a region composed of many blood vessel images is detected by mistake as the one corresponding to an abnormal pattern. The inventors studied about circular patterns corresponding to tumor images and regions composed of many linear patterns, such as blood vessel images, in X-ray images of the chests. As a result, it was found that the image density is comparatively uniform in the tumor images, whereas the image density changes at short intervals along a single direction in the regions composed of many linear patterns.

(In most cases, the blood vessel images, or the like, extend in an approximately constant direction.)

As described above, the fourth through eighth abnormal pattern detecting apparatuses in accordance with the present invention should preferably be provided with the judgment means for making a judgment, from the aforesaid mean-level values, which have been calculated for the two different directions, as to whether the abnormal pattern, which has been found by the abnormal pattern finding means, corresponds or does not correspond to a region composed of many linear patterns, such as blood vessel images. In such cases, a more accurate judgment can be made as to whether the abnormal pattern once detected is or is not a true abnormal pattern.

The present invention further provides an image finding apparatus wherein, from an image signal made up of a series of image signal components representing a radiation image of a human body, a tumor image in the radiation image is found, the image finding apparatus comprising:
i) a characteristic measure calculating means for calculating the characteristic measures for a plurality of picture elements in said radiation image by processing said image signal with a spatial-domain filter, which yields the characteristic measures whose values vary in accordance with whether a predetermined picture element in said radiation image falls or does not fall within the region corresponding to said tumor image,
ii) a prospective tumor image finding means for finding the prospective tumor images from said characteristic measures, and
iii) a tumor image finding means for finding a tumor image from said prospective tumor images.

In the image finding apparatus in accordance with the present invention, the tumor image finding means should preferably be provided with:
a) a difference calculating means for calculating a plurality of differences between the values of the image signal components representing adjacent picture elements in a region corresponding to each said prospective tumor image, said picture elements being located along each of two different directions in said radiation image,
b) a mean calculating means for calculating a mean-level value of the absolute values of the plurality of said differences for each of two said different directions, or a mean-level value of the square values of the plurality of said differences for each of two said different directions, and
c) a judgment means for judging, from said mean-level values, which have been calculated for two said different directions, whether said prospective tumor image is or is not a true tumor image.

The term "mean-level value" as used herein for the image finding apparatus in accordance with the present invention means one of various types of values which represent the mean level of the absolute values or the square values of the plurality of said differences for each of the two different directions. For example, the mean-level value may be the arithmetical mean, the geometric mean, or the median value of the absolute values or the square values of the plurality of said differences for each of the two different directions. Alternatively, the mean-level value may be calculated with the formula expressed as (maximum value−minimum value)/2.

With the image finding apparatus in accordance with the present invention, by virtue of the provision of the characteristic measure calculating means and the prospective tumor image finding means, all of the prospective tumor images can be found regardless of whether noise is detected together with them. Also, by virtue of the provision of the tumor image finding means, noise can be eliminated from the prospective tumor images, and a true tumor image can be found from the prospective tumor images free of noise. Therefore, tumor images can be detected accurately.

It often occurs that regions composed of many linear patterns, such as blood vessel images, are also found as prospective tumor images. The inventors studied about tumor images and regions composed of many linear patterns, such as blood vessel images, in X-ray images of the chests. As a result, it was found that the image density is comparatively uniform in the tumor images, whereas the image density changes at short intervals along a single direction in the regions composed of many linear patterns. (In most cases, the blood vessel images, or the like, extend in an approximately constant direction.)

Therefore, in cases where the tumor image finding means of the image finding apparatus in accordance with the present invention is provided with the difference calculating means, the mean calculating means, and the judgment means, regions composed of many linear patterns, such as blood vessel images, can be eliminated from the prospective tumor images. Accordingly, tumor images can be detected more accurately.

FIG. 28 is a block diagram showing the image display apparatus in accordance with the present invention.

With reference to FIG. 28, the image display apparatus in accordance with the present invention comprises a first image display section 101 and a second image display section 102.

The first image display section 101 receives an image signal S representing a stationary image from an image read-out apparatus, an image storage apparatus, or the like. When an image control signal C, which represents information about arrow marks and the positions thereof, information about characters and the positions thereof, or the like, is fed from an input means 101b into a first control means 101a, the first control means 101a alters the image signal S in accordance with the image control signal C. In this manner, the first control means 101a generates an image signal V, which represents the stationary image represented by the image signal S and images of the arrow marks, the characters, or the like, superposed upon the stationary image. (In cases where no image control signal C is fed into the first control means 101a, the image signal V is identical with the image signal S.) The image signal V is fed into a first display means 101c. The first display means 101c displays a visible image represented by the image signal V, i.e. a visible image, which is composed of the stationary image and the images of the arrow marks, the characters, or the like, superposed upon the stationary image.

Also, the image signal S and the image control signal C are fed into a transmission means 101d, which sends them into the second image display section 102.

In the second image display section 102, a reception means 102a receives the image signal S and the image control signal C from the transmission means 101d, and feeds them into a second control means 102b. The second control means 102b alters the image signal S, which represents the stationary image, in accordance with the image control signal C. In this manner, the second control means 102b generates an image signal V', which represents the stationary image and images of the arrow marks, the characters, or the like, superposed upon the stationary image. (In cases where no image control signal C is fed into the second control means 102b, the image signal V' is identical with the image signal S.) The image signal V' is fed into a second display means 102c. The second display means 102c displays a visible image represented by the image signal V'.

The image signal V and the image signal V' need not necessarily be identical with each other. For example, the image signal V may represent arrow marks which are stationary and those which are moving. On the other hand, the image signal V' may not represent arrow marks which are moving, but may represent only the arrow marks which are stationary. Alternatively, the image signal V may represent images of abbreviations, which are represented by a signal fed from the input means 101b into the first control means 101a, whereas the image signal V' may represent full characters or sentences corresponding to the abbreviations.

The image control signal C is meant to embrace one of various signals which make some alterations of the stationary image represented by the image signal S. For example, instead of representing arrow marks or characters, the image control signal C may designate a partial region in a stationary image. Alternatively, the image control signal C may represent an enlarged image of a partial region in a stationary image. As another alternative, the image control signal C may represent a stationary image or a partial region thereof in different colors.

With the image display apparatus in accordance with the present invention, the image signal S representing the stationary image is transmitted between the first image display section 101 and the second image display section 102. Also, when the image control signal C is generated by the input means 101b, the image control signal C is transmitted independently. Therefore, the image signal S may be transmitted only once, and thereafter only the image control signal C may be transmitted. Accordingly, the time required for signals to be transmitted can be kept shorter, and the cost for signal transmission can be kept lower than when the image signal V representing the image displayed with the first display means 101c is transmitted.

BRIEF DESCRIPTION OF THE DRAWINGS

FIG. 27 is a diagram having a predetermined picture element P0 from a soft tissue image in the middle, which diagram serves as an aid in explaining how a spatial-domain filter works, the spatial-domain filter being employed in an embodiment of the seventh abnormal pattern detecting apparatus in accordance with the present invention, FIG. 30 is a perspective view showing an embodiment of the image display apparatus in accordance with the present invention.

DESCRIPTION OF THE PREFERRED EMBODIMENTS

The present invention will hereinbelow be described in further detail with reference to the accompanying drawings.

First, an embodiment of the first abnormal pattern detecting apparatus in accordance with the present invention will be described below. In this embodiment, an X-ray image of the chest of a human body is stored on a stimulable phosphor sheet, and an image of a tumor is detected from the X-ray image.

Figure 2:
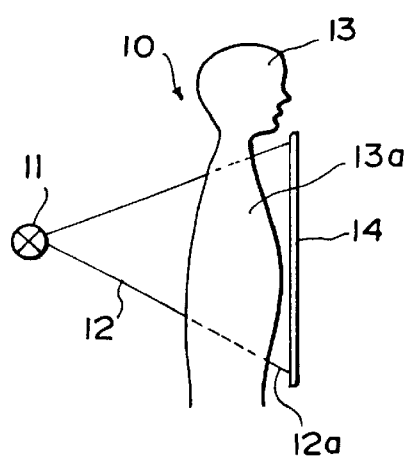
FIG. 2 is a schematic view showing an example of an X-ray image recording apparatus.

FIG. 2 is a schematic view showing an example of an X-ray image recording apparatus.

With reference to FIG. 2, X-rays 12 are produced by an X-ray source 11 of an X-ray image recording apparatus and irradiated to the chest 13a of a human body 13. X-rays 12a, which have passed through the human body 13, impinge upon a stimulable phosphor sheet 14. In this manner, an X-ray image of the chest 13a of the human body 13 is stored on the stimulable phosphor sheet 14.

Figure 3:
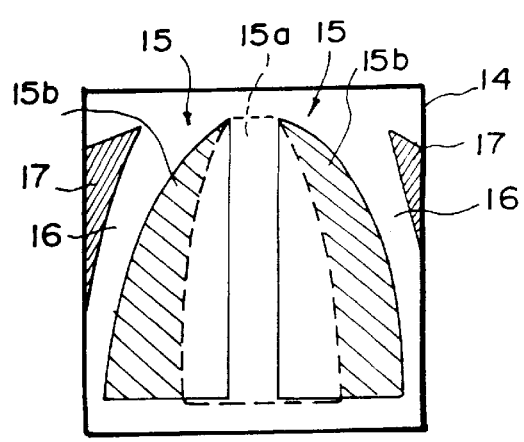
FIG. 3 is a schematic view showing an example of an X-ray image of the chest, which image has been stored on a stimulable phosphor sheet.

FIG. 3 is a schematic view showing an example of an X-ray image of the chest, which image has been stored on a stimulable phosphor sheet.

With reference to FIG. 3, the X-ray image comprises a lung region image 15, a skin image 16, and a background region 17, upon which the X-rays 12 shown in FIG. 2 impinged directly without passing through the object 13.

Figure 4:
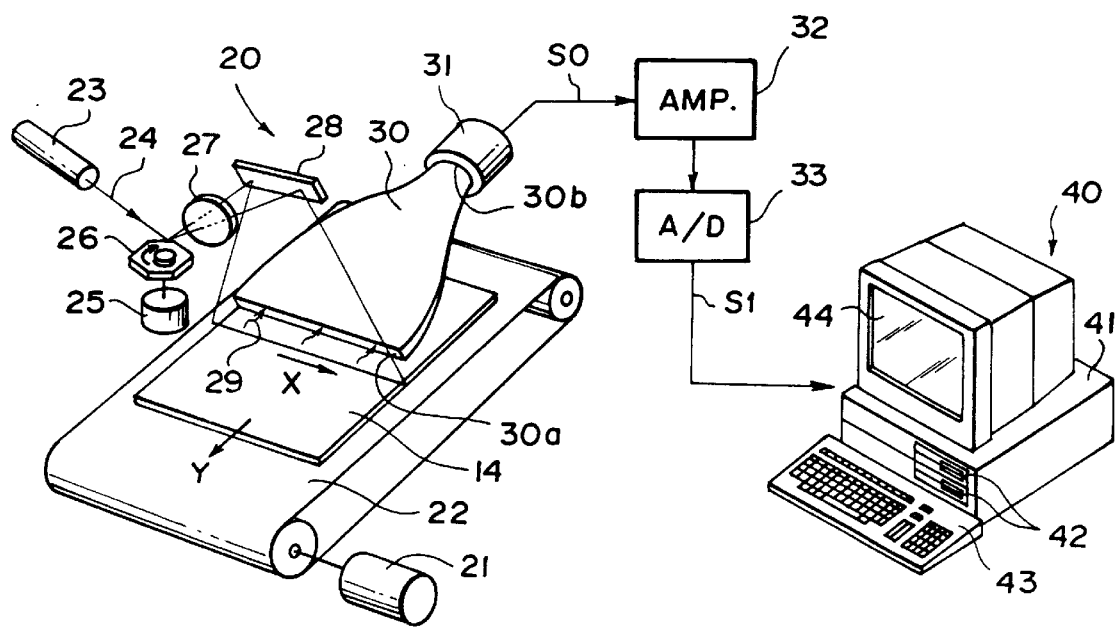
FIG. 4 is a perspective view showing an example of an X-ray image read-out apparatus and a computer system which is provided with an embodiment of the first abnormal pattern detecting apparatus in accordance with the present invention.

FIG. 4 is a perspective view showing an example of an X-ray image read-out apparatus and a computer system which is provided with an embodiment of the first abnormal pattern detecting apparatus in accordance with the present invention.

With reference to FIG. 4, a stimulable phosphor sheet 14, on which the X-ray image shown in FIG. 3 has been stored, is placed at a predetermined position in an X-ray image read-out apparatus 20. The stimulable phosphor sheet 14 is then conveyed in a subscanning direction indicated by the arrow Y by a sheet conveyance means 22, which is constituted of an endless belt or the like and which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fθ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the subscanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material such as an acrylic plate and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S0 generated by the photomultiplier 31 is logarithmically amplified by a logarithmic amplifier 32, and digitized by an A/D converter 33 into an electric image signal S1.

The image signal S1 is then fed into a computer system 40. The computer system 40 is provided with an embodiment of the first abnormal pattern detecting apparatus in accordance with the present invention. The computer system 70 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

From the image signal S1, which is made up of a series of image signal components representing the X-ray image and which has been fed into the computer system 40, an abnormal pattern in the X-ray image is detected. The computer system 40 carries out the operations corresponding to the blocks 1 through 4 shown in FIG. 1. The blocks 1 through 4 shown in FIG. 1 will hereinafter be referred to as the functions of the computer system 40.

Figure 1:
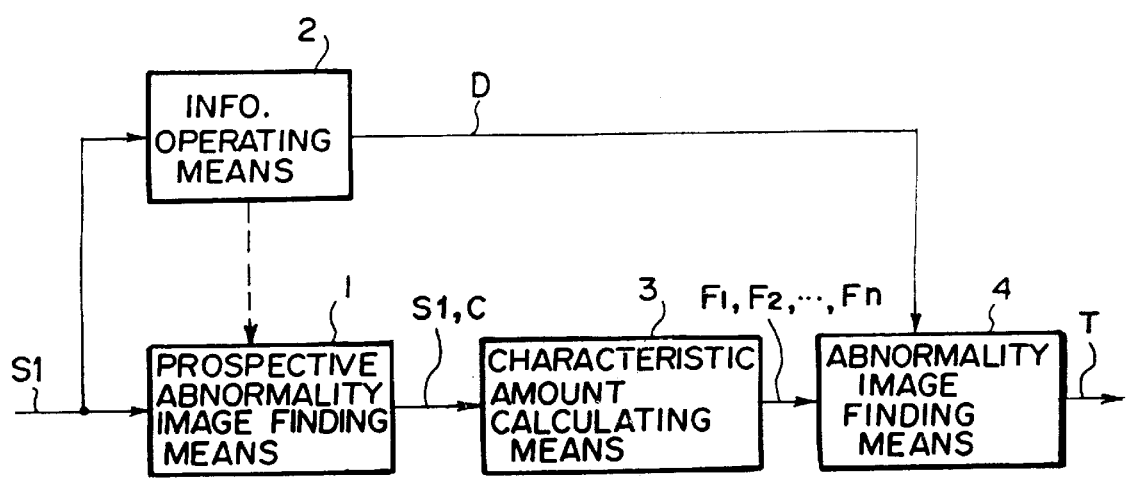
FIG. 1 is a block diagram showing the first abnormal pattern detecting apparatus in accordance with the present invention.

The image signal S1, which is a digital electric signal representing the X-ray image shown in FIG. 3, is fed into the prospective abnormal pattern finding means 1 and the information operating means 2 shown in FIG. 1. Examples of the operations carried out by the prospective abnormal pattern finding means 1 will first be described below, and examples of the operations carried out by the information operating means 2 will then be described below.

In the embodiment described below, an image of a tumor, which typically has an approximately spherical shape in the lungs of a human body, is detected as an abnormal pattern from the X-ray image. In a visible image reproduced from the image signal S1, the tumor image typically appears as an approximately circular pattern having a lower density than the areas of the image surrounding the tumor image.

Prospective abnormal pattern finding means

Figure 5:
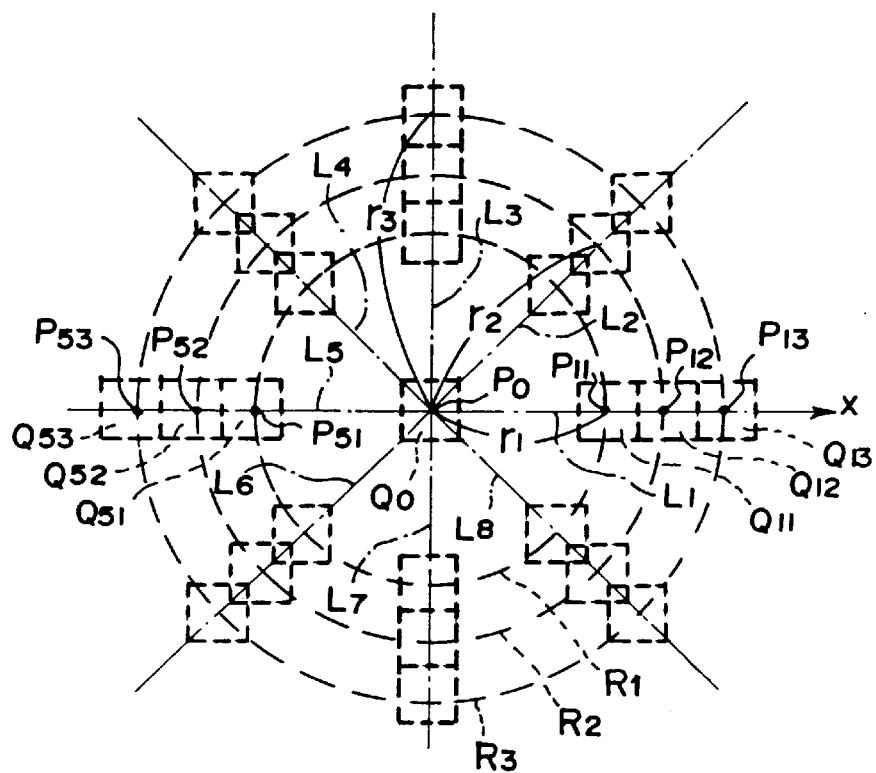
FIG. 5 is a diagram having a predetermined picture element P0 from an X-ray image in the middle, which diagram serves as an aid in explaining how a spatial-domain filter works, the spatial-domain filter being employed to find a tumor image in the embodiment of the first abnormal pattern detecting apparatus in accordance with the present invention.

FIG. 5 is a diagram having a predetermined picture element P0 from an X-ray image in the middle, which diagram serves as an aid in explaining how a spatial-domain filter works, the spatial-domain filter being employed to find a tumor image in the prospective abnormal pattern finding means 1. A judgment is made as to whether a predetermined picture element P0 in the X-ray image falls or does not fall within the region corresponding to the tumor image in the X-ray image. The tumor image in the X-ray image can be detected by processing the image signal components representing the picture elements of the X-ray image with the filter illustrated in FIG. 5.

Figure 6:
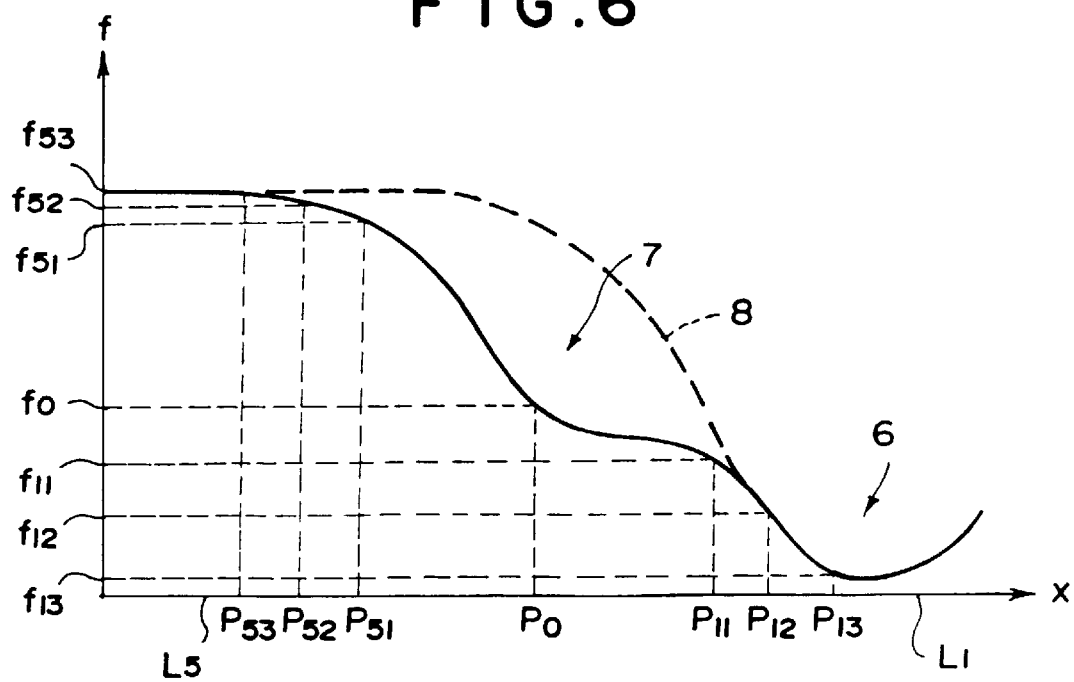
FIG. 6 is a graph showing an example of he profile of an X-ray image around a predetermined picture element P0 in the direction (x direction) along which the lines L1 and L5 shown in FIG. 5 extend.

FIG. 6 is a graph showing an example of the profile of an X-ray image around a predetermined picture element P0 in the direction (x direction) along which the lines L1 and L5 shown in FIG. 5 extend. In this example, the predetermined picture element P0 is located approximately at the middle of a tumor image 7, which is close to a rib image 6. Typically, the profile of a tumor image (i.e. the distribution of the values of the image signal components representing the tumor image) is approximately symmetric bilaterally. However, in cases where, for example, the tumor image 7 is close to a rib image 6 as in the illustrated example, it often occurs that the profile of the tumor image 7 is not symmetric bilaterally. It is important that the tumor image 7 can be detected even in such cases. In FIG. 6, the broken line 8 represents an example of the profile of an X-ray image including no tumor image.

As shown in FIG. 5, a plurality of (in this case, eight) imaginary lines Li, where i=1, 2, . . . , 8, extend from the predetermined picture element P0 in the X-ray image to peripheral parts of the X-ray image. Also, imaginary circles Rj, where j=1, 2, 3, having radii r1, r2, and r3 extend around the predetermined picture element P0. The image signal component f0 representing the predetermined picture element P0 is found. Also, the image signal components fij are found which represent the picture elements Pij located at the intersections of each of the lines Li and the circles Rj. (In FIG. 5, P11, P12, and P13 denote picture elements located at the intersections of a line L1 and circles R1, R2, and R3. Also, P51, P52, and P53 denote the picture elements located at the intersections of a line L5 and the circles R1, R2, and R3.)

Thereafter, differences $\Delta ij$ between the value of the image signal component f0 representing the predetermined picture element P0 and the values of the image signal components fij representing the picture elements Pij are calculated from Formula (3), which is expressed as $$\Delta ij = fij - f0 \tag{3}$$

(i=1,2, . . . ,8; j=1,2,3)

For each of the lines Li, the maximum value of the differences $\Delta ij$, which have been calculated from Formula (3), is then found. Specifically, for the line L1, the maximum value of the differences between the value of the image signal component f0 representing the predetermined picture element P0 and the values of the image signal components f11, f12, and f13 representing the picture elements P11, P12, and P13 is found. The differences can be expressed as $$\Delta 11 = f11 - f0$$

$$\Delta 12 = f12 - f0$$

$$\Delta 13 = f13 - f0$$

In this example, as illustrated in FIG. 6, $\Delta 13 < \Delta 12 < \Delta 11 < 0$, and therefore the difference $\Delta 11$ is found to be the maximum value.

For the line L5, the maximum value of the differences between the value of the image signal component f0 representing the predetermined picture element P0 and the values of the image signal components f51, f52, and f53 representing the picture elements P51, P52, and P53 is also found. The differences are expressed as $$\Delta 51 = f51 - f0$$

$$\Delta 52 = f52 - f0$$

$$\Delta 53 = f53 - f0$$

In this example, the difference $\Delta 53$ is found to be the maximum value.

In the manner described above, for each of the lines Li, the differences between the value of the image signal component f0 representing the predetermined picture element P0 and the values of the image signal components fij representing the picture elements Pij are calculated, and the maximum value of the differences is found. Therefore, tumor images having various sizes can be detected.

Thereafter, calculations are made to find the mean-level value, for example, the mean value, of two maximum values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is given by the formula $$M15 = \frac{\Delta 11 + \Delta 53}{2} \tag{4}$$

As described above, two lines extending from the predetermined picture element P0 in opposite directions are grouped into a single set. Therefore, a tumor image can be detected accurately even when, as shown in FIG. 6, it is present in the vicinity of, for example, a rib image and the distribution of the values of the image signal components representing the tumor image is asymmetric.

From the mean values M15, M26, M37, and M48, which have been calculated in the manner described above, a characteristic value C1 is calculated in the manner described below. The characteristic value C1 is used during the judgment as to whether the predetermined picture element P0 falls or does not fall within the region corresponding to the tumor image.

Figure 7:
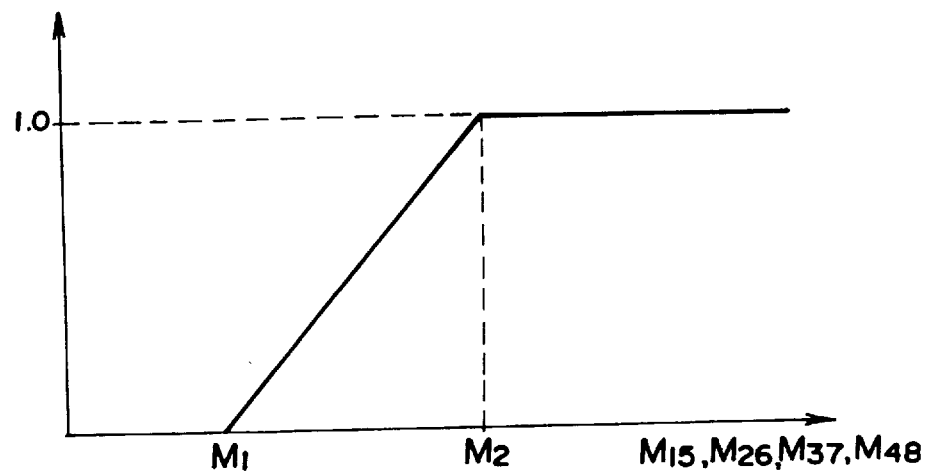
FIG. 7 is a graph showing how a characteristic value is determined which is used during a judgment as to whether a predetermined picture element P0 falls or does not fall within the region corresponding to a tumor image.

FIG. 7 is a graph showing how the characteristic value C1 is determined. In FIG. 7, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C1=C15+C26+C37+C48 \tag{5}$$

is taken as the characteristic value C1. The characteristic value C1 will fall within the range of a minimum value 0.0 to a maximum value 4.0.

The characteristic value C1 is then compared with a predetermined threshold value Th1. From whether C1≧Th1 or C1<Th1, the judgment is made as to whether the predetermined picture element P0 falls or does not fall within the region corresponding to the tumor image.

The tumor image in the X-ray image can be found by processing the image signal components representing the picture elements of the X-rays with the spatial-domain filter described above, i.e. by making judgments as to whether predetermined picture elements in the X-ray image fall or do not fall within the region corresponding to the tumor image. During the processing with the filter, images which do not actually correspond to tumor images will also be found. Therefore, the patterns, which have been found with the processing, will herein be referred to as the prospective tumor images.

No limitation is imposed on the type of the filter, which is employed to detect the prospective tumor images in the prospective abnormal pattern finding means 1 shown in FIG. 1. Another example of the filter will be described hereinbelow.

Specifically, calculations are made to find the gradients $\nabla fij$ of the image signal components fij representing the picture elements Pij, where i=1, 2, . . . , 8 and j=1, 2, 3, which are shown in FIG. 5.

The term "gradient" as used herein means the vector expressed as $$\nabla f(m,n)=(f(m+1,n)-f(m,n),f(m,n+1)-f(m,n)) \tag{6}$$

In Formula (6), (m,n) denotes the x and y coordinates of a certain picture element P in a radiation image, (m+1,n) denotes the coordinates of a picture element P', which is adjacent to the picture element P in the x direction, and (m,n+1) denotes the coordinates of a picture element P", which is adjacent to the picture element P in the y direction. Also, f(m,n), f(m+1,n), and f(m,n+1) respectively denote the values of the image signal components representing the picture elements P, P', and P".

Figure 8:
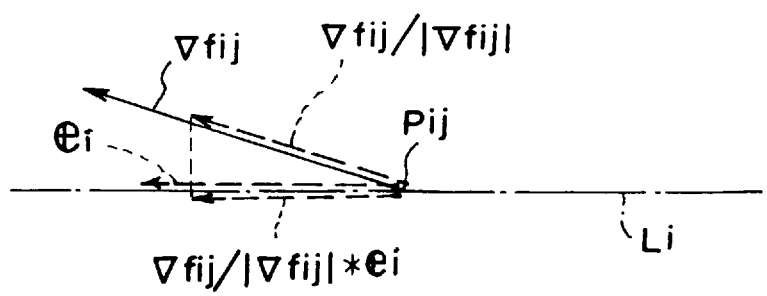
FIG. 8 is an explanatory view showing the vector of a gradient $\nabla f_{ij}$ of an image signal component $f_{ij}$.

FIG. 8 shows the gradient of an image signal component fij. How it is calculated is described below.

After the gradients $\nabla fij$ have been calculated, the magnitudes of the gradients $\nabla fij$ are made equal to 1.0. Specifically, the normalized gradients $\nabla fij/|\nabla fij|$ can be calculated by dividing the gradients $\nabla fij$ by their magnitudes $|\nabla fij|$.

Thereafter, the projections of the normalized gradients $\nabla fij/|\nabla fij|$ onto the vectors directed from the picture elements Pij to the predetermined picture element P0 are calculated. The projections are expressed as $\nabla fij/|\nabla fij|*ei$, where ei denotes the unit vectors directed from the picture elements Pij to the predetermined picture element P0, and * denotes the inner product.

As for the sign of the projections, the direction heading towards the predetermined picture element P0 is taken as positive, and the direction heading away from the predetermined picture element P0 is taken as negative. For each of the lines Li, where i=1, 2, . . . , 8, the maximum value of the projections is found. The maximum value is expressed as $$\{\nabla fij/|\nabla fij|* \text{e } i\}_M (i=1,2,\ldots,8)$$

Thereafter, the sum of the maximum values which were found for each of the respective lines Li is calculated. This sum is expressed as $$\sum_{i=1}^{8} \{\nabla fij/|\nabla fij|*ei\}_M$$

The sum expressed as $$\sum_{i=1}^{8} \{\nabla fij/|\nabla fij\nabla*ei\}_M$$

is taken as a characteristic value C2. The characteristic value C2 is then compared with a predetermined threshold value Th2. From whether C2≧Th2 or C2<Th2, a judgment is made as to whether the predetermined picture element P0 falls or does not fall within the region corresponding to the tumor image.

With the filter described above, the gradients $\nabla fij$ are normalized, and only the projections thereof (i.e. the extent of differences in the value of the signal components in the directions of the lines Li) onto vectors directed from the picture elements Pij to the predetermined picture element P0 are taken into consideration. Therefore, a characteristic value C2 is obtained, which will be large for a tumor image having a circular shape and which does not depend on the contrast of the tumor image with respect to the image regions around the tumor image. Accordingly, the tumor image can be detected accurately.

A further example of the filter, which can be employed in the prospective abnormal pattern finding means 1 shown in FIG. 1 will be described hereinbelow.

As shown in FIG. 5, the area of a center region Q0 including the predetermined picture element P0 is selected. Also, the areas of peripheral regions Qij, where i=1, 2, . . . , 8 and j=1, 2, 3, are selected for each of the lines Li. Each of the peripheral regions Qij includes one of a plurality of picture elements Pij, where i=1, 2, . . . , 8 and j=1, 2, 3. (In FIG. 5, Q11, Q12, Q13, Q51, Q52, and Q53 denote the peripheral regions which respectively include the picture elements P11, P12, P13, P51, P52, and P53.)

Thereafter, a calculation is made to find a mean-level value Q0 of the values of image signal components representing a plurality of picture elements, which are located in the center region Q0. Also, calculations are made to find mean-level values Qij, where i=1, 2, . . . , 8 and j=1, 2, 3, each representing the mean level of the values of image signal components representing a plurality of picture elements located in each of the peripheral regions Qij, where i=1, 2, . . . , 8 and j=1, 2, 3. As an aid in facilitating the explanation, Q0 represents both the center region and the mean-level value of the values of image signal components representing the picture elements, which are located in the center region. Also, Qij, where i=1, 2, . . . , 8 and j=1, 2, 3, represents both the peripheral regions and the mean-level values representing the mean level of the values of the image signal components representing the picture elements, which are located in each of the peripheral regions.

Thereafter, differences Δij, where i=1, 2, . . . , 8 and j=1, 2, 3, between the mean-level value Q0 corresponding to the center region and the respective mean-level values Qij corresponding to the peripheral regions are calculated from the formula $$\Delta ij=Qij-Q0 \tag{7}$$

For each of the lines Li, the maximum value Δi of the differences Δij is then found. Specifically, as for he line L1, a maximum value Δ1 is found from Δ11, Δ12, and Δ13. As for the line L5, a maximum value Δ5 is found from Δ51, Δ52, and Δ53.

A first characteristic value U is then found, which is representative of the maximum values Δi, where i=1, 2, ..., 8, which have been found for the plurality of the lines Li. Also, a second characteristic value V is found, which represents the amount of dispersion in the maximum values Δi, where i=1, 2, ..., 8. For this purpose, first, characteristic values U1, U2, U3, and U4, and characteristic values V1, V2, V3, and V4 are calculated from the formulas $$U1=(\Delta 1+\Delta 2+\Delta 5+\Delta 6)/4 \tag{8}$$

$$U2=(\Delta 2+\Delta 3+\Delta 6+\Delta 7)/4 \tag{9}$$

$$U3=(\Delta 3+\Delta 4+\Delta 7+\Delta 8)/4 \tag{10}$$

$$U4=(\Delta 4+\Delta 5+\Delta 8+\Delta 1)/4 \tag{11}$$

$$V1=U1/U3 \tag{12}$$

$$V2=U2/U4 \tag{13}$$

$$V3=U3/U1 \tag{14}$$

$$V4=U4/U2 \tag{15}$$

By way of example, the process for calculating the characteristic value U1 from Formula (8) has the effects described below. Specifically, the addition of the maximum values corresponding to two adjacent groups of peripheral regions, which are located on the same side with respect to the predetermined picture element P0, (i.e. the addition of Δ1 and Δ2, or the addition of Δ5 and Δ6) corresponds to a smoothing process. Also, the maximum values corresponding to peripheral regions, which are located on opposite sides with respect to the predetermined picture element P0, are added together (in the case of Formula (8), the sum of Δ1 and Δ2 and the sum of Δ5 and Δ6 are added together). Such an addition is carried out in order that a tumor image can be detected even when, as shown in FIG. 6, the distribution of the values of the image signal components representing the tumor image is asymmetric.

As for the calculation of the characteristic value V1 from Formula (12), the characteristic values U1 and U3 represent characteristics of the image in directions which are perpendicular to each other. Therefore, in cases where the shape of the tumor image is circular in FIG. 6, V1 will be approximately equal to 1.0. In cases where the predetermined picture element P0 is present in a linear image, such as a rib image, V1 will not be equal to 1.0.

As the first characteristic value U, which is representative of the maximum values Δi, where i=1, 2, ..., 8, of the aforesaid differences, the maximum value of the characteristic values U1, U2, U3, and U4, i.e.

$$U=\text{MAX}(U1,U2,U3,U4) \tag{16}$$

is employed. Also, as the second characteristic value V, which represents the amount of dispersion in the maximum values Δi, where i=1, 2, ..., 8, of the aforesaid differences, the maximum value of the characteristic values V1, V2, V3, and V4, i.e.

$$V=\text{MAX}(V1,V2,V3,V4) \tag{17}$$

is employed. After the first characteristic value U and the second characteristic value V have been found in the manner described above, a characteristic value C3 is calculated and then used during the judgment as to whether a predetermined picture element P0 falls or does not fall within the region corresponding to the tumor image. As the characteristic value C3, the ratio of the first characteristic value U to the second characteristic value V is employed, which is expressed as $$C3=\frac{U}{V} \tag{18}$$

The characteristic value C3 is then compared with a predetermined threshold value Th3. From whether C3≧Th3 or C3<Th3, the judgment is made as to whether the predetermined picture element P0 falls or does not fall within the region corresponding to the tumor image.

As described above, in the prospective abnormal pattern finding means 1 of the computer system 40 shown in FIG. 4, the image signal representing the X-ray image is processed with the spatial-domain filter, and a circular pattern, which is considered to be a tumor image, is detected.

In the examples of the filters described above, eight imaginary lines, L1 through L8, are drawn around a predetermined picture element P0 in an X-ray image. However, the number of lines Li is not limited to eight, but may, for example, be 16. Also, the distances from the predetermined picture element P0 are not limited to the three distances (r1, r2, and r3). For example, in cases where the sizes of the tumor images, which are to be detected, are approximately the same, only a single distance need be employed. Also, in order for tumor images having various sizes to be detected more accurately, operations may be carried out for a plurality of distances whose lengths vary approximately continuously between the length of the distance r1 and the length of the distance r3.

Also, the prospective abnormal pattern finding means 1 may employ any of other filters. However, it is desirable that all of the prospective abnormal patterns can be found regardless of whether noise (for example, patterns which are not actually the tumor images) is found together with them. Therefore, the prospective abnormal pattern finding means 1 should preferably employ a filter suitable for this purpose.

During the processing of the image signal with one of the filters described above, it will often occur that regions composed of many linear patterns, such as blood vessel images, are also found as the prospective tumor images. Therefore, after finding the prospective tumor images, the prospective abnormal pattern finding means 1 eliminates such regions from the prospective tumor images.

Figure 9A:
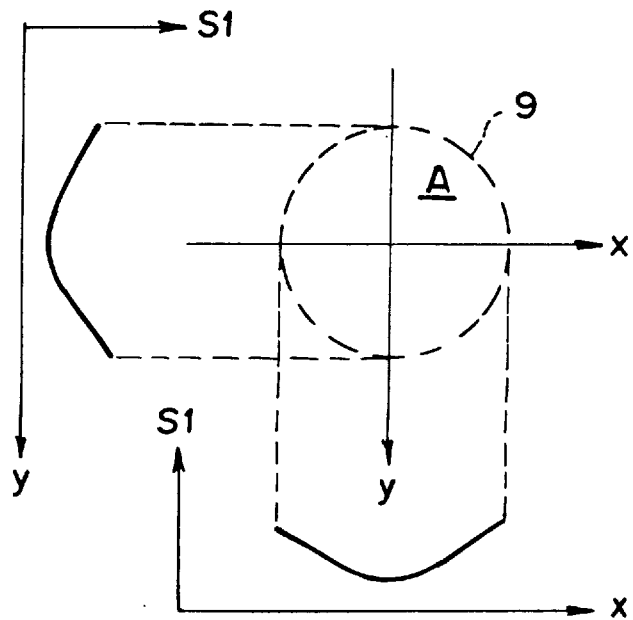
FIG. 9A is a diagram showing a region found as a prospective tumor image, which region corresponds to a true tumor image, and profiles of the X-ray image in the region along the x and y directions.
Figure 9B:
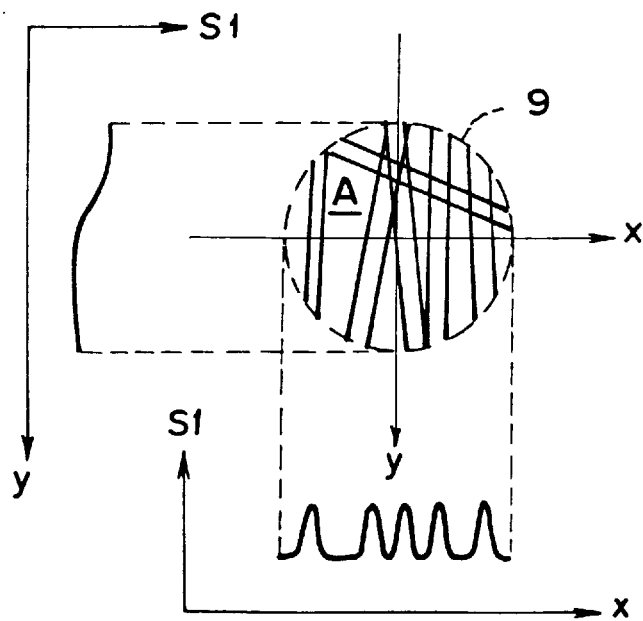
FIG. 9B is a diagram showing a region found as a prospective tumor image, which region is composed of many linear patterns, such as blood vessel images, and profiles of the X-ray image in the region along the x and y directions.

FIG. 9A is a diagram showing a region found as a prospective tumor image, which region corresponds to a true tumor image, and profiles of the X-ray image in the region along the x and y directions. FIG. 9B is a diagram showing a region found as a prospective tumor image, which region is composed of many linear patterns, such as blood vessel images, and profiles of the X-ray image in the region along the x and y directions. In each of FIGS. 9A and 9B, the region surrounded by the broken line 9, i.e. the region A, is the one which has been found as a prospective tumor image. The graphs show the profiles of the X-ray image (i.e. the distributions of the values of the image signal S1) in the region A along the x and y directions.

As shown in FIG. 9A, a tumor image has concave, comparatively flat profiles in the x and y directions. On the other hand, as shown in FIG. 9E, in a region composed of many linear patterns, the image profile in one direction (x direction in FIG. 9B) changes at short intervals, and the image profile in the other direction (y direction in FIG. 9B)

is comparatively flat. Therefore, the difference in image profile is utilized during the elimination of regions, which are composed of many linear patterns, from the prospective tumor images. Specifically, a mean value is calculated from the square values of first-order differences between the values of image signal components representing adjacent picture elements, which are located along each of the x and y directions in the region A. The calculations are carried out with the formulas $$Zx = \underset{(m,n)\subseteq A}{\sum\sum_{m\ n}} \{f(m+1, n) - f(m, n)\}^2/N \qquad (19)$$

$$Zy = \underset{(m,n)\subseteq A}{\sum\sum_{m\ n}} \{f(m, n+1) - f(m, n)\}^2/N \qquad (20)$$

In Formulas (19) and (20), m, where m=1, 2, ..., denotes picture elements located along the x direction, and n, where n=1, 2, ..., denotes picture elements located along the y direction. Also, f(m,n) denotes the values of image signal components representing the picture elements (m,n). Further, $$\underset{(m,n)\subseteq A}{\sum\sum_{m\ n}}$$

denotes the addition of the square values of first-order differences in the region A, and N denotes the number of picture elements in the region A.

Thereafter, a calculation is made to find a characteristic value C4 which is used during the judgment as to whether a region is or is not to be eliminated from the prospective tumor images. The calculation is carried out with the formula $$C4 = \frac{\min(Zx, Zy)}{\max(Zx, Zy)} \qquad (21)$$

where min(Zx,Zy) denotes the mean value Zx or the mean value Zy, whichever is smaller, and max(Zx,Zy) denotes the mean value Zx or the mean value Zy, whichever is larger. The characteristic value C4 is then compared with a predetermined threshold value Th4. When C4≧Th4, the region is not eliminated from the prospective tumor images. When C4<Th4, the region is eliminated from the prospective tumor images.

The characteristic value C4 need not necessarily be calculated with Formula (21), but may be calculated with, for example, one of the formulas $$C4 = \frac{|Zx - Zy|}{Zx + Zy} \qquad (22)$$

$$C4 = |Zx - Zy| \qquad (23)$$

Also, in the example described above, calculations are carried out to find the first-order differences f(m+1,n)−f(m, n), f(m,n+1)−f(m,n) between the values of image signal components representing adjacent picture elements, which are located along each of the x and y directions in the region A. Alternatively, calculations may be made to find differences between the values of image signal components representing adjacent picture elements, which are located in the region A along oblique directions, which are not perpendicular to the x direction nor to the y direction.

In the manner described above, the prospective abnormal pattern finding means 1 of the computer system 40 shown in FIG. 4 finds the prospective tumor images by processing the image signal representing the X-ray image with the spatial-domain filter. Thereafter, the prospective abnormal pattern finding means 1 judges, from the characteristic value C4 calculated with Formula (21), whether a region, which has been found as a prospective tumor image, is or is not to be eliminated from the prospective tumor images. A value of 1 is then allocated to image signal components representing the picture elements located in the regions corresponding to the remaining prospective tumor images, and a value of 0 is allocated to image signal components representing the picture elements located in image areas outside of said regions corresponding to the remaining prospective tumor images. In this manner, a binary image signal is obtained. The prospective tumor images, which remain uneliminated during the judgments using the characteristic values C4 calculated with Formula (21), will hereinafter be referred to as the prospective tumor images found by the prospective abnormal pattern finding means 1.

Information operating means

An example of the information operating means 2 will be described hereinbelow.

The lung region image 15 shown in FIG. 3 comprises an image of the hilum of the lung 15a, which is located in the middle, and images of the lung fields 15b, 15b, which are indicated by the hatching and which are located on both sides of the lung hilum image 15a. In the lung region image 15, a tumor image appears more easily in the lung field images 15b, 15b than in the lung hilum image 15a. Therefore, the information operating means 2 discriminates the lung hilum image 15a and the lung field images 15b, 15b from each other. The information, which is obtained from the information operating means 2 and which discriminates the lung hilum image 15a and the lung field images 15b, 15b from each other, is utilized when the abnormal pattern finding means 4 finds a tumor image from the prospective tumor images, as will be described later.

Figure 10:
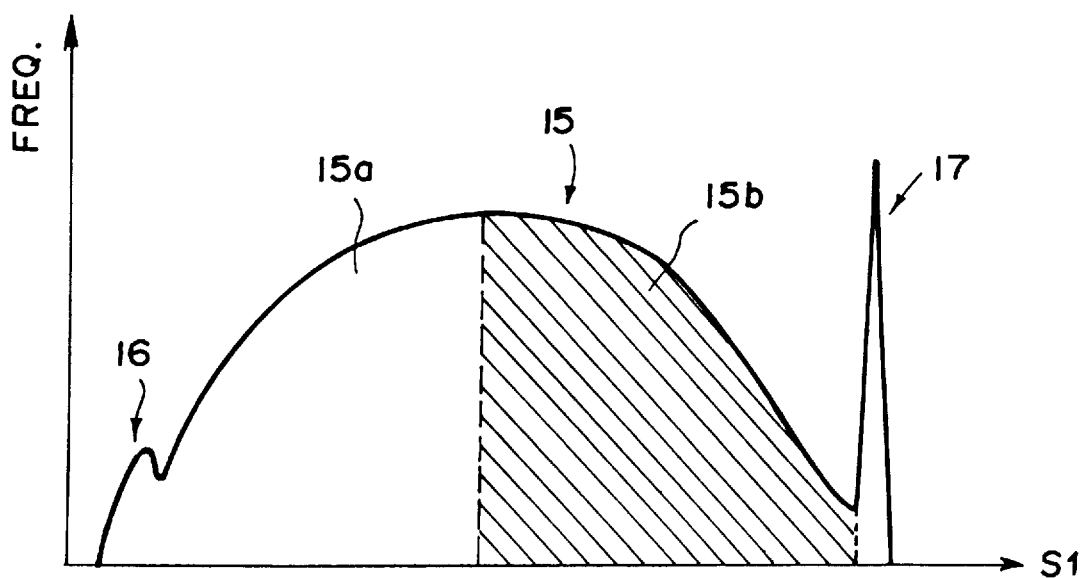
FIG. 10 is a graph showing a probability density function of an image signal detected from the X-ray image shown in FIG. 3.

FIG. 10 is a graph showing a probability density function of the image signal S1, which has been detected from the X-ray image shown in FIG. 3. In FIG. 10, the horizontal axis indicates the value of the image signal S1, and the vertical axis indicates the frequency of occurrence of the value of the image signal S1.

With reference to FIG. 10, a projecting part 17, which is present on the right side, corresponds to the background region 17 shown in FIG. 3. A projecting part 15 in the middle corresponds to the lung region image 15 shown in FIG. 3. Also, a projecting part 16 on the left side corresponds to the skin image 16 shown in FIG. 3. As an aid in facilitating the explanation, in FIG. 10, the projecting parts corresponding to the regions shown in FIG. 3 are numbered with corresponding reference numerals.

It has experimentally been found that the ratio of the areas of the lung field images 15b, 15b to the area of the lung region image 15 is approximately constant. Therefore, a region, which corresponds to a predetermined proportion (e.g. 50%) with respect to the total area of the projecting part 15, is found from the high density side. Specifically, the region hatched in FIG. 10 is found. A group of the picture elements, which correspond to the image signal components falling within the thus found region, is detected to be those of the lung field images 15b, 15b.

Figure 11:
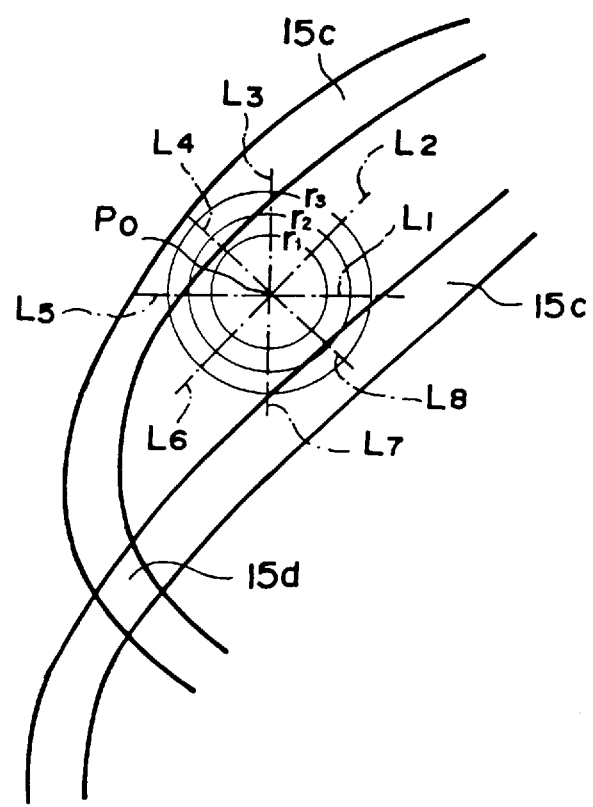
FIG. 11 is an enlarged view showing part of rib images (not shown in FIG. 3) in the X-ray image of the chest shown in FIG. 3.

FIG. 11 is an enlarged view showing part of rib images (not shown in FIG. 3) in the X-ray image of the chest shown in FIG. 3. In FIG. 11, the filter of FIG. 5 is also shown.

As shown in FIG. 11, the X-ray image of the chest includes an intersection 15d of two rib images 15c, 15c. If often occurs that the region corresponding to the intersection 15d is found as a prospective tumor image by the prospective abnormal pattern finding means 1. The image profile in the region corresponding to the intersection 15d is approximately flat. Therefore, during the judgment using the characteristic value C4 calculated with Formula (21), the region corresponding to the intersection 15d will not be eliminated from the prospective tumor images. Accordingly, the information operating means 2 also finds rib images. The information about the rib images is fed into the abnormal pattern finding means 4. In the course of finding a tumor image from the prospective tumor images, the abnormal pattern finding means 4 finds a prospective tumor image, which coincides with the region corresponding to the intersection 15d, not to be a tumor image.

By way of example, in order for the rib images 15c, 15c to be found, a method may be employed which is described in "Discrimination of Rib Images in X-ray Fluorographic Image of the Chest", The Institute of Electronics and Communication Engineers of Japan, Oct. 26, 1972, material No. IT72-24 (1972-10) of the society for the study of image engineering. With the method, a linear figure is extracted by processing an image signal representing an X-ray image of the chest with a filter, which is sensitive to lines. From the position of the linear figure in the X-ray image, the direction along which the linear figure extends, or the like, lines corresponding to a rib image are detected. Thereafter, boundary lines of the rib image are approximately represented by a function of second order. In this manner, a rib image is extracted.

In the manner described above, the information operating means 2 of the computer system 40 shown in FIG. 4 discriminates the lung hilum image 15a and the lung field images 15b, 15b from each other, and finds the rib images 15c, 15c. The anatomical information D, which discriminates the lung hilum image 15a and the lung field images 15b, 15b from each other, and which represents the rib images 15c, 15c, is fed into the abnormal pattern finding means 4. No limitation is imposed on how a lung hilum image and the lung field images are discriminated from each other, and how rib images are found. Any of other methods may be employed for these purposes.

The information operating means 2 may find various kinds of anatomical information in addition to or in lieu of the aforesaid anatomical information D in accordance with the type of abnormal patterns which are to be found, the level of accuracy required in the finding of abnormal patterns, or the like.

Characteristic measure calculating means

The information about the prospective tumor images C, C, . . . , which have been found by the prospective abnormal pattern finding means 1, is fed into the characteristic measure calculating means 3 of the computer system 40. From the image signal components of the image signal S1, which represent the image information at positions in the vicinity of each of the prospective abnormal patterns C, C, . . . , the characteristic measure calculating means 3 calculates a plurality of characteristic measures F1, F2, . . . , Fn for each of the prospective abnormal patterns C, C, . . . In this embodiment, the area F1 and the shape F2 of each prospective abnormal pattern C and the contrast F3 of each prospective abnormal pattern C with the surrounding image areas are calculated as the characteristic measures in the manner described below.

Figure 12:
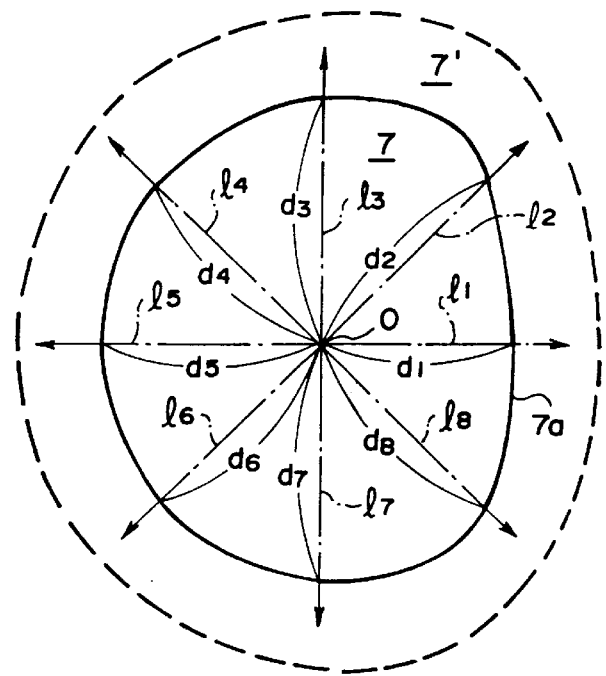
FIG. 12 is a diagram showing an example of a prospective tumor image which has been found by a prospective abnormal pattern finding means.

FIG. 12 is a diagram showing an example of a prospective tumor image C which has been found by the prospective abnormal pattern finding means 1. In FIG. 12, a region 7 illustrated in the middle corresponds to a prospective tumor image C.

In cases where the area of a prospective tumor image C is small (e.g. not larger than 25 mm$^2$), it will probably be an image of a blood vessel, which extends in the direction normal to the plane of the sheet of FIG. 3, i.e. in the direction along which the X-rays were irradiated. Particularly, when the contrast F3 of the prospective tumor image C with the surrounding image areas is high, the probability of the prospective tumor image C being of such a blood vessel is high. Also, ordinarily, the diameters of prospective tumor images C, C, . . . range from approximately 10 mm to approximately 40 mm. Most of prospective tumor images, which have diameters far larger than 40 mm, are not true tumor images.

Accordingly, in this embodiment, the area F1 of the region 7 is calculated and used as one of a plurality of characteristic measures which represent the probability that the prospective tumor image C will be a true tumor image.

Also, in this embodiment, a tumor image, which appears typically as a circular pattern in an X-ray image, is found. Therefore, a measure, which represents the level of circularity (i.e. the shape) of a prospective tumor image, is employed as another one of the characteristic measures. Specifically, a value of 1 is allocated to image signal components representing the picture elements located in the region 7, and a value of 0 is allocated to image signal components representing the picture elements located in image areas outside of the region 7. In this manner, a binary image signal is obtained. From the binary image signal, the center of gravity O on the region 7 is detected. A plurality of imaginary lines (l1 through l8 in FIG. 12) are then drawn. The imaginary lines extend from the position, at which the center of gravity O is located, to the surrounding image areas. Thereafter, along the lines li, where i=1, 2, . . . , 8, distances di, where i=1, 2, . . . , 8, from the position, at which the center of gravity O is located, to an edge 7a of the region 7 are calculated along the lines li, where i=1, 2, . . . , 8. Variance F2 is then calculated with the formula $$F2 = \sum_{i=1}^{8} \left( di - \frac{1}{8} \sum_{i=1}^{8} di \right)^2 \quad (24)$$

The variance F2 is employed as the characteristic measure, which represents the level of circularity (i.e. the shape) of the prospective tumor image C.

Also, calculations are made to find a mean value Av1 from the values of the image signal components of the image signal S1 corresponding to the region 7 of the prospective tumor image C, and to find a mean value Av2 from the values of the image signal components of the image signal S1 corresponding to a belt-like region 7', which has a predetermined width and which surrounds the region 7. From the mean values Av1 and Av2, the contrast F3 is calculated with the formula $$F3 = AV1 - Av2 \quad (25)$$

The contrast F3 is employed as a further characteristic measure.

A tumor image appears in an X-ray image as a projected image of an approximately spherical tumor in the lungs. Therefore, in many cases, a contrast F3 of a tumor image with the surrounding image areas takes a value close to a predetermined value. Most of prospective tumor images, which have very lower or higher levels of contrast than the predetermined value, are not true tumor images. Therefore, the contrast F3 can be employed as a characteristic measure.

In addition to or in lieu of the characteristic measures F1, F2, and F3, various other characteristic measures may be employed in accordance with the type of abnormal patterns which are to be found, the level of accuracy required in the finding of abnormal patterns, or the like.

abnormal pattern finding means

The information about the characteristic measures F1, F2, and F3, which have been calculated by the characteristic measure calculating means 3, is fed into the abnormal pattern finding means 4 of the computer system shown in FIG. 4. In this embodiment, the abnormal pattern finding means 4 utilizes the characteristic measures F1, F2, and F3 in order to find a prospective tumor image, which has a high probability of being a true tumor image, from the prospective abnormal patterns C, C, . . . , which have been found by the prospective abnormal pattern finding means 1. A neural network is utilized for this purpose.

Figure 13:
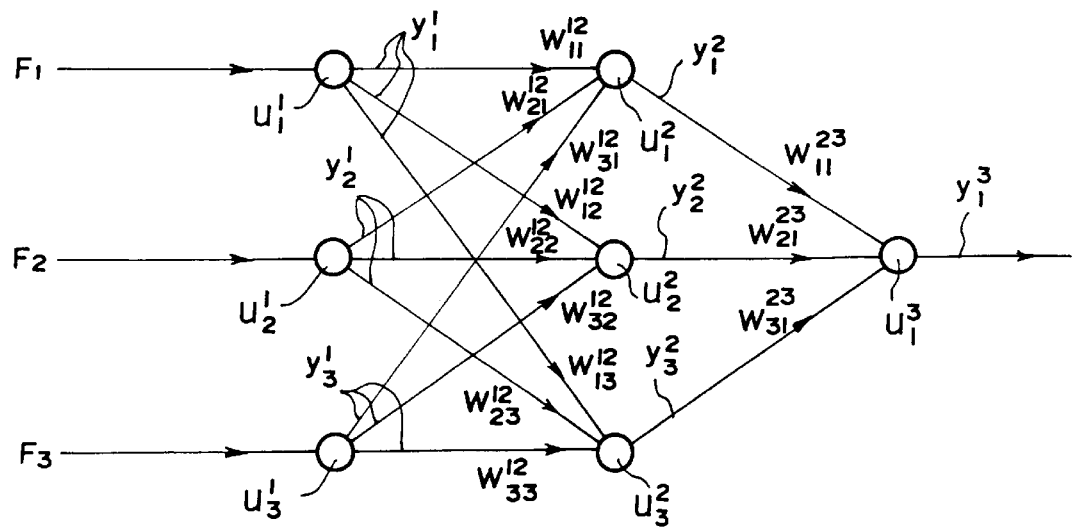
FIG. 13 is an explanatory view showing an example of a neural network which is provided with a function of learning representations by back-propagating errors and which is employed in an abnormal pattern finding means.

FIG. 13 is an explanatory view showing an example of the neural network which is provided with a function of learning representations by back-propagating errors and which is employed in the abnormal pattern finding means 4. As described above, the term "function of learning representations by back-propagating errors" as used herein means the learning algorithms in a neural network, with which the output of the neural network is compared with a correct answer (an instructor signal), and the weight of connections (i.e. the weight of synapse connections) is corrected sequentially from the output side to the input side of the neural network.

With reference to FIG. 13, the neural network comprises a first layer (input layer), a second layer (hidden layer), and a third layer (output layer). The first, second, and third layers are composed respectively of three units, three units, and a single unit. An i'th unit of a k'th layer is indicated by $u_i^k$. The total input into the unit $u_i^k$ is indicated by $x_i^k$, and the total output therefrom is indicated by $y_i^k$. The weight of connection from the unit $u_i^k$ to a unit $u_j^{k+1}$ is indicated by $W_{ij}^{k\,k+1}$. Also, each unit $u_j^k$ has the same characteristic function, which is expressed as $$f(x) = \frac{1}{1 - e^x} \quad (26)$$

The input $x_j^k$ into each unit $u_j^k$ and the output $y_j^k$ therefrom are expressed as $$x_j^k = \sum_i W_{ij}^{k-1\,k} \cdot y_i^{k-1} \quad (27)$$

$$y_j^k = f(x_j^k) \quad (28)$$

Inputs F1, F2, and F3 into the units $u_i^1$, where i=1, 2, 3, which units constitute the input layer, are fed into the units without being weighted. The inputs (the information about the characteristic measures) F1, F2, and F3 are weighted with the weights of connection $W_{ij}^{k\,k+1}$, and transmitted to the ultimate output $y_1^3$.

How the weights of connection $W_{ij}^{k\,k+1}$ are determined will be described hereinbelow. First, initial values of the weights of connection $W_{ij}^{k\,k+1}$ are given by random numbers. The range of the random numbers should preferably be limited such that, even when the values of the inputs F1, F2, and F3 fluctuate to the largest extent, the output $y_1^3$ takes a value falling within the range of 0 to 1 or a value close to said value.

Thereafter, a plurality of X-ray images are prepared, for which the presence or absence of tumor images and the positions of the tumor images are known. Prospective tumor images C, C, . . . are found from the X-ray images in the same manner as that described above. Also, three characteristic measures F1, F2, and F3 are calculated for each prospective tumor image C. The information about the three characteristic measures F1, F2, and F3 is fed into the neural network shown in FIG. 13, and the outputs $y_i^k$ of the respective units $u_i^k$ are monitored.

After the outputs $y_i^k$ are obtained, a square error E between the value of the ultimate output $y_1^3$ and the value of an instructor signal d is calculated with the formula $$E = \frac{1}{2}(y_1^3 - d)^2 \quad (29)$$

The instructor signal d has a value of 1 in cases where the prospective tumor image C, which corresponds to the characteristic measures F1, F2, and F3, is a true tumor image. (As described above, it is already known whether the prospective tumor image C is or is not a true tumor image.) Also, the instructor signal d has a value of 0 in cases where the prospective tumor image C is not a true tumor image. The weights of connection $W_{ij}^{k\,k+1}$ are then corrected such that the square error E becomes the smallest.

The square error E is a function of $W_{ij}^{k\,k+1}$. Therefore, in order for the square error E to be minimized, the weights of connection $W_{ij}^{k\,K+1}$ are corrected with the formula $$W_{ij}^{kk+1} = W_{ij}^{kk+1} - \eta \cdot \frac{\partial E}{\partial W_{ij}^{kk+1}} \quad (30)$$

where $\eta$ denotes a coefficient, which is referred to as a learning coefficient.

The following formula obtains:

$$\frac{\partial E}{\partial W_{ij}^{kk+1}} = \frac{\partial E}{\partial x_j^{k+1}} \cdot \frac{\partial x_j^{k+1}}{\partial W_{ij}^{kk+1}} \quad (31)$$

Also, Formula (27) gives $$x_j^{k+1} = \sum_i W_{ij}^{kk+1} \cdot y_i^k \quad (27)'$$

Therefore, Formula (31) gives $$\frac{\partial E}{\partial W_{ij}^{kk+1}} = \frac{\partial E}{\partial x_j^{k+1}} \cdot y_i^k \quad (32)$$

From Formula (29), the following formula obtains:

$$\frac{\partial E}{\partial x_1^3} = (y_1^3 - d) \cdot \frac{\partial y_1^3}{\partial x_1^3} \quad (33)$$

Formula (33) can be changed with Formula (28) into $$\frac{\partial E}{\partial x_1^3} = (y_1^3 - d) \cdot f'(x_1^3) \quad (34)$$

From Formula (26), the following formula obtains:

$$f'(x) = f(x)(1 - f(x)) \quad (35)$$

Therefore, $$f'(x_1^3) = y_1^3 \cdot (1 - y_1^3) \quad (36)$$

Setting k=2 in Formula (32) and substituting Formulas (34) and (36) into Formula (32) yield $$\frac{\partial E}{\partial W_{i1}^{23}} = \frac{\partial E}{\partial x_1^3} \cdot y_i^2 = (y_1^3 - d) \cdot y_1^3 \cdot (1 - y_1^3) \cdot y_i^2 \quad (37)$$

Substitution of Formula (37) into Formula (30) yields $$W_{i1}^{23} = W_{i1}^{23} - \eta \cdot (y_1^3 - d) \cdot y_1^3 \cdot (1 - y_1^3) \cdot y_i^2 \quad (38)$$

The weights of connection $W_{i1}^{23}$, where i=1, 2, 3, are corrected with Formula (38).

Also, the following formula obtains:

$$\frac{\partial E}{\partial x_j^2} = \frac{\partial E}{\partial x_1^3} \cdot \frac{\partial x_1^3}{\partial x_j^2} \tag{39}$$

Substitution of Formulas (27) and (28) into Formula (39) yields $$\frac{\partial E}{\partial x_j^2} = \frac{\partial E}{\partial x_1^3} \cdot \frac{\partial}{\partial x_j^2}\left(\sum_j W_{j1}^{23} \cdot y_j^2\right) \tag{40}$$

$$= \frac{\partial E}{\partial x_1^3} \cdot W_{j1}^{23} \cdot f'(x_j^2)$$

Formula (35) gives $$f'(x_j^2) = y_j^2 \cdot (1 - y_j^2) \tag{41}$$

Substitution of Formulas (34), (36), and (41) into Formula (40) yields $$\frac{\partial E}{\partial x_j^2} = (y_1^3 - d) \cdot y_1^3 \cdot (1 - y_1^3) \cdot y_j^2 \cdot (1 - y_j^2) \cdot W_{j1}^{23} \tag{42}$$

Setting k=1 in Formula (32) and substituting Formula (42) into Formula (32) yield $$\frac{\partial E}{\partial W_{ij}^{12}} = \frac{\partial E}{\partial x_j^2} \cdot y_i^1 \tag{43}$$

$$= (y_1^3 - d) \cdot y_1^3 \cdot (1 - y_1^3) \cdot y_j^2 \cdot (1 - y_j^2) \cdot W_{j1}^{23} \cdot y_i^1$$

Substitution of Formula (43) into Formula (30) and setting of k=1 yield $$W_{ij}^{12} = W_{ij}^{12} - \eta \cdot (y_1^3 - d) \cdot y_1^3 \cdot (1 - y_1^3) \cdot y_j^2 \cdot (1 - y_j^2) \cdot y_i^1 \cdot W_{j1}^{23} \tag{44}$$

The values of the weights of connection $W_{i1}^{23}$, where i=1, 2, 3, which have been corrected with Formula (38), are substituted into Formula (44). In this manner, the weights of connection $W_{ij}^{12}$, where i=1, 2, 3 and j=1, 2, 3, are corrected.

Theoretically, the weights of connection $W_{ij}^{k,k+1}$ can be converged to predetermined values by using a sufficiently small learning coefficient η and carrying out the learning operations very many times. However, if a sufficiently small learning coefficient η is used, the speed with which the learning operations are effected will become low. If a very large learning coefficient η is used, "vibration" will occur in the learning operations (i.e. the weights of connection do not converge to predetermined values). Therefore, actually, the vibration is prevented by employing an inertia term, which is expressed in Formula (45), in the calculations of the correction amounts for the weights of connection, and the learning coefficient η is set to a slightly large value.

$$\Delta W_{ij}^{k,k+1}(t+1) = \alpha \cdot \Delta W_{ij}^{k,k+1}(t) + \eta \cdot \frac{\partial E}{\partial x_j^{k+1}} \cdot y_i^k \tag{45}$$

where α denotes the coefficient referred to as the inertia term, and $\Delta W_{ij}^{k,k+1}(t)$ denotes the correction amount, which is used during the t'th learning operation and which is obtained by subtracting a weight of connection $W_{ij}^{k,k+1}$, which has not been corrected, from a weight of connection $W_{ij}^{k,k+1}$, which has been corrected. (Such an inertia term is described in, for example, "Learning internal representations by error propagation" Parallel Distributed Processing Chapter 8 by D. E. Rumelhart, G. E. Hinton and R. J. Williams, Volume 1, J. L. McClell and, D. E. Rumelhart and The PDP Research Group, MIT Press, 1986b.)

By way of example, the inertia term α is set to 0.9, the learning coefficient η is set to 0.25, and 200,000 times of corrections (learning operations) are carried out for each of the weights of correction $W_{ij}^{k,k+1}$. Thereafter, each of the weights of correction $W_{ij}^{k,k+1}$ is fixed at a final value. At the time at which the learning operations are completed, a value close to 1 is obtained as the output $y_1^3$ for a prospective tumor image C, which is a true tumor image. Also, a value close to 0 is obtained as the output $y_1^3$ for a prospective tumor image C, which is not a true tumor image.

Therefore, after the learning operations are completed, a prospective tumor image, for which it is unknown whether it is or is not a true tumor image, is extracted. Characteristic measures F1, F2, and F3 are calculated for the prospective tumor image, and the information about them is fed into the neural network shown in FIG. 13. The output $y_1^3$ obtained from the neural network is utilized as a signal representing the level of the probability that the prospective tumor image will be a true tumor image.

The number of layers of the neural network is not limited to three. Also, no limitation is imposed on the number of the units of each layer. The number of the units of each layer may be determined in accordance with the number of characteristic measures, which are fed into the neural network, the level of accuracy, with which. a signal representing the level of the probability that a prospective tumor image will be a true tumor image is to be obtained, or the like.

In the abnormal pattern finding means 4, in lieu of or in addition to the neural network, the nearest neighbor process (NN process) described below may be employed in the course of making the judgment from a plurality of characteristic measures F1, F2, . . . , Fn.

Specifically, as in the cases where the neural network is employed, a plurality of X-ray images are prepared, for which the presence or absence of tumor images and the positions of the tumor images are known. Prospective tumor images C, C, . . . are found from the X-ray images in the same manner as that described above. Also, three characteristic measures F1, F2, and F3 are calculated for each prospective tumor image C. The information about the sets of the three characteristic measures F1, F2, and F3 and the information, which represents whether the prospective tumor image C corresponding to each set of the characteristic measures F1, F2, and F3 is or is not a true tumor image, are stored as a data base in the abnormal pattern finding means 4.

Thereafter, characteristic values $F_1^x$, $F_2^x$, and $F_3^x$ are calculated for a prospective tumor image C, for which it is unknown whether it is or is not a true tumor image. From the characteristic values $F_1^x$, $F_2^x$, and $F_3^x$ and a plurality of characteristic values $F_1^i$, $F_2^i$, and $F_3^i$, where i=1, 2, . . . , n, the information about which is stored as the data base, distances ai are calculated with the formula $$a_i = (F_1^i - F_1^x)^2 + (F_2^i - F_2^x)^2 + (F_3^i - F_3^x)^2 \tag{46}$$

A judgment is then made as to the level of the probability that the prospective tumor image C corresponding to the characteristic values $F_1^x$ $F_2^x$, and $F_3^x$ will be a true tumor image. The judgment is made from whether a prospective tumor image C, which has characteristic values $F_1^m$, $F_2^m$, and $F_3^m$ corresponding to the smallest distance am among the distances ai, where i=1, 2, . . . , n, is or is not a true tumor image, the value of the smallest distance am, or the like.

As another alternative, as in the cases where the neural network or the NN process is employed, a plurality of X-ray images are prepared, for which the presence or absence of tumor images and the positions of the tumor images are known. Prospective tumor images C, C, . . . are found from the X-ray images in the same manner as that described above. Also, three characteristic measures F1, F2, and F3 are calculated for each prospective tumor image C. Thereafter, from the information about the sets of the three characteristic measures F1, F2, and F3 and the information, which represents whether the prospective tumor image C corresponding to each set of the characteristic measures F1, F2, and F3 is or is not a true tumor image, threshold values to be used during the judgment as to whether a prospective tumor image is or is not a true tumor image are calculated for the characteristic measures F1, F2, and F3. The information about the threshold values is stored in the abnormal pattern finding means 4. Thereafter, a prospective tumor image C, for which it is unknown whether it is or is not a true tumor image, is extracted, and characteristic measures F1, F2, and F3 are calculated therefor. The information about the characteristic measures F1, F2, and F3 calculated for the prospective tumor image C, for which it is unknown whether it is or is not a true tumor image, is fed into the abnormal pattern finding means 4. At this time, the characteristic measures F1, F2, and F3 are processed with the threshold values, and a judgment is thereby made as to whether the corresponding prospective tumor image C is or is not a true tumor image.

As described above, in the abnormal pattern finding means 4, a judgment is made as to whether a prospective tumor image C is or is not a true tumor image, or as to the level of the probability that a prospective tumor image C will be a true tumor image, from a plurality of characteristic measures F1, F2, . . . , Fn. The judgment is made with one of the techniques described above, one of other known techniques, or a combination of two or more of these techniques.

The abnormal pattern finding means 4 of the computer system 40 shown in FIG. 4 receives the anatomical information D, which has been found by the information operating means 2, together with the information, which represents a plurality of characteristic measures F1, F2, . . . , Fn and which has been obtained from the characteristic measure calculating means. In this embodiment, the anatomical information D discriminates the lung hilum image 15a and the lung field images 15b, 15b shown in FIG. 3 from each other, and represents the rib images 15c, 15c shown in FIG. 11.

In this embodiment, the abnormal pattern finding means 4 is provided with the neural network shown in FIG. 13. The neural network yields the output $y_1^3$, which takes a value within the range of 0 to 1. The value of the output represents the level of the probability that a prospective tumor image C, which has been found by the prospective abnormal pattern finding means 1, will be a true tumor image. (A value of the output closer to 1 represents a higher level of the probability.) The output $y_1^3$ is then compared with a threshold value Th5. From whether $y_1^3 \geq Th5$ or $y_1^3 < Th5$, the judgment is made as to whether the corresponding prospective tumor image C is or is not a true tumor image. Specifically, by making such judgments, tumor images are extracted from the prospective tumor images C, C, . . .

As described above, in the lung region image 15, a tumor image appears more easily in the lung field images 15b, 15b than in the lung hilum image 15a. Therefore, in this embodiment, the threshold value Th5 is set to a comparatively small value (e.g. 0.4) in cases where a judgment is made as to whether a prospective tumor image C, which is present in the region corresponding to the lung field images 15b, 15b, is or is not a true tumor image. The threshold value Th5 is set to a comparatively large value (e.g. 0.6) in cases where a judgment is made as to whether a prospective tumor image C, which is present in the region corresponding to the lung hilum image 15a, is or is not a true tumor image.

Tumor images are found in the manner described above. Thereafter, the position of each of the tumor images, which have been found in the manner described above, is compared with the position of the intersection 15d of the rib images 15c, 15c shown in FIG. 11. A judgment is made as to whether the positions of the tumor image and the intersection 15d coincide or does not coincide with each other. In cases where it is judged that the positions of the tumor image and the intersection 15d coincide with each other, the tumor image is detected not to be a true tumor image. In this manner, only the true tumor images are detected ultimately.

In the aforesaid embodiment, the level of the threshold value Th5 is changed. Alternatively, the threshold value Th5 may be fixed at a certain level, and the information which discriminates the lung field images 15b, 15b and the lung hilum image 15a from each other may be fed as one of a plurality of characteristic measures F1, F2, . . . , Fn into the neural network.

Also, as described above, no limitation is imposed on the kinds of the anatomical information, which is found by the information operating means 2, but various kinds of anatomical information may be utilized in accordance with the type of the abnormal patterns, which are to be detected, the level of accuracy required in the operations for detecting the abnormal patterns, or the like. Also, in the aforesaid embodiment, the anatomical information is utilized to discriminate the lung field images 15b, 15b and the lung hilum image 15a from each other and to designate the positions of the rib images 15c, 15c. However, no limitation is imposed on how the anatomical information is utilized in the abnormal pattern finding means 4. Various kinds of anatomical information may be utilized in various manners.

In aforesaid embodiment, the abnormal pattern finding means 4 carries out the judgment from a plurality of characteristic measures F1, F2, . . . , Fn and then carries out the judgment from the anatomical information D. Alternatively, the judgment from the anatomical information D may first be carried out, and the judgment from a plurality of characteristic measures F1, F2, . . . , Fn may then be carried out. As another alternative, both judgments may be carried out simultaneously.

In the aforesaid embodiment of the first abnormal pattern detecting apparatus in accordance with the present invention, from an X-ray image of the chest of a human body, which image has been stored on a stimulable phosphor sheet, a tumor image is detected which appears, typically, as a circular pattern on the X-ray image. However, the first abnormal pattern detecting apparatus in accordance with the present invention is not limited to the detection of a circular tumor image nor to the processing of X-ray images of chests. Also, recording media other than stimulable phosphor sheets may be used. The first abnormal pattern detecting apparatus in accordance with the present invention is applicable widely when, from an image signal representing a radiation image of an object, abnormal patterns in the radiation image are detected.

In the first abnormal pattern detecting apparatus in accordance with the present invention, an abnormal pattern T is found from prospective abnormal patterns C, C, . . . by utilizing a plurality of characteristic measures F1, F2, . . . , Fn and the anatomical information D. As indicated by the broken line in FIG. 1, the anatomical information D may also be fed into the prospective abnormal pattern finding means 1 and utilized in the course of finding the prospective abnormal patterns C, C, . . .

When a judgment is made as to whether a predetermined picture element P0 shown in FIG. 5 falls or does not fall within the region corresponding to a tumor image, the judgment can be prevented from being adversely affected by rib images. For this purpose, the information about the positions of the rib images is utilized. For example, as shown in FIG. 11, when a judgment is made as to whether a picture element P0 falls or does not fall in the region corresponding to a tumor image, the information about r1 and r2 is utilized for the lines L1, L3, L5, and L7. For the lines L2 and L6, the information about r1, r2 and r3 is utilized. Also, for the lines L4 and L8, only the information about r1 is utilized.

An embodiment of the abnormal pattern judging apparatus in accordance with the present invention will be described hereinbelow. In this embodiment, an X-ray image is stored on a stimulable phosphor sheet, and an image of a tumor, which typically has an approximately spherical shape in the lungs of a human body, is detected as an abnormal pattern from the X-ray image. In a visible image reproduced from the image signal S1, the tumor image typically appears as an approximately circular pattern having a lower density than the areas of the image surrounding the tumor image.

The image signal S1, which represents the X-ray image of the chest shown in FIG. 3, is obtained from the A/D converter 33 shown in FIG. 4 in the same manner as that described above. The image signal S1 is then fed into the computer system 40 shown in FIG. 4. The computer system 40 is provided with an embodiment of the abnormal pattern judging apparatus in accordance with the present invention.

After the image signal S1 is fed into the computer system 40, prospective tumor images are designated. Thereafter, calculations are made to find the level of the probability that each of the prospective tumor images will be a true tumor image.

An operator may observe the X-ray image and manually designate prospective tumor images. Alternatively, patterns, which are considered to be tumor images, may be found by processing the image signal S1 with a spatial-domain filter and designated as prospective tumor images. An example will be described hereinbelow, wherein such patterns are found with a spatial-domain filter and designated as prospective tumor images, and judgments are then made as to whether the prospective tumor images are or are not true tumor images.

Operation for finding prospective tumor images

Prospective tumor images are found in the same manner as that described above with reference to FIGS. 5, 6, 7, 8, 9A, and 9B for the prospective abnormal pattern finding means 1 in the embodiment of the first abnormal pattern detecting apparatus in accordance with the present invention.

In the manner described above, the computer system 40 shown in FIG. 4 finds the prospective tumor images by processing the image signal representing the X-ray image with the spatial-domain filter. Thereafter, the prospective abnormal pattern finding means 1 judges, from the characteristic value C4 calculated with Formula (21), whether a region, which has been found as a prospective tumor image, is or is not to be eliminated from the prospective tumor images. A value of 1 is then allocated to image signal components representing the picture elements located in the regions corresponding to the remaining prospective tumor images, and a value of 0 is allocated to image signal components representing the picture elements located in image areas outside of said regions corresponding to the remaining prospective tumor images. In this manner, a binary image signal is obtained. The prospective tumor images, which remain uneliminated during the judgments using the characteristic values C4 calculated with Formula (21), will hereinafter be referred to as the prospective tumor images.

Operation means

The prospective tumor images are found in the manner described above. Thereafter, from the image signal components of the image signal S1, which represent the image information at positions in the vicinity of each of the prospective abnormal patterns, the computer system 40 calculates a plurality of characteristic measures F1, F2, . . . , Fn for each of the prospective abnormal patterns. In this embodiment, the area F1 and the shape F2 of each prospective abnormal pattern and the contrast F3 of each prospective abnormal pattern with the surrounding image areas are calculated as the characteristic measures. The function of the computer system 40 for calculating the characteristic measures constitutes an example of the operation means of the abnormal pattern judging apparatus in accordance with the present invention. The characteristic measures F1, F2, and F3 are calculated in the same manner as that described above with reference to FIG. 12 for the characteristic measure calculating means 3 in the embodiment of the first abnormal pattern detecting apparatus in accordance with the present invention.

Neural network

The information about the characteristic measures F1, F2, and F3, which have been calculated in the manner described above, is fed into the neural network shown in FIG. 13.

After the learning operations are completed in the same manner as that described above, a prospective tumor image, for which it is unknown whether it is or is not a true tumor image, is extracted. Characteristic measures F1, F2, and F3 are calculated for the prospective tumor image, and the information about them is fed into the neural network shown in FIG. 13. The output $y_1^3$ obtained from the neural network is utilized as a signal representing the level of the probability that the prospective tumor image will be a true tumor image. Because said signal is obtained after the learning operations are carried out in the manner described above, it accurately represents the level of the probability that the prospective tumor image will be a true tumor image.

After the signal (output $y_1^3$) is obtained, the value of the signal is compared with a threshold value Th5 (e.g. 0.5). From whether $y_1^3 \geq Th5$ or $y_1^3 < Th5$, the judgment is made as to whether the prospective tumor image, which corresponds to the information about the characteristic measures fed into the neural network, is or is not a true tumor image.

The threshold value Th5 need not necessarily be fixed at a certain level, but may be changed in accordance with the anatomical information about the object corresponding to the X-ray image.

As described above, in the lung region image 15, a tumor image appears more easily in the lung field images 15b, 15b than in the lung hilum image 15a. Therefore, in this embodiment, in the same manner as that described above with reference to FIG. 10, the lung region image 15 may be divided into the lung hilum image 15a and the lung field images 15b, 15b. The information, which discriminates the lung hilum image 15a and the lung field images 15b, 15b from each other, is utilized when the level of the threshold value Th5 is determined in the course of comparing the value of the output $y_1^3$ with the threshold value Th5.

As described above, the lung hilum image 15a and the lung field images 15b, 15b may be discriminated from each other. In cases where a judgment is made as to whether a prospective tumor image, which is present in the region corresponding to the lung field images 15b, 15b, is or is not a true tumor image, the threshold value Th5 is set to a comparatively small value (e.g. 0.4). In cases where a judgment is made as to whether a prospective tumor image, which is present in the region corresponding to the lung hilum image 15a, is or is not a true tumor image, the threshold value Th5 is set to a comparatively large value (e.g. 0.6).

Also, the rib images 15c, 15c are found in the same manner as that described with reference to FIG. 11.

The level of the threshold value Th5 may be fixed, and the information which discriminates the lung field images 15b, 15b and the lung hilum image 15a from each other may be fed as one of a plurality of characteristic measures F1, F2, . . . , Fn into the neural network.

Also, as described above, the anatomical information may be utilized in the course of finding the prospective abnormal patterns.

In the aforesaid embodiment of the abnormal pattern judging apparatus in accordance with the present invention, from an X-ray image of the chest of a human body, which image has been stored on a stimulable phosphor sheet, a judgment is made as to a tumor image which appears, typically, as a circular pattern on the X-ray image. However, the abnormal pattern judging apparatus in accordance with the present invention is not limited to the judgment as to a circular tumor image nor to the processing of X-ray images of chests. Also, recording media other than stimulable phosphor sheets may be used. The abnormal pattern judging apparatus in accordance with the present invention is applicable widely when, from an image signal representing a radiation image of an object, judgments are made as to whether prospective abnormal patterns designated in the radiation image are or are not true abnormal patterns.

An embodiment of the second abnormal pattern detecting apparatus in accordance with the present invention will be described below. In this embodiment, an X-ray image of the chest of a human body is stored on a stimulable phosphor sheet, and an image of a tumor is detected from the X-ray image.

The image signal S1, which represents the X-ray image of the chest shown in FIG. 3, is obtained from the A/D converter 33 shown in FIG. 4 in the same manner as that described above. The image signal S1 is then fed into the computer system 40 shown in FIG. 4. The computer system 40 is provided with an embodiment of the second abnormal pattern detecting apparatus in accordance with the present invention.

Figure 14:
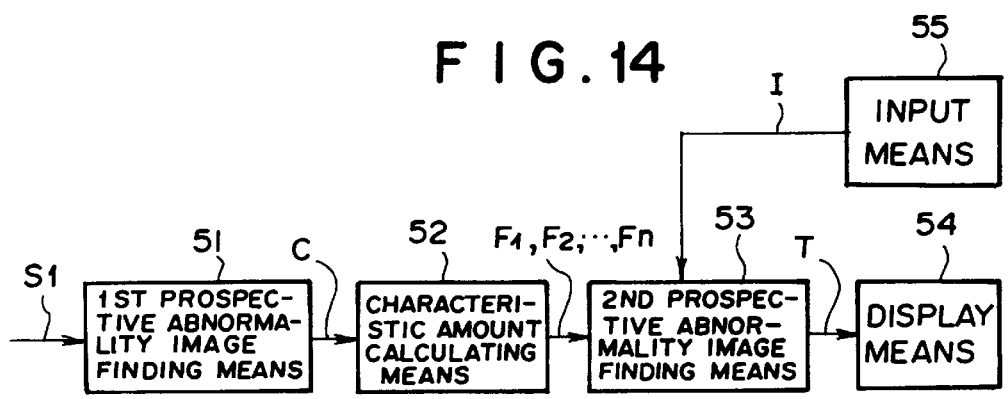
FIG. 14 is a block diagram showing the second abnormal pattern detecting apparatus in accordance with the present invention.

From the image signal S1, which is made up of a series of image signal components representing the X-ray image and which has been fed into the computer system 40, an abnormal pattern in the X-ray image is detected. The computer system 40 carries out the operations corresponding to the blocks 51, 52, and 53, which are shown in FIG. 14. The blocks 51, 52, and 53 shown in FIG. 14 will hereinafter be referred to as the functions of the computer system 40. Also, the CRT display device 44 and the keyboard 43 of the computer system 40 respectively constitute examples of the display means 54 and the input means 55 of the second abnormal pattern detecting apparatus in accordance with the present invention.

The image signal S1, which is a digital electric signal representing the X-ray image shown in FIG. 3, is fed into the first prospective abnormal pattern finding means 51 shown in FIG. 14.

In the embodiment described below, an image of a tumor, which typically has an approximately spherical shape in the lungs of a human body, is detected as an abnormal pattern from the X-ray image. In a visible image reproduced from the image signal S1, the tumor image typically appears as an approximately circular pattern having a lower density than the areas of the image surrounding the tumor image.

First prospective abnormal pattern finding means

The first prospective abnormal pattern finding means 51 of the computer system 40 shown in FIG. 4 finds the prospective tumor images by processing the image signal representing the X-ray image with the spatial-domain filter in the same manner as that described above with reference to FIGS. 5, 6, 7, 8, 9A, and 9B for the prospective abnormal pattern finding means 1 in the embodiment of the first abnormal pattern detecting apparatus in accordance with the present invention. Thereafter, the first prospective abnormal pattern finding means 51 judges, from the characteristic value C4 calculated with Formula (21), whether a region, which has been found as a prospective tumor image, is or is not to be eliminated from the prospective tumor images. A value of 1 is then allocated to image signal components representing the picture elements located in the regions corresponding to the remaining prospective tumor images, and a value of 0 is allocated to image signal components representing the picture elements located in image areas outside of said regions corresponding to the remaining prospective tumor images. In this manner, a binary image signal is obtained. The prospective tumor images, which remain uneliminated during the judgments using the characteristic values C4 calculated with Formula (21), will hereinafter be referred to as the prospective tumor images found by the first prospective abnormal pattern finding means 51.

Characteristic measure calculating means

The information about the prospective tumor images C, C, . . . , which have been found by the first prospective abnormal pattern finding means 51, is fed into the characteristic measure calculating means 52 of the computer system 40. From the image signal components of the image signal S1, which represent the image information at positions in the vicinity of each of the prospective abnormal patterns C, C, . . . , the characteristic measure calculating means 52 calculates a plurality of characteristic measures F1, F2, . . . , Fn for each of the prospective abnormal patterns C, C, . . . In this embodiment, the area F1 and the shape F2 of each prospective abnormal pattern C and the contrast F3 of each prospective abnormal pattern C with the surrounding image areas are calculated as the characteristic measures. The characteristic measures F1, F2, and F3 are calculated in the same manner as that described above with reference to FIG. 12 for the characteristic measure calculating means 3 in the embodiment of the first abnormal pattern detecting apparatus in accordance with the present invention.

Second prospective abnormal pattern finding means

The information about the characteristic measures F1, F2, and F3, which have been calculated in the manner described above, is fed into the second prospective abnormal pattern finding means 53 of the computer system shown in FIG. 4. In this embodiment, the second prospective abnormal pattern finding means 53 utilizes the characteristic measures F1, F2, and F3 in order to find a prospective tumor image, which has a high probability of being a true tumor image, from the prospective abnormal patterns C, C, . . . , which have been found by the first prospective abnormal pattern finding means 51. The neural network shown in FIG. 13 is utilized for this purpose. The prospective tumor image, which has a high probability of being a true tumor image, is found in the same manner as that described above for the abnormal pattern finding means 4 in the embodiment of the first abnormal pattern detecting apparatus in accordance with the present invention.

After the learning operations are completed in the same manner as that described above, a prospective tumor image, for which it is unknown whether it is or is not a true tumor image, is extracted. Characteristic measures F1, F2, and F3 are calculated for the prospective tumor image, and the information about them is fed into the neural network shown in FIG. 13. The output $y_1^3$ obtained from the neural network is utilized as a signal representing the level of the probability that the prospective tumor image will be a true tumor image. Because said signal is obtained after the learning operations are carried out in the manner described above, it accurately represents the level of the probability that the prospective tumor image will be a true tumor image.

After the signal (output $y_1^3$) is obtained, the value of the signal is compared with a threshold value Th5 (e.g. 0.5). From whether $y_1^3 \geq Th5$ or $y_1^3 < Th5$, the judgment is made as to whether the prospective tumor image, which corresponds to the information about the characteristic measures fed into the neural network, is or is not a true tumor image.

The threshold value Th5 need not necessarily be fixed at a certain level, but may be changed in accordance with the anatomical information about the object corresponding to the X-ray image.

As described above, in the lung region image 15, a tumor image appears more easily in the lung field images 15b, 15b than in the lung hilum image 15a. Therefore, in this embodiment, in the same manner as that described above with reference to FIG. 10, the lung region image 15 may be divided into the lung hilum image 15a and the lung field images 15b, 15b. The information, which discriminates the lung hilum image 15a and the lung field images 15b, 15b from each other, is utilized when the level of the threshold value Th5 is determined in the course of comparing the value of the output $y_1^3$ with the threshold value Th5.

As described above, the lung hilum image 15a and the lung field images 15b, 15b may be discriminated from each other. In cases where a judgment is made as to whether a prospective tumor image, which is present in the region corresponding to the lung field images 15b, 15b, is or is not a true tumor image, the threshold value Th5 is set to a comparatively small value (e.g. 0.4). In cases where a judgment is made as to whether a prospective tumor image, which is present in the region corresponding to the lung hilum image 15a, is or is not a true tumor image, the threshold value Th5 is set to a comparatively large value (e.g. 0.6).

Also, the rib images 15c, 15c are found in the same manner as that described with reference to FIG. 11.

The level of the threshold value Th5 may be fixed, and the information which discriminates the lung field images 15b, 15b and the lung hilum image 15a from each other may be fed as one of a plurality of characteristic measures F1, F2, ..., Fn into the neural network.

Also, as described above, the anatomical information may be utilized in the course of finding the prospective abnormal patterns.

In the manner described above, in the second prospective abnormal pattern finding means 53 of the computer system 40 shown in FIG. 4, the information about a plurality of characteristic measures F1, F2, ..., Fn, which have been calculated by the characteristic measure calculating means 52, is fed into the neural network shown in FIG. 13. The signal $y_1^3$ representing the level of the probability that a prospective tumor image C, which has been found by the first prospective abnormal pattern finding means 51, will be a true tumor image is obtained and processed with a threshold value. After it has been judged that the prospective tumor image C is a true tumor image T, the information about the tumor image T (for example, the information about the position of the tumor image T, or the information about the shape thereof) is fed into the CRT display device 44, which is shown in FIG. 4 and which constitutes an example of the display means 54 of the second abnormal pattern detecting apparatus in accordance with the present invention, together with the image signal S1. A visible image, which is represented by the image signal S1, is displayed on the CRT display device 44. In the visible image, the tumor image T is indicated by, for example, an arrow mark.

An operator observes the visible image and inputs information I, which represents whether the displayed tumor image T is or is not a true tumor image, from the keyboard 43, which constitutes an example of the input means 55 of the second abnormal pattern detecting apparatus in accordance with the present invention. The information I is fed into the second prospective abnormal pattern finding means 53 of the computer system 40. In cases where the information I, which represents that the displayed tumor image T is a true tumor image, is fed into the second prospective abnormal pattern finding means 53, the second prospective abnormal pattern finding means 53 sets the instructor signal d in Formula (29) to d=1. In cases where the information I, which represents that the displayed tumor image T is not a true tumor image, is fed into the second prospective abnormal pattern finding means 53, the second prospective abnormal pattern finding means 53 sets the instructor signal d in Formula (29) to d=0. In this manner, the learning operations by back-propagation of errors are carried out in the neural network. The weights of connection $W_{i\,j}^{k\,k+1}$ are changed such that the judgment can thereafter be carried out more accurately.

As described above, while the second abnormal pattern detecting apparatus is being operated, the learning operations can be altered in accordance with the facility, in which the second abnormal pattern detecting apparatus is located, the person who observes the visible image displayed with the display means 54, or the like, such that abnormal patterns can be detected more accurately.

In the second prospective abnormal pattern finding means 53, in lieu of or in addition to the neural network, the nearest neighbor process (NN process) described above may be employed in the course of making the judgment from a plurality of characteristic measures F1, F2, ..., Fn.

Specifically, as in the cases where the neural network is employed, a plurality of X-ray images are prepared, for which the presence or absence of tumor images and the positions of the tumor images are known. Prospective tumor images C, C, ... are found from the X-ray images in the same manner as that described above. Also, three characteristic measures F1, F2, and F3 are calculated for each prospective tumor image C. The information about the sets of the three characteristic measures F1, F2, and F3 and the information, which represents whether the prospective tumor image C corresponding to each set of the characteristic measures F1, F2, and F3 is or is not a true tumor image, are stored as a data base in the second prospective abnormal pattern finding means 53.

Thereafter, characteristic values $F_1^x$, $F_2^x$, and $F_3^x$ are calculated for a prospective tumor image C, for which it is unknown whether it is or is not a true tumor image. From the characteristic values $F_1^x$, $F_2^x$, and $F_3^x$ and a plurality of characteristic values $F_1^i$, $F_2^i$, and $F_3^i$, where i=1, 2, ..., n, the information about which is stored as the data base, distances ai are calculated with Formula (46). A judgment is then made as to the level of the probability that the prospective tumor image C corresponding to the characteristic values $F_1$, $F_2^x$, and $F_3^x$ will be a true tumor image. The judgment is made from whether a prospective tumor image C, which has characteristic values $F_1^m$, $F_2^m$, and $F_3^m$ corresponding to the smallest distance am among the distances ai, where i=1, 2, ..., n, is or is not a true tumor image, the value of the smallest distance am, or the like.

In cases where the NN process is utilized, in the second prospective abnormal pattern finding means 53, the information about a plurality of characteristic measures F1, F2, ..., Fn, which has been calculated for a prospective tumor image C, and the information I, which is fed from the keyboard 43 and which represents whether said prospective tumor image C is or is not a true tumor image, are added to the data base. This function is referred to as the learning function of the second prospective abnormal pattern finding means 53.

As another alternative, as in the cases where the neural network or the NN process is employed, a plurality of X-ray images are prepared, for which the presence or absence of tumor images and the positions of the tumor images are known. Prospective tumor images C, C, ... are found from the X-ray images in the same manner as that described above. Also, three characteristic measures F1, F2, and F3 are calculated for each prospective tumor image C. Thereafter, from the information about the sets of the three characteristic measures F1, F2, and F3 and the information, which represents whether the prospective tumor image C corresponding to each set of the characteristic measures F1, F2, and F3 is or is not a true tumor image, threshold values to be used during the judgment as to whether a prospective tumor image is or is not a true tumor image are calculated for the characteristic measures F1, F2, and F3. The information about the threshold values is stored in the second prospective abnormal pattern finding means 53. Thereafter, a prospective tumor image C, for which it is unknown whether it is or is not a true tumor image, is extracted, and characteristic measures F1, F2, and F3 are calculated therefor. The information about the characteristic measures F1, F2, and F3 calculated for the prospective tumor image C, for which it is unknown whether it is or is not a true tumor image, is fed into the second prospective abnormal pattern finding means 53. At this time, the characteristic measures F1, F2, and F3 are processed with the threshold values, and a judgment is thereby made as to whether the corresponding prospective tumor image C is or is not a true tumor image.

In cases where the second prospective abnormal pattern finding means 53 carries out such a simple type of processing with the threshold value, the information I, which is fed from the keyboard 43 and which represents whether a prospective tumor image C is or is not a true tumor image, is utilized in the statistical process for determining the threshold value. This function is referred to as the learning function of the second prospective abnormal pattern finding means 53.

As described above, in the second prospective abnormal pattern finding means 53, a judgment is made, from a plurality of characteristic measures F1, F2, ..., Fn, as to whether a prospective tumor image C is or is not a true tumor image. The judgment is made with ore of the techniques described above, one of other known techniques, or a combination of two or more of these techniques.

In the aforesaid embodiment of the second abnormal pattern detecting apparatus in accordance with the present invention, from an X-ray image of the chest of a human body, which image has been stored on a stimulable phosphor sheet, a tumor image is detected which appears, typically, as a circular pattern on the X-ray image. However, the second abnormal pattern detecting apparatus in accordance with the present invention is not limited to the detection of a circular tumor image nor to the processing of X-ray images of chests. Also, recording media other than stimulable phosphor sheets may be used. The second abnormal pattern detecting apparatus in accordance with the present invention is applicable widely when, from an image signal representing a radiation image of an object, abnormal patterns in the radiation image are detected.

An embodiment of the third abnormal pattern detecting apparatus in accordance with the present invention will be described hereinbelow. In this embodiment, an X-ray image is stored on a stimulable phosphor sheet, and an image of a tumor, which typically has an approximately spherical shape in the lungs of a human body, is detected as an abnormal pattern from he X-ray image. In a visible image reproduced from the image signal S1, the tumor image typically appears as an approximately circular pattern having a lower density than the areas of the image surrounding the tumor image.

Figure 16:
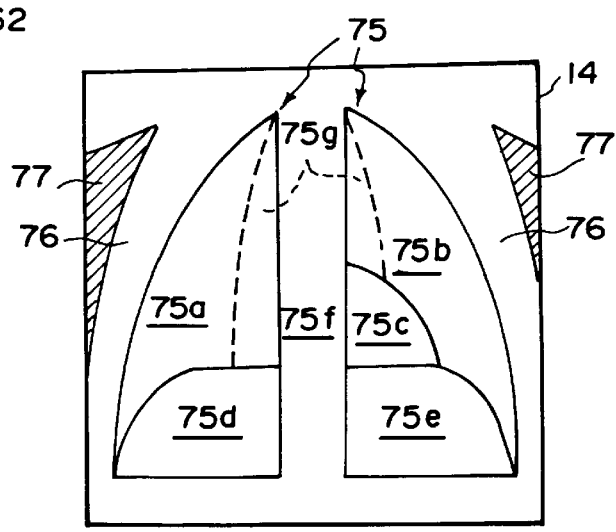
FIG. 16 is a schematic view showing an example of an X-ray image of the chest, which image has been stored on a stimulable phosphor sheet.

FIG. 16 is a schematic view showing an example of an X-ray image of the chest, which image has been stored on a stimulable phosphor sheet.

With reference to FIG. 16, the X-ray image comprises a lung region image 75, a skin image 76, and a background region 77, upon which the X-rays 12 shown in FIG. 2 impinged directly without passing through the object 13. The lung region image 75 comprises a right lung field image 75*a*, a left lung field image 75*b*, a heart image 75*c*, a right diaphragm image 75*d*, a left diaphragm image 75*e*, and a mediastinum image 75*f*. The positions of the images 75*a* through 75*f* in the X-ray image are found in the manner described later. Also, a lung hilum image 75*g* is located in the vicinity of the middle between the right lung field image 75*a* and the left lung field image 75*b*.

The image signal S1, which represents the X-ray image of the chest shown in FIG. 16, is obtained from the A/D converter 33 shown in FIG. 4 in the same manner as that described above. The image signal S1 is then fed into the computer system 40 shown in FIG. 4. The computer system 40 is provided with an embodiment of the third abnormal pattern detecting apparatus in accordance with the present invention.

From the image signal S1, which is made up of a series of image signal components representing the X-ray image and which has been fed into the computer system 40, an abnormal pattern in the X-ray image is detected. The computer system 40 carries out the operations corresponding to the blocks 61, 62, and 63 shown in FIG. 15. The blocks 61, 62, and 63 shown in FIG. 15 will hereinafter be referred to as the functions of the computer system 40.

Figure 15:
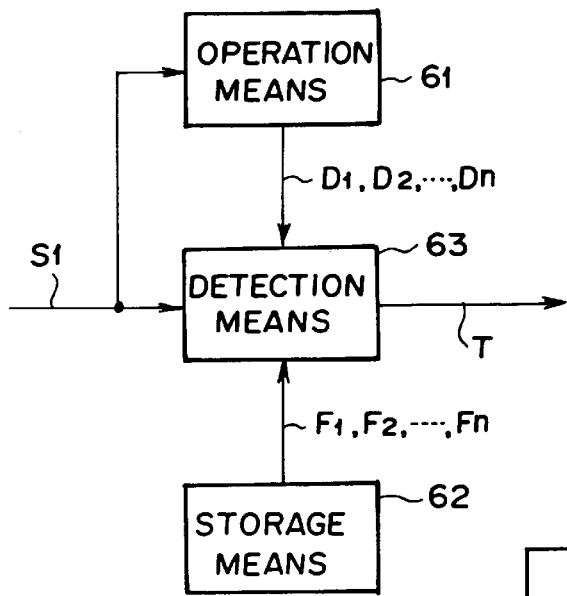
FIG. 15 is a block diagram showing the third abnormal pattern detecting apparatus in accordance with the present invention.

The image signal S1, which is a digital electric signal representing the X-ray image shown in FIG. 16, is fed into the operation means 61 and the detection means 63 shown in FIG. 15. Examples of the operations carried out by the operation means 61 will first be described below.

Operation means

From the image signal S1, the operation means 61 of the computer system 40 finds anatomical regions 75*a* through 75*f* shown in FIG. 16.

Figure 17:
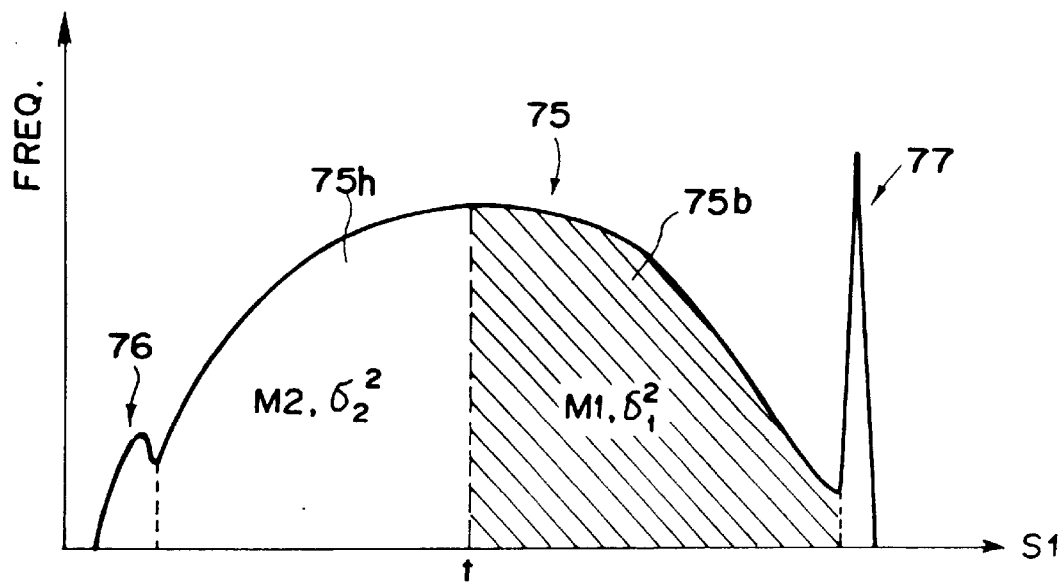
FIG. 17 is a graph showing a probability density function of an image signal detected from the X-ray image shown in FIG. 16.

FIG. 17 is a graph showing a probability density function of the image signal S1, which has been detected from the X-ray image shown in FIG. 16. In FIG. 17, the horizontal axis indicates the value of the image signal S1, and the vertical axis indicates the frequency of occurrence of the value of the image signal S1.

Figure 18:
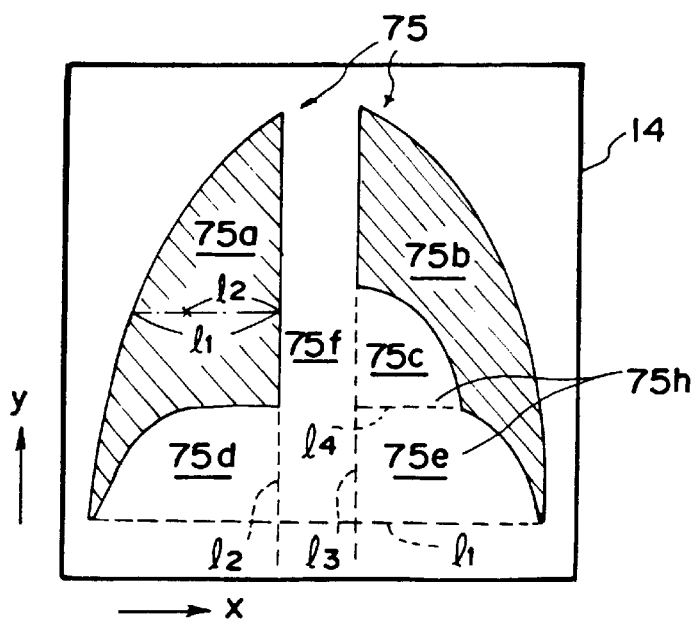
FIG. 18 is an explanatory view showing how the positions of anatomical regions in the X-ray image of the chest are detected.

FIG. 18 is an explanatory view showing how the positions of the regions corresponding to the images 75a through 75f in the lung region image 75 are detected.

With reference to FIG. 17, a projecting part 77, which is present on the right side, corresponds to the background region 77 shown in FIG. 16. A projecting part 75 in the middle corresponds to the lung region image 75 shown in FIG. 16. Also, a projecting part 76 on the left side corresponds to the skin image 76 shown in FIG. 16. As an aid in facilitating the explanation, in FIG. 17, the projecting parts corresponding to the regions shown in FIG. 16 are numbered with corresponding reference numerals.

In this embodiment, regions corresponding to the right lung field image 75a and the left lung field image 75b are first found in the manner described below. The process used for this purpose is described "Automatic Threshold Value Selecting Process Based On Discrimination And Least Square Standards" by Nobuyuki Otsu, collected papers of The Institute of Electronics and Communication Engineers of Japan, 63-D-4, pp. 349–356, 1980.

A threshold value t is determined such that the value calculated with the formula $$\frac{M_1 - M_2}{\sigma1^2 + \sigma2^2}$$

becomes the largest. In this formula, M1 and $\sigma1^2$ denote respectively the mean value and the variance of the values of the image signal S1, which values are larger than the threshold value t. Also, M2 and $\sigma2^2$ denote respectively the mean value and the variance of the values of the image signal S1, which values are smaller than the threshold value t. Thereafter, from the image signal components of the image signal S1 corresponding to the projecting part 75, the image signal components having values larger than the threshold value t are extracted. Two regions, which are composed of the picture elements corresponding to the thus extracted image signal components and which have comparatively large areas, are found as corresponding to the right lung field image 75a and the left lung field image 75b as shown in FIG. 18.

Thereafter, as shown in FIG. 18, a line 11 is drawn which connects the bottom edges of the right lung field image 75a and the left lung field image 75b. The right edge of right lung field image 75a, which right edge is taken in the X-ray image shown in FIG. 18, is approximated by a straight line, and a line 12 is extended downwardly from the straight line. Also, the upper one-third part of the left edge of the left lung field image 75b, which left edge is taken in the X-ray image shown in FIG. 18, is approximated by a straight line, and a line 13 is extended downwardly from the straight line. In this manner, a region 75h is found which comprises the regions corresponding to the right diaphragm image 75d, the mediastinum image 75f, the heart image 75c, and the left diaphragm image 75e.

Also, from the image signal components of the image signal S1 representing the picture elements, which are considered to be located in the vicinity of the boundary between the heart image 75c and the left diaphragm image 75e in the region 75h, calculations are made to find differences between the values of the image signal components representing the picture elements which are adjacent to each other in the vertical direction, which vertical direction is taken in FIG. 18. The picture elements, for which the differences are larger than a predetermined value, are imaginarily plotted on the X-ray image. A line 14, which connects the thus plotted picture elements and which extends horizontally in FIG. 18, is found to be the boundary between the heart image 75c and the left diaphragm image 75e. In this manner, the positions of the regions 75a through 75f in the X-ray image are detected.

The operation means also detects the positions of rib images (not shown) in the right lung field image 75a and the left lung field image 75b.

In this embodiment, in order for the rib images 15c, 15c to be found, a method may be employed which is described in "Discrimination of Rib Images in X-ray Fluorographic Image of the Chest", The Institute of Electronics and Communication Engineers of Japan, Oct. 26, 1972, material No. IT72-24 (1972-10) of the society for the study of image engineering. With the method, a linear figure is extracted by processing an image signal representing an X-ray image of the chest with a filter, which is sensitive to lines. From the position of the linear figure in the X-ray image, the direction along which the linear figure extends, or the like, lines corresponding to a rib image are detected. Thereafter, boundary lines of the rib image are approximately represented by a function of second order. In this manner, a rib image is extracted.

In the manner described above, the operation means 61 of the computer system 40 shown in FIG. 4 detects the positions of the regions 75a through 75f and rib images in the X-ray image. The information about the positions is fed into the detection means 63 of the computer system 40.

No limitation is imposed on how the regions 75a through 75f and rib images in the X-ray image are detected.

Storage means

By way of example, the storage means 62 of the computer system 40 stores the tumor image detecting filter described below. In this embodiment, the same basic algorithms are employed in the tumor image detecting filter for the respective regions in the X-ray image.

The storage means 62 stores the spatial-domain filter which has been described above with reference to FIGS. 5, 6, and 7 and which uses Formula (3), (4), and (5). A judgment is made as to whether a predetermined picture element P0 in the X-ray image falls or does not fall within the region corresponding to the tumor image in the X-ray image. The tumor image in the X-ray image can be detected by processing the image signal components representing the picture elements of the X-ray image with the filter illustrated in FIG. 5.

The characteristic value C1, which is obtained with Formula (5) in the same manner as that described above, is compared with a predetermined threshold value Th1. From whether C1≧Th1 or C1<Th1, the judgment is made as to whether the predetermined picture element P0 falls or does not fall within the region corresponding to the tumor image. As described below, the threshold value Th1 varies for the respective regions in the X-ray image.

Figure 19:
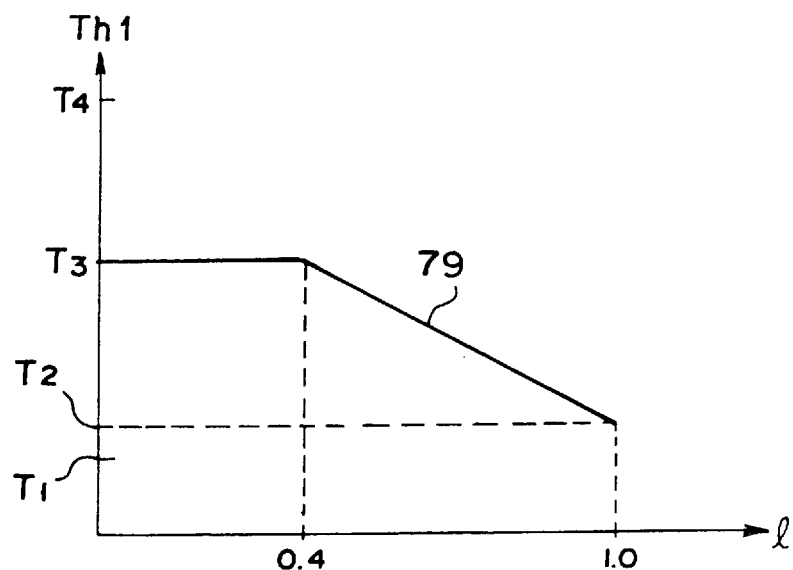
FIG. 19 is a graph showing threshold values employed for the anatomical regions in the X-ray image, which threshold values are compared with a characteristic value obtained with a spatial-domain filter.

FIG. 19 is a graph showing the levels of the threshold value Th1.

A tumor image, which is the object of the detection in this embodiment, does not appear in regions outside of the lung region image 75 nor in the region corresponding to the mediastinum image 75f. Therefore, for the regions outside of the lung region image 75 and for the region corresponding to the mediastinum image 75f, the threshold value Th1 is set to Th1=T4 (large value). Therefore, even if a large characteristic value C1 is obtained for the region corresponding to, for example, the mediastinum image 75f when the image signal representing she X-ray image is processed with the spatial-domain filter in the detection means 63 as will be described later, it is not judged that the predetermined picture element P0 corresponding to the characteristic value C1 falls within the region corresponding to the tumor image.

During the recording of the X-ray image on the stimulable phosphor sheet, less of the X-rays pass through the regions corresponding to the right diaphragm image 75d, the left diaphragm image 75e, and the heart image 75c than through the right lung field image 75a and the left lung field image 75b. Therefore, for the regions corresponding to the right diaphragm image 75d, the left diaphragm image 75e, and the heart image 75c, the threshold value Th1 is set to Th1=T1 (small value) so that even a region having a small characteristic value C1 can be detected to be a tumor image. Also, the mean amount of X-rays, which have passed through the regions corresponding to the right diaphragm image 75d and the left diaphragm image 75e, differs from the mean amount of X-rays, which have passed through the region corresponding to the heart image 75c. Therefore, the threshold value Th1 may vary for the regions corresponding to the diaphragm images 75d, 75e and the region corresponding to the heart image 75c.

For the regions corresponding to the right lung field image 75a and the left lung field image 75b (but excluding the regions corresponding to rib images), the threshold value Th1 is changed in the manner described below. Specifically, a tumor image, which is the object of the detection in this embodiment, appears more easily in the peripheral regions of the right lung field image 75a and the left lung field image 75b than in the region corresponding to the lung hilum image 75g shown in FIG. 16. Therefore, a value is calculated with the formula $$l = l2/l1 \ (0 \leq l \leq 1)$$

where l1 denotes the width (the length taken along the x direction) of each of the right lung field image 75a and the left lung field image 75b, which width is taken at each position along the y direction as shown in FIG. 18. Also, l2 denotes the distance from the boundary between the right lung field image 75a and the mediastinum image 75f to the predetermined picture element P0, or the distance from the boundary between the left lung field image 75b and the mediastinum image 75f to the predetermined picture element P0. Thereafter, as indicated by line 79 in FIG. 19, the threshold value Th1 is changed in accordance with the value of l. Therefore, the sensitivity, with which tumor images present at peripheral parts of the regions corresponding to the lung field images 75a and 75b are detected, can be kept high. Instead of the threshold value Th1 being changed, the characteristic value C1 may be weighted.

The storage means 62 of the computer system 40 stores the information about the aforesaid spatial-domain filter for detecting the tumor images (including the threshold value Th1 for each region in the X-ray image). When the image signal S1 representing the X-ray is fed into the detection means 63 of the computer system 40, the information stored in the storage means 62 is read and fed into the detection means 63.

Detection means

As described above, the detection means 63 receives the image signal S1 representing the X-ray image, from which a tumor image is to be detected, and the information about the positions of the anatomical regions in the X-ray image, which have been found from the image signal S1 by the operation means 61 (in this embodiment, the positions of the right lung field image 75a, the left lung field image 75b, the heart image 75c, right diaphragm image 75d, the left diaphragm image 75e, and the rib images). The detection means 63 also receives the information about the tumor image detecting filter (including the threshold value Th1), which is used adaptively for the respective anatomical regions, from the storage means 62. The detection means 63 processes the image signal S1 with the aforesaid spatial-domain filter and uses the threshold value Th1 suitable for the respective regions 75a through 75g shown in FIGS. 16 and 18 in order to detect a tumor image.

The rib images are present in the lung field images 75a and 75b. Therefore, as described below, when the image signal components representing the lung field images 75a and 75b are processed with the filter, the filter is modified adaptively for the image signal components corresponding to the region in the vicinity of the rib images.

FIG. 11 is an enlarged view showing part of rib images (not shown in FIG. 16) in the lung field image 75a or the lung field image 75b shown in FIG. 16. In FIG. 11, the filter shown in FIG. 5 is also illustrated.

As illustrated in FIG. 11, part of the filter overlaps the rib images 15c, 15c. Therefore, when a characteristic value corresponding to a predetermined picture element P0 shown in FIG. 11 is calculated, the information about r1 and r2 is utilized for the lines L1, L3, L5, and L7. For the lines L2 and L6, the information about r1, r2 and r3 is utilized. Also, for the lines L4 and L8, only the information about r1 is utilized. In this manner, the spatial-domain filter is modified adaptively in accordance with the information about the positions of the rib images. Therefore, the calculation of the characteristic value C1 is not adversely affected by the rib images.

The basic algorithms employed in the tumor image detecting filter are not limited to those described above. For example, the algorithms described above with reference to FIGS. 5 and 8 may be employed. With the algorithms, the gradients $\nabla fi$ of the image signal components fij representing the picture elements Pij, where i=1, 2, ..., 8 and j=1, 2, 3, which are shown in FIG. 5, are found. The characteristic value C2 is then calculated and compared with the predetermined threshold value Th2. From the results of the comparison, a judgment is made as to whether a predetermined picture element P0 falls or does not fall within the region corresponding to a tumor image. Like the threshold value Th1, the threshold value Th2 is determined for each of the anatomical regions.

Alternatively, the algorithms, which have been described above with reference to FIG. 5 and which use Formulas (7) through (18) may be employed. In this case, like the threshold values Th1 and Th2, the level or the function of the threshold value Th3 compared with the characteristic value C3 calculated with Formula (18) is determined for each of the anatomical regions.

The detection means 63 may employ any of other filters.

Instead of altering the level of the threshold value for the respective anatomical regions or in addition to such alteration, filters utilizing algorithms suitable for the respective anatomical regions may be employed for the respective anatomical regions.

During the processing of the image signal with one of the filters described above, it will often occur that regions composed of many linear patterns, such as blood vessel images, are also found to be tumor images. Therefore, after finding the tumor images, the detection means 63 eliminates such regions from the tumor images in the same manner as that described above with reference to FIGS. 9A and 9B.

In the manner described above, the detection means 63 of the computer system 40 shown in FIG. 4 finds the tumor images by processing the image signal representing the X-ray image with the spatial-domain filter. Thereafter, the detection means 63 judges, from the characteristic value C4 calculated with Formula (21), whether a region, which has been found to be a tumor image, is or is not to be eliminated from the tumor images. The detection means 63 then feeds out the information T, which represents the position of a remaining tumor image. The information T, which has been fed out of the third abnormal pattern detecting apparatus in accordance with the present invention is stored in a storage means (not shown) together with the image signal S1. When a visible image represented by the image signal S1 is reproduced and displayed, the detected tumor image is shown clearly in the visible image.

In the aforesaid embodiment of the third abnormal pattern detecting apparatus in accordance with the present invention, from an X-ray image of the chest of a human body, which image has been stored on a stimulable phosphor sheet, a tumor image is detected which appears, typically, as a circular pattern on the X-ray image. However, the third abnormal pattern detecting apparatus in accordance with the present invention is not limited to the detection of a circular tumor image nor to the processing of X-ray images of chests. Also, recording media other than stimulable phosphor sheets may be used. The third abnormal pattern detecting apparatus in accordance with the present invention is applicable widely when, from an image signal representing a radiation image of an object, abnormal patterns in the radiation image are detected.

Embodiments of the circular pattern judging method and apparatus in accordance with the present invention will be described hereinbelow. In these embodiments, an X-ray image is stored on a stimulable phosphor sheet, and an image of a tumor, which typically has an approximately spherical shape in the lungs of a human body, is detected from the X-ray image. In a visible image reproduced from the image signal S1, the tumor image typically appears as an approximately circular pattern having a lower density than the areas of the image surrounding the tumor image.

Figure 21:
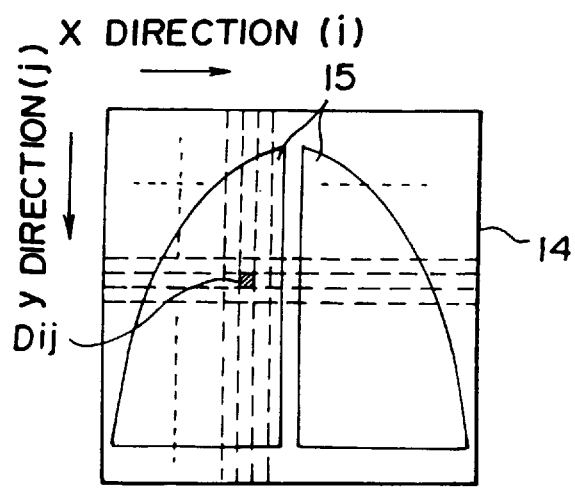
FIG. 21 is a schematic view showing an example of an X-ray image of the chest, which image has been stored on a stimulable phosphor sheet.

FIG. 21 is a schematic view showing an example of an X-ray image of the chest, which image has been stored on a stimulable phosphor sheet.

With reference to FIG. 21, an X-ray image of the lungs 15 is stored over approximately the whole area of a stimulable phosphor sheet 14.

As indicated by the broken lines in FIG. 21, a plurality of imaginary lines extend in the x and y directions on the stimulable phosphor sheet 14. Each of regions Dij, which are divided from one another by the imaginary lines, is taken as a predetermined region. A judgment is made as to the level of the probability that each of the regions Dij will fall within the region corresponding to a circular pattern in the X-ray image. By repeating the judgment over the whole area of the X-ray image, a region which is considered as corresponding to a tumor image is found.

The image signal S1, which represents the X-ray image of the chest shown in FIG. 21, is obtained from the A/D converter 33 shown in FIG. 4 in the same manner as that described above. The image signal S1 is then fed into the computer system 40 shown in FIG. 4. The computer system 40 is provided with an embodiment of the circular pattern judging apparatus in accordance with the present invention.

From the image signal S1, which is made up of a series of image signal components representing the X-ray image and which has been fed into the computer system 40, a judgment is made as to the level of the probability that each of the regions Dij will fall within the region corresponding to a tumor image in the X-ray image.

Figure 20A:
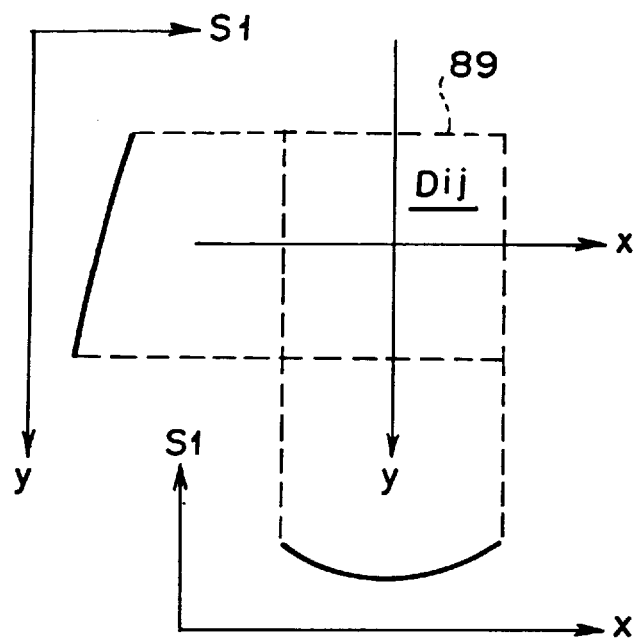
FIG. 20A is a diagram showing a predetermined region designated in the X-ray image, which region corresponds to a true tumor image, and profiles of the X-ray image in the region along the x and y directions.
Figure 20B:
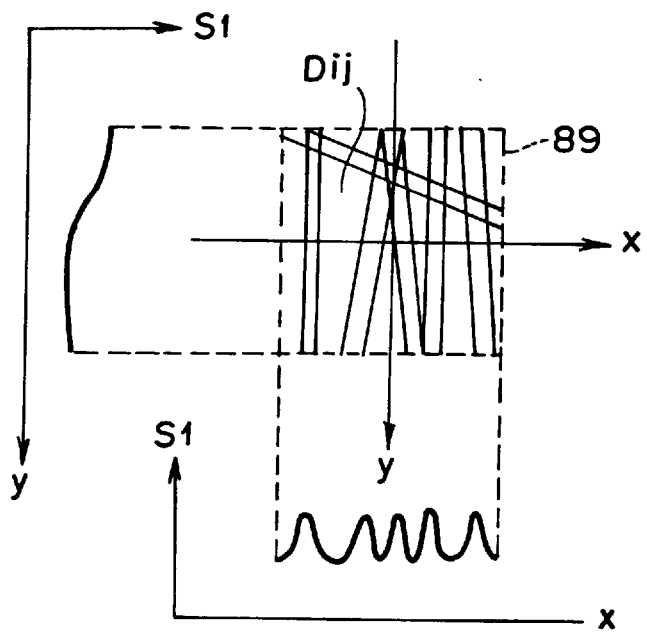
FIG. 20B is a diagram showing a predetermined region designated in the X-ray image, which region is composed of many linear patterns, such as blood vessel images, and profiles of the X-ray image in the region along the x and y directions.

FIG. 20A is a diagram showing a predetermined region Dij designated from among those shown in FIG. 21, which region corresponds to a true tumor image, and profiles of the X-ray image in the region along the x and y directions. FIG. 20B is a diagram showing a predetermined region Dij designated from among those shown in FIG. 21, which region is composed of many linear patterns, such as blood vessel images, and profiles of the X-ray image in the region along the x and y directions. In each of FIGS. 20A and 20B, the region surrounded by the broken line 89 corresponds to one of the regions Dij, which are divided from one another in FIG. 21. The graphs show the profiles of the X-ray image (i.e. the distributions of the values of the image signal S1) in the region Dij along the x and y directions.

As shown in FIG. 20A, a tumor image has concave, comparatively flat profiles in the x and y directions. On the other hand, as shown in FIG. 20B, in a region composed of many linear patterns, the image profile in one direction (x direction in FIG. 20B) changes at short intervals, and the image profile in the other direction (y direction in FIG. 20B) is comparatively flat. Therefore, the difference in image profile is utilized during the judgment as to whether each region Dij corresponds to a region composed of many linear patterns or to a tumor image. Specifically, a mean value is calculated from the square values of first-order differences between the values of image signal components representing adjacent picture elements, which are located along each of the x and y directions in the region Dij. The calculations are carried out with the formulas $$Zx = \sum_{\substack{m \, n \\ (m,n) \subseteq Dij}} \{f(m+1, n) - f(m, n)\}^2 / N \tag{47}$$

$$Zy = \sum_{\substack{m \, n \\ (m,n) \subseteq Dij}} \{f(m, n+1) - f(m, n)\}^2 / N \tag{48}$$

In Formulas (47) and (40), m, where m=1, 2, . . . , denotes picture elements located along the x direction, and n, where n=1, 2, . . . , denotes picture elements located along the y direction. Also, f(m,n) denotes the values of image signal components representing the picture elements (m,n). Further, $$\sum_{\substack{m \, n \\ (m,n) \subseteq Dij}}$$

denotes the addition of the square values of first-order differences in the region Dij, and N denotes the number of picture elements in the region Dij.

Thereafter, a calculation is made to find a characteristic value C5 which is used during the judgment as to whether the region Dij corresponds or does not correspond to a region composed of many linear patterns. The calculation is carried out with the formula $$C5 = \frac{\min(Zx, Zy)}{\max(Zx, Zy)} \tag{49}$$

where min(Zx,Zy) denotes the mean value Zx or the mean value Zy, whichever is smaller, and max(Zx,Zy) denotes the mean value Zx or the mean value Zy, whichever is larger. The characteristic value C5 is then compared with a predetermined threshold value Th6. When C5≧Th6, it is judged that the region Dij has a high probability of corresponding to a tumor image. When C5<Th6, it is judged that the region Dij corresponds to a region composed of many linear patterns and therefore has a low probability of corresponding to a tumor image.

The characteristic value C5 need not necessarily be calculated with Formula (49), but may be calculated with, for example, one of the formulas $$C5 = \frac{|Zx - Zy|}{Zx + Zy} \quad (50)$$

$$C5 = |Zx - Zy| \quad (51)$$

Also, in the example described above, calculations are carried out to find the first-order differences f(m+1,n)−f(m, n), f(m,n+1)−f(m,n) between the values of image signal components representing adjacent picture elements, which are located along each of the x and y directions in the region Dij. Alternatively, calculations may be made to find differences between the values of image signal components representing adjacent picture elements, which are located in the region Dij along oblique directions, which are not perpendicular to the x direction nor to the y direction. As another alternative, instead of calculating the mean value from the square values of the first-order differences, a mean value may be calculated from the absolute values of the first-order differences.

In the computer system 40 shown in FIG. 4, the operations described above are repeated for the respective regions Dij shown in FIG. 21. In this manner, regions having a high probability of corresponding to a tumor image is found.

After regions having a high probability of being a tumor image are found, a visible image represented by the image signal S1 is reproduced and displayed on a CRT display device such that the images of the regions can be viewed clearly. Such a visible image can serve as an effective tool in, particularly, the efficient and accurate diagnosis of an illness.

In this embodiment, filtering operations may then be carried out on the image signal components corresponding to the picture elements located in the regions, which have been found as having a high probability of corresponding to a tumor image, and the image signal components corresponding to the picture elements in the vicinity of these regions. In the filtering operations, each of these picture elements is taken as a predetermined picture element P0. In this manner, only the regions having a higher probability of corresponding to a tumor image may be extracted from the regions which have once been found as having a high probability of corresponding to a tumor image.

The filtering operations are carried out with the spatial-domain filter which has been described above with reference to FIGS. 5, 6, and 7 and which uses Formulas (3), (4), and (5). A judgment is made as to whether the predetermined picture element P0 falls or does not fall within the region corresponding to a tumor image.

The spatial-domain filter is used to process the image signal components corresponding to the picture elements located in the regions Dij, which have been found as having a high probability of corresponding to a tumor image, and the image signal components corresponding to the picture elements in the vicinity of these regions Dij. That is, each of the picture elements located in the regions Dij and in the vicinity thereof is taken as the predetermined picture element P0, and a judgment is made as to whether the predetermined picture element P0 falls or does not fall within the region corresponding to a tumor image. In this manner, only the regions having a higher probability of corresponding to a tumor image can be extracted from the regions Dij which have once been found as having a high probability of corresponding to a tumor image.

No limitation is imposed on the type of the filter used to extract the regions, which have a higher probability of corresponding to a tumor image, from the regions Dij which have once been found as having a high probability of corresponding to a tumor image. For example, the filter described above with reference to FIGS. 5 and 8 may be employed. With this filter, the gradients $\nabla$fi of the image signal components fij representing the picture elements Pij, where i=1, 2, ..., 8 and j=1, 2, 3, which are shown in FIG. 5, are found. The characteristic value C2 is then calculated and compared with the predetermined threshold value Th2. From the results of the comparison, a judgment is made as to whether a predetermined picture element P0 falls or does not fall within the region corresponding to a tumor image. Alternatively, the filter, which has been described above with reference to FIG. 5 and which use Formulas (7) through (18) may be employed. Also, any of other filters may be employed.

After the regions having a higher probability of corresponding to a tumor image are extracted with the filtering operations, a visible image is displayed on the CRT display device 44 shown in FIG. 4 such that images of the extracted regions can be observed clearly.

In the aforesaid embodiments of the circular pattern judging method and apparatus in accordance with the present invention, judgments are first carried out as to the levels of the probability that the regions Dij will fall within the region corresponding to a tumor image. Alternatively, regions, which are considered as corresponding to a tumor image may first be found by scanning the image signal S1 with the spatial-domain filter described above. Thereafter, each of the thus found regions may be taken as a predetermined region, and a judgment may then be made as to the level of the probability that each region will fall within the region corresponding to a tumor image.

In the aforesaid embodiments of the circular pattern judging method and apparatus in accordance with the present invention, from an X-ray image of the chest of a human body, which image has been stored on a stimulable phosphor sheet, a tumor image is detected which appears, typically, as a circular pattern on the X-ray image. However, the circular pattern judging method and apparatus in accordance with the present invention are not limited to the detection of a tumor image nor to the processing of X-ray images of chests. Also, recording media other than stimulable phosphor sheets may be used. The circular pattern judging method and apparatus in accordance with the present invention are applicable widely when, from an image signal representing a radiation image of an object, circular patterns in the radiation image are detected.

An embodiment of the fourth abnormal pattern detecting apparatus in accordance with the present invention will be described hereinbelow. In this embodiment, an X-ray image is stored on a stimulable phosphor sheet, and an image of a tumor, which typically has an approximately spherical shape in the lungs of a human body, is detected as an abnormal pattern from the X-ray image. In a visible image reproduced from an image signal representing the X-ray image, the tumor image typically appears as an approximately circular pattern having a lower density than the areas of the image surrounding the tumor image.

Figure 22:
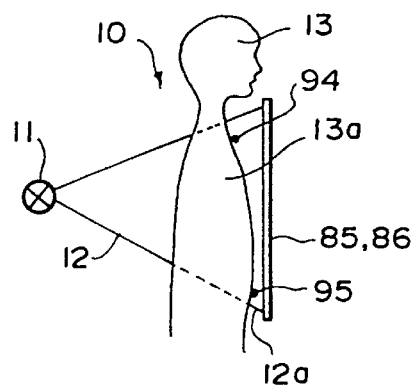
FIG. 22 is a schematic view showing an example of an X-ray image recording apparatus.

FIG. 22 is a schematic view showing an example of an X-ray image recording apparatus.

With reference to FIG. 22, X-rays 12 are produced by an X-ray source 11 of an X-ray image recording apparatus 10 and irradiated to the chest 13a of a human body 13. X-rays 12a, which have passed through the human body 13, impinge upon a first stimulable phosphor sheet 85. In this manner, a first X-ray image of the chest 13a of the human body 13 is stored on the first stimulable phosphor sheet 85.

Thereafter, the first stimulable phosphor sheet 85 is quickly removed from the X-ray image recording apparatus 10, and a second stimulable phosphor sheet 86 is quickly set therein. Also, the tube voltage of the X-ray source 11 is changed. The X-ray image recording operation is then carried out for the second stimulable phosphor sheet 86. In this manner, a second X-ray image of the same object 13 is stored on the second stimulable phosphor sheet 86 with X-rays, which have a different energy distribution than the X-rays used during the recording of the first X-ray image on the first stimulable phosphor sheet 85. The object 13 is provided with marks 94 and 95, and images of the marks 94 and 95 are also recorded on the first stimulable phosphor sheet 85 and the second stimulable phosphor sheet 86. As an aid in facilitating the explanation, the reference numerals 94 and 95 will hereinafter denote both the marks and the images thereof. The marks 94 and 95 are used when the positions of the first X-ray image stored on the first stimulable phosphor sheet 85 and the second X-ray image stored on the second stimulable phosphor sheet 86 are adjusted so that they coincide with each other.

Instead of the first stimulable phosphor sheet 85 and the second stimulable phosphor sheet 86 being set one after another in the X-ray image recording apparatus 10, the two stimulable phosphor sheets may be set simultaneously with a filter intervening therebetween in the X-ray image recording apparatus 10. The filter filters out high-energy components of the X-rays and transmits low-energy components of the X-rays. In this manner, the first X-ray image and the second X-ray image may be stored respectively on the first stimulable phosphor sheet 85 and the second stimulable phosphor sheet 86 with a single, simultaneous exposure to the X-rays.

Figure 23:
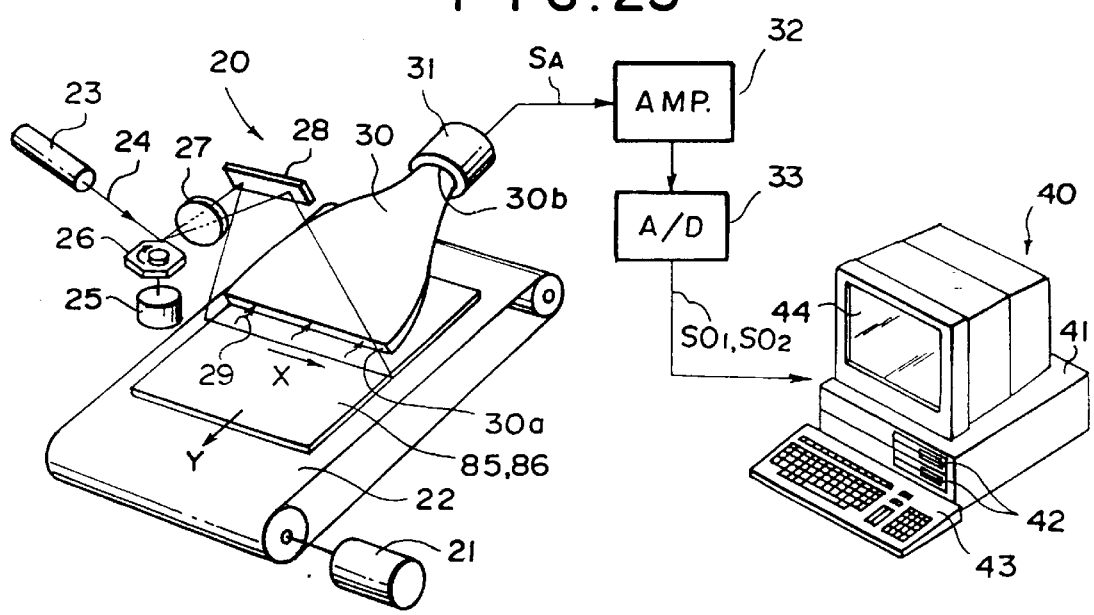
FIG. 23 is a perspective view showing an example of an X-ray image read-out apparatus and a computer system which is provided with an embodiment of the fourth abnormal pattern detecting apparatus in accordance with the present invention.

FIG. 23 is a perspective view showing an example of an X-ray image read-out apparatus and a computer system 40 which is provided with an embodiment of the fourth abnormal pattern detecting apparatus in accordance with the present invention. In FIG. 23, similar elements are numbered with the same reference numerals with respect to FIG. 4.

After the image recording operations are carried out with the X-ray image recording apparatus 10 shown in FIG. 22, the first stimulable phosphor sheet 85 and the second stimulable phosphor sheet 86 are set one after another at a predetermined position in the X-ray image read-out apparatus shown in FIG. 23. The first and second X-ray images are read out from the first stimulable phosphor sheet 85 and the second stimulable phosphor sheet 86.

An analog output signal SA generated by the photomultiplier 31 is logarithmically amplified by the logarithmic amplifier 32 and digitized by the A/D converter 33. In this manner, an image signal SO is obtained as an electric signal.

The image signal SO is then fed into the computer system 40. The image signal SO represents the first X-ray image stored on the first stimulable phosphor sheet 85. Therefore, the image signal SO will hereinbelow be referred to as the first image signal SO1.

The computer system 40 is provided with an embodiment of the fourth abnormal pattern detecting apparatus in accordance with the present invention.

Thereafter, in the same manner as that described above, a second image signal SO2 is obtained, which represents the second X-ray image stored on the second stimulable phosphor sheet 86. The second image signal SO2 is fed into the computer system 40.

From the first image signal SO1 and the second image signal SO2 which have been fed into the computer system 40, an abnormal pattern in the X-ray image is detected.

Hardware and software functions of the computer system 40 constitute the respective means of the fourth abnormal pattern detecting apparatus in accordance with the present invention.

Image operation means

As described above, the first image signal SO1 and the second image signal SO2 represent the first and second X-ray images, which were recorded with the X-rays having different energy distributions. The X-rays having different energy distributions exhibit different transmittances with respect to soft tissues and bones of the object (the chest of a human body in this case). Therefore, by carrying out the subtraction processing on the first and second X-ray images, an image of only the soft tissues of the object can be obtained.

From the first image signal SO1 and the second image signal SO2, the computer system 40 adjusts the positions of the first and second X-ray images in the manner described below. In this embodiment, the process for adjusting the positions is employed which is disclosed in U.S. Pat. No. 4,710,875.

The marks 94 and 95 in the first X-ray image represented by the first image signal SO1 will hereinbelow be referred to as the marks 94' and 95'. Also, the marks 94 and 95 in the second X-ray image represented by the second image signal SO2 will hereinbelow be referred to as the marks 94" and 95". The marks 94' and 95' respectively have coordinates (XA1,YA1) and coordinates (XA2,YA2). The marks 94" and 95" respectively have coordinates (XB1,YB1) and coordinates (XB2,YB2).

The following formula obtains:

$$\theta = \tan^{-1}\left(\frac{YB2-YB1}{XB2-XB1}\right) - \tan^{-1}\left(\frac{YA2-YA1}{XA2-XA1}\right) \qquad (52)$$

where θ denotes the angle of rotation between the two X-ray images, i.e. the angle between the line, which connects the coordinates (XA1,YA1) and the coordinates (XA2,YA2), and the line, which connects the coordinates (XB1,YB1) and the coordinates (XB2,YB2). The positions of the two X-ray images can be caused to coincide with each other by rotating the first X-ray image by the angle θ.

A shift ΔX1 along the x direction between the marks 94' and 94" in the two X-ray images and a shift ΔY1 along the y direction between the marks 94' and 94" in the two X-ray images are expressed as $$\Delta X1 = XB1 - \{\alpha \cdot (XA1-CX) \cdot \cos\theta - \alpha(YA1-CY) \cdot \sin\theta + CX\} \qquad (53)$$

$$\Delta Y1 = YB1 - \{\alpha \cdot (XA1-CX) \cdot \sin\theta + \alpha(YA1-CY) \cdot \cos\theta + CY\} \qquad (54)$$

Also, a shift ΔX2 along the x direction between the marks 95' and 95" in the two X-ray images and a shift ΔY2 along the y direction between the marks 95' and 95" in the two X-ray images are expressed as $$\Delta X2 = XB2 - \{\alpha \cdot (XA2-CX) \cdot \cos\theta - \alpha(YA2-CY) \cdot \sin\theta + CX\} \qquad (55)$$

$$\Delta Y2 = YB2 - \{\alpha \cdot (XA2-CX) \cdot \sin\theta + \alpha(YA2-CY) \cdot \cos\theta + CY\} \qquad (56)$$

In Formulas (53) through (56), CX and CY respectively denote the X and Y coordinates of the center of rotation.

In ideal cases, ΔX1 and ΔX2 will be equal to each other. Also, ΔY1 and ΔY2 will be equal to each other. However, in some cases, they will not be equal to each other because of errors in sampling of the image signals SO1 and SO2. Therefore, position adjustment amounts ΔX and ΔY along the X and Y directions are calculated from the formulas $$\Delta X = (\Delta X1 + \Delta X2)/2 \tag{57}$$

$$\Delta Y = (\Delta Y1 + \Delta Y2)/2 \tag{58}$$

The amounts thus calculated are used during the adjustment of the position of the first X-ray image along the X and Y directions.

In the manner described above, a first image signal SO1' and a second image signal SO2' are obtained, which respectively represent the first and second X-ray images whose positions have been adjusted. The image signal components of the first image signal SO1' and the second image signal SO2' which represent corresponding picture elements in the two X-ray images are then subtracted from each other. The subtraction processing is expressed as $$S1 = Wa \cdot SO1' - Wb \cdot SO2' + C \tag{59}$$

where Wa and Wb denote weight factors, and C denotes the bias component. In this manner, a soft tissue image signal S1 is obtained which represents an image of the soft tissues.

Figure 24A:
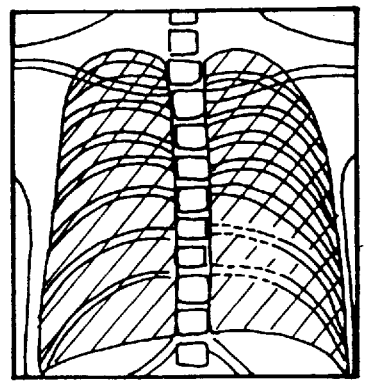
FIGS. 24A and 24B are schematic views respectively showing an original image and a soft tissue image.
Figure 24B:
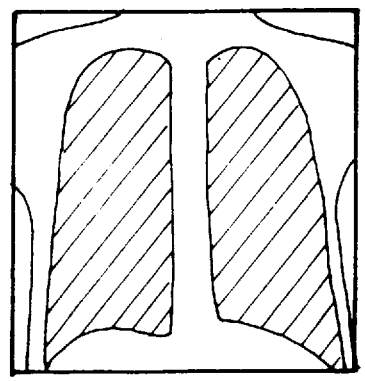

FIG. 24A shows an example of an original image, which is represented by the image signal SO1 or the image signal SO2 and which comprises bone images and a soft tissue image. FIG. 24B shows an example of a soft tissue image.

In the soft tissue image shown in FIG. 24B, the bone images have been eliminated from the original image shown in FIG. 24A, and only the image of soft tissues is formed.

When necessary, the image operation means carries out other image processing, such as frequency response enhancement processing, smoothing processing, or noise elimination processing on the first image signal SO1 and the second image signal SO2 or on the soft tissue image signal S1.

Abnormal pattern finding means

An abnormal pattern finding means, which is provided in the computer system 40, finds a tumor image, which appears in the soft tissue image, by processing the soft tissue image signal S1, which has been obtained from the image operation means, with an abnormal pattern finding filter.

FIG. 5 is a diagram having a predetermined picture element P0 from a soft tissue image in the middle, which diagram serves as an aid in explaining how a spatial-domain filter works.

A judgment is made as to whether a predetermined picture element P0 in the soft tissue image falls or does not fall within the region corresponding to the tumor image in the soft tissue image. The tumor image in the soft tissue image can be detected by processing the image signal components representing the picture elements of the soft tissue image with the filter illustrated in FIG. 5.

Figure 25:
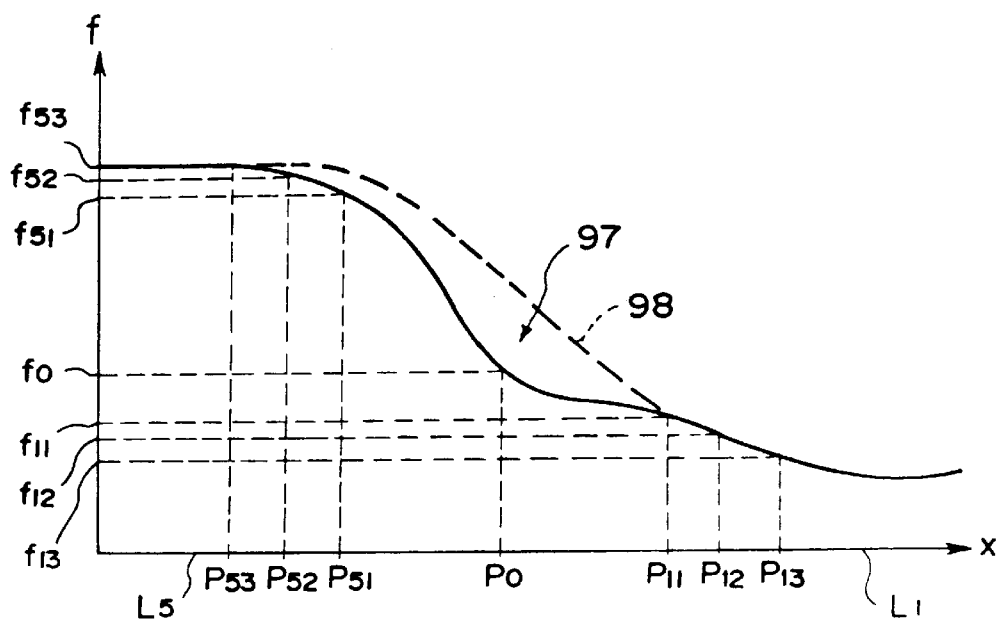
FIG. 25 is a graph showing an example of the profile of a soft tissue image around a predetermined picture element P0 in the direction (x direction) along which the lines L1 and L5 shown in FIG. 5 extend.

FIG. 25 is a graph showing an example of the profile of a soft tissue image around a predetermined picture element P0 in the direction (x direction) along which the lines L1 and L5 shown in FIG. 5 extend. In this example, the predetermined picture element P0 is located in a region where the image density (i.e. the value of the soft tissue image signal S1) changes sharply. Typically, the profile of a tumor image (i.e. the distribution of the values of the image signal components representing the tumor image) is approximately symmetric bilaterally. However, in cases where, for example, a tumor image 97 is located in a region where the image density changes sharply, as in the illustrated example, it often occurs that the profile of the tumor image 97 is not symmetric bilaterally. It is important that the tumor image 97 can be detected even in such cases. In FIG. 25, the broken line 98 represents an example of the profile of a soft tissue image including no tumor image.

As shown in FIG. 5, a plurality of (in this case, eight) imaginary lines Li, where i=1, 2, . . . , 8, extend from the predetermined picture element P0 in the soft tissue image to peripheral parts of the soft tissue image. Also, imaginary circles Rj, where j=1, 2, 3, having radii r1, r2, and r3 extend around the predetermined picture element P0. The soft tissue image signal component f0 representing the predetermined picture element P0 is found. Also, the soft tissue image signal components fij are found which represent the picture elements Pij located at the intersections of each of the lines Li and the circles Rj. (In FIG. 5, P11, P12, and P13 denote picture elements located at the intersections of a line L1 and circles R1, R2, and R3. Also, P51, P52, and P53 denote the picture elements located at the intersections of a line L5 and the circles R1, R2, and R3.)

Thereafter, differences Δij between the value of the soft tissue image signal component f0 representing the predetermined picture element P0 and the values of the soft tissue image signal components fij representing the picture elements Pij are calculated from Formula (60), which is expressed as $$\Delta ij = fij - f0 \tag{60}$$

(i=1,2, . . . ,8; j=1,2,3)

For each of the lines Li, the maximum value of the differences Δij, which have been calculated from Formula (60), is then found. Specifically, for the line L1, the maximum value of the differences between the value of the soft tissue image signal component f0 representing the predetermined picture element P0 and the values of the soft tissue image signal components f11, f12, and f13 representing the picture elements P11, P12, and P13 is found. The differences can be expressed as $$\Delta 11 = f11 - f0$$

$$\Delta 12 = f12 - f0$$

$$\Delta 13 = f13 - f0$$

In this example, as illustrated in FIG. 25, Δ13<Δ12<Δ11<0, and therefore the difference Δ11 is found to be the maximum value.

In this embodiment, typically, a circular pattern (tumor image) is detected which has the characteristic that the value of the soft tissue image signal component corresponding to the center position of the circular pattern is smaller than the values of the soft tissue image signal components corresponding to the peripheral portions of the circular pattern. However, for the line L1, the differences Δ13, Δ12, and Δ11 are negative. Therefore, the maximum value Δ11 which was found for the line L1 is not one which would be effective. Accordingly, in this case, a value of 0.0 is taken as the representative value, which is representative of the differences Δ11, Δ12, and Δ13, for the line L1. Alternatively, a maximum value, which has been found from the aforesaid differences, may directly be employed as the representative value.

For the line L5, the maximum value of the differences between the value of the image signal component f0 representing the predetermined picture element P0 and the values of the image signal components f51, f52, and f53 representing the picture elements P51, P52, and P53 is also found. The differences are expressed as $$\Delta 51 = f51 - f0$$

$$\Delta 52 = f52 - f0$$

$$\Delta 53 = f53 - f0$$

In this example, the difference Δ53 is found to be the maximum value and is employed as the representative value, which is representative of the differences Δ51, Δ52, and Δ53, for the line L5.

In the manner described above, for each of the lines Li, the differences Δij between the value of the soft tissue image signal component f0 representing the predetermined picture element P0 and the values of the soft tissue image signal components fij representing the picture elements Pij are calculated, and the maximum value of the differences is found. In cases where the maximum value of the differences thus found is an effective one, the maximum value is taken as the representative value with respect to the corresponding line. In cases where the maximum value of the differences thus found is not an effective one, a value of 0.0 is taken as the representative value with respect to the corresponding line.

Thereafter, calculations are made to find the mean-level value, for example, the mean value, of two representative values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is given by the formula $$M15 = \frac{0.0 + \Delta 53}{2} \qquad (61)$$

As described above, two lines extending from the predetermined picture element P0 in opposite directions are grouped into a single set. Therefore, a tumor image can be detected accurately even when, as shown in FIG. 25, it is present in a region where the image density changes sharply and the distribution of the values of the soft tissue image signal components representing the tumor image is asymmetric.

From the mean values M15, M26, M37, and M48, which have been calculated in the manner described above, a judgment is made as to whether the predetermined picture element P0 falls or does not fall within the region corresponding to the tumor image. No limitation is imposed on how the judgment is made from the mean values M15, M26, M37, and M48. By way of example, the judgment may be made in the manner described below.

Figure 26:
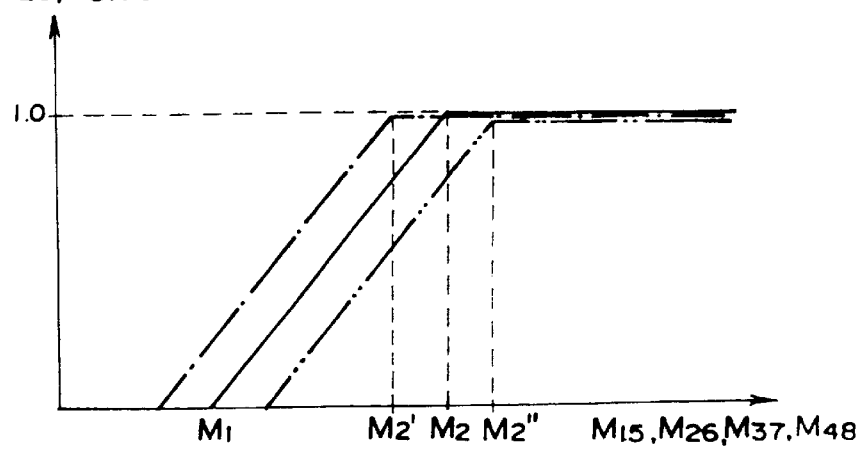
FIG. 26 is a graph showing how a characteristic value is determined which is used during a judgment as to whether a predetermined picture element P0 falls or does not fall within the region corresponding to a tumor image.
Figure 28:
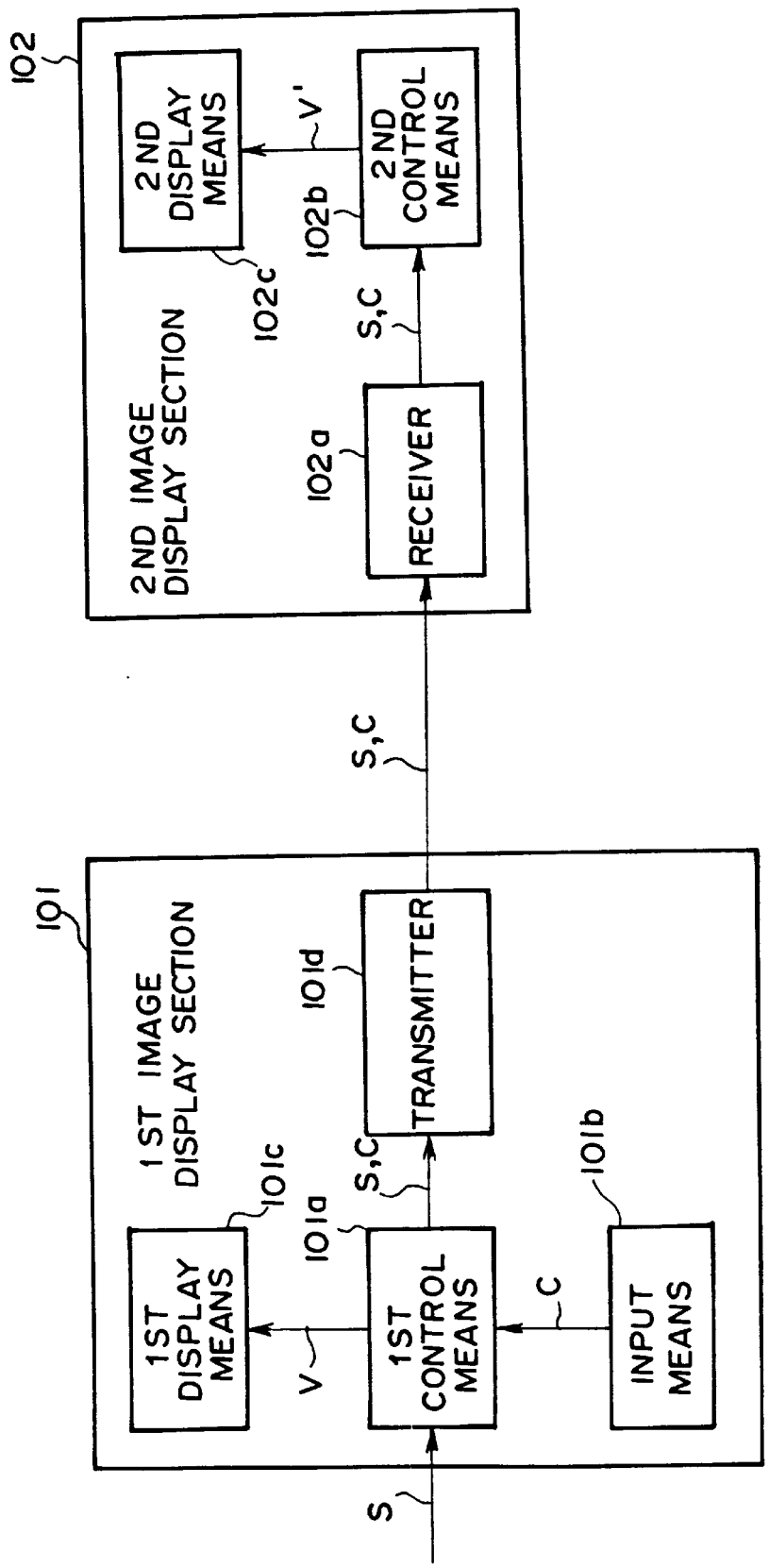
FIG. 28 is a block diagram showing the image display apparatus in accordance with the present invention.

FIG. 26 is a graph showing how a characteristic value C6 is determined which is used during the judgment as to whether the predetermined picture element P0 falls or does not fall within the region corresponding to the tumor image. In FIG. 26, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C6 = C15 + C26 + C37 + C48 \qquad (62)$$

is taken as the characteristic value C6. The characteristic value C6 will fall within the range of a minimum value 0.0 to a maximum value 4.0.

The characteristic value C6 is then compared with a predetermined threshold value Th7. From whether C6≧Th7 or C6<Th7, the judgment is made as to whether the predetermined picture element P0 falls or does not fall within the region corresponding to the tumor image.

In cases where the rating values C15, C26, C37, and C48 are calculated from an equation such as the one represented by the single-dot chained line in FIG. 26, wherein saturation is reached at a small mean value, e.g. M2', the characteristic value C6 calculated from Formula (62) will take a larger value in cases where the shape of the tumor image is closer to a circle. In cases where the rating values C15, C26, C37, and C48 are calculated from an equation such as the one represented by the double-dot chained line in FIG. 26, wherein saturation is reached at a large mean value, e.g. M2", the characteristic value C6 calculated from Formula (62) will take a larger value in cases where the contrast of the tumor image with respect to the surrounding image regions is higher. Therefore, an appropriate equation for transforming the mean values into the rating values can be selected in accordance with the characteristics of the tumor image which is to be found.

The process of making the judgment from the mean values M15, M26, M37, and M48 is not limited to using the characteristic value C6 and may be carried out in various other manners. For example, the mean values M15, M26, M37, and M48 may be compared with a threshold value Th8. In cases where all of the mean values M15, M26, M37, and M48 are larger than the threshold value Th8, it may be judged that the predetermined picture element P0 falls within the region corresponding to the tumor image. Alternatively, in cases where at least three of the mean values M15, M26, M37, and M48 are larger than the threshold value Th8, it may be judged that the predetermined picture element P0 falls within the region corresponding to the tumor image. As another alternative, the sum, M=M15+M26+M37+M48, of the mean values M15, M26, M37, and M48 may be calculated and compared with a threshold value Th9. In cases where M≧Th9, it may be judged that the predetermined picture element P0 falls within the region corresponding to the tumor image.

The algorithms employed in the filter for finding a tumor image are not limited to those described above. A filter utilizing different algorithms (which is employed in the sixth abnormal pattern detecting apparatus in accordance with the present invention) will be described hereinbelow. (Such a filter is proposed in U.S. Pat. No. 5,033,100.)

Specifically, calculations are made to find the gradients ∇fij of the soft tissue image signal components fij representing the picture elements Pij, where i=1, 2, . . . , 8 and j=1, 2, 3, which are shown in FIG. 5.

FIG. 8 shows the gradient of a soft tissue image signal component fij. How it is calculated is described below.

After the gradients ∇fij have been calculated, the magnitudes of the gradients ∇fij are made equal to 1.0. Specifically, the normalized gradients ∇fij/|∇fij| can be calculated by dividing the gradients ∇fij by their magnitudes |∇fij|.

Thereafter, the projections of the normalized gradients $\nabla fij/|\nabla fij|$ onto the vectors directed from the picture elements Pij to the predetermined picture element P0 are calculated. The projections are expressed as $\nabla fij/|\nabla fij| * \mathbf{e}\, i$, where $\mathbf{e}\, i$ denotes the unit vectors directed from the picture elements Pij to the predetermined picture element P0, and * denotes the inner product.

As for the sign of the projections, the direction heading towards the predetermined picture element P0 is taken as positive, and the direction heading away from the predetermined picture element P0 is taken as negative. For each of the lines Li, where i=1, 2, . . . , 8, the maximum value of the projections is found. The maximum value is expressed as $$\{\nabla fij/|\nabla fij| * \mathbf{e}\, i\}m (i=1,2,\ldots,8)$$

In this embodiment of the sixth abnormal pattern detecting apparatus in accordance with the present invention, the maximum value is employed as the representative value, which is representative of the value of the projections, for each of the lines Li.

Thereafter, the sum of the maximum values which were found for each of the respective lines Li is calculated. This sum is expressed as $$\sum_{i=1}^{8} \{\nabla fij/|\nabla fij| * ei\}m$$

The mean value of the maximum values can be obtained by dividing the sum by the number of lines Li (eight in this example). The sum is equal to the product of the mean value and a fixed number and can, therefore, be regarded as being equivalent to the mean value. In this embodiment of the sixth abnormal pattern detecting apparatus in accordance with the present invention, the sum is employed as the mean-level value of the representative values.

The sum expressed as $$\sum_{i=1}^{8} \{\nabla fij/|\nabla fij| * ei\}m$$

is taken as a characteristic value C7. The characteristic value C7 is then compared with a predetermined threshold value Th10. From whether $C7 \geq Th10$ or $C7 < Th10$, a judgment is made as to whether the predetermined picture element P0 falls or does not fall within the region corresponding to the tumor image.

With the filter described above, the gradients $\nabla fij$ are normalized, and only the projections thereof (i.e. the extent of differences in the value of the signal components in the directions of the lines Li) onto vectors directed from the picture elements Pij to the predetermined picture element P0 are taken into consideration. Therefore, a characteristic value C7 is obtained, which will be large for a tumor image having a circular shape and which does not depend on the contrast of the tumor image with respect to the image regions around the tumor image. Accordingly, the tumor image can be detected accurately.

As can be understood from FIG. 25, for the line L1, the projections $\nabla fij/|\nabla fij| * \mathbf{e}\, i$, where j=1, 2, 3, are negative, and therefore the maximum value $\{\nabla fij/|\nabla fij| * \mathbf{e}\, i\}m$ of the projections is negative. Therefore, the maximum value thus found is not effective for the sixth abnormal pattern detecting apparatus in accordance with the present invention. Accordingly, for the line L1, instead of the maximum value being employed, a value of 0.0 may be assigned to the representative value.

In the aforesaid embodiments of the fourth and sixth abnormal pattern detecting apparatuses in accordance with the present invention, as shown in FIG. 5, the soft tissue image signal components fij representing the picture elements Pij located on eight lines, L1 through L8, are employed. However, the number of lines Li is not limited to eight, but may, for example, be 16. Also, the distances from the predetermined picture element P0 are not limited to the three distances (r1, r2, and r3). In cases where the sizes of the tumor images, which are to be detected, are approximately the same, only a single distance need be employed (as in the fifth abnormal pattern detecting apparatus in accordance with the present invention). (In such cases, the operations for finding the representative values are unnecessary.) Also, in order for tumor images having various sizes to be detected more accurately, operations may be carried out for a plurality of distances whose lengths vary approximately continuously between the length of the distance r1 and the length of the distance r3.

A filter utilizing different algorithms (which is employed in the seventh abnormal pattern detecting apparatus in accordance with the present invention) will be described hereinbelow. (Such a filter is proposed in U.S. Pat. No. 5,033,100.)

FIG. 27 is a diagram having a predetermined picture element P0 from a soft tissue image in the middle, which diagram serves as an aid in explaining how the algorithms work.

As shown in FIG. 27, a plurality of (in this case, eight) imaginary lines Li, where i=1, 2, . . . , 8, extend from the predetermined picture element P0 in the soft tissue image to the peripheral parts of the soft tissue image. Also, an imaginary circle R having a radius r extends around the predetermined picture element P0. Thereafter, the area of a center region Q0 which includes the predetermined picture element P0 is selected. Also, the areas of peripheral regions Qi are selected which peripheral regions respectively include picture elements Pi (i=1, 2, . . . , 8) located at the intersections of the lines Li (i=1, 2, . . . , 8) and the circle R. The radius r, the area of the center region Q0, and the areas and number of the peripheral regions Qi are selected appropriately in accordance with the size of the tumor image which is to be detected, the level of accuracy required of the judgment, the speed with which the operations must be carried out, or the like. In the embodiment of FIG. 27, picture elements Pi are employed which are located at equal distances r from the predetermined picture element P0. Alternatively, the distances of the picture elements Pi from the predetermined picture element P0 may vary. For example, in cases where a tumor image is to be detected which has a long axis extending along the X direction in FIG. 27, picture elements, which are more remote from the predetermined picture element P0 than the picture elements P1 and P5, may be employed in lieu of the picture elements P1 and P5.

Thereafter, a calculation is made to find a mean-level value Q0 of the values of soft tissue image signal components representing a plurality of picture elements, which are located in the center region Q0. Also, calculations are made to find mean-level values Qi, where i=1, 2, . . . , 8, each representing the mean level of the values of soft tissue image signal components representing a plurality of picture elements located in each of the peripheral regions Qi. As an aid in facilitating the explanation, Q0 represents both the center region and the mean-level value of the values of soft tissue image signal components representing the picture elements, which are located in the center region. Also, Qi, where i=1, 2, . . . , 8, represents both the peripheral regions and the mean-level values representing the mean level of the values of the soft tissue image signal components representing the picture elements, which are located in each of the peripheral regions.

Thereafter, differences $\Delta i$, where i=1, 2, . . . , 8, between the mean-level value Q0 corresponding to the center region and the respective mean-level values Qi corresponding to the peripheral regions are calculated from the formula $$\Delta i = Qi - Q0$$

A first characteristic value, which is representative of the differences $\Delta i$, where i=1, 2, . . . , 8, is then found. Also, a second characteristic value, which represents the amount of dispersion in the differences $\Delta i$, where i=1, 2, . . . , 8, is found. In this embodiment, the mean value of the differences $\Delta i$ is calculated from the formula $$\overline{\Delta} = \frac{1}{8} \sum_{i=1}^{8} \Delta i$$

and employed as the first characteristic value. Also, the variance of the differences $\Delta i$ is calculated with the formula $$\sigma^2 = \frac{1}{8} \sum_{i=1}^{8} (\Delta i - \overline{\Delta})^2$$

and employed as the second characteristic value.

The ratio C8 of the mean value $\overline{\Delta}$ to the variance $\sigma^2$ is then calculated with the formula $$C8 = \frac{\overline{\Delta}}{\sigma^2} \qquad (63)$$

Thereafter, the ratio C8 is compared with a predetermined threshold value Th11. In cases where $C8 \geq Th11$, because the mean value $\overline{\Delta}$ is comparatively large and the variance $\sigma^2$ is comparatively small, it is judged that the predetermined picture element P0 falls within the region corresponding to the tumor image. In cases where C8<Th11, it is judged that the predetermined picture element P0 is located in the area outside of the tumor image.

A further example of the spatial-domain filter (which is employed in the eighth abnormal pattern detecting apparatus in accordance with the present invention) will be described hereinbelow with reference to FIG. 5.

As shown in FIG. 5, a plurality of (in this case, eight) imaginary lines Li, where i=1, 2, . . . , 8, extend from the predetermined picture element P0 in the soft tissue image to the peripheral parts of the soft tissue image. Also, three imaginary circles Rj, where j=1, 2, 3, which have radii r1, r2, and r3, extend around the predetermined picture element P0. Thereafter, the area of a center region Q0 including the predetermined picture element P0 is selected. Also, the areas of peripheral regions Qij, where i=1, 2, . . . , 8 and j=1, 2, 3, are selected for each of the lines Li. Each of the peripheral regions Qij includes one of a plurality of picture elements Pij, which are located at the intersections of each of the lines Li and the circles Rj. (In FIG. 5, P11, P12, and P13 denote the picture elements located at the intersections of a line L1 and circles R1, R2, and R3. Also, P51, P52, and P53 denote the picture elements located at the intersections of a line L5 and the circles R1, R2, and R3. Further, Q11, Q12, Q13, Q51, Q52, and Q53 denote the peripheral regions which respectively include the picture elements P11, P12, P13, P51, P52, and P53.)

Thereafter, a calculation is made to find a mean-level value Q0 of the values of soft tissue image signal components representing a plurality of picture elements, which are located in the center region Q0. Also, calculations are made to find mean-level values Qij, where i=1, 2, . . . , 8 and j=1, 2, 3, each representing the mean level of the values of soft tissue image signal components representing a plurality of picture elements located in each of the peripheral regions Qij, where i=1, 2, . . . , 8 and j=1, 2, 3. As an aid in facilitating the explanation, Q0 represents both the center region and the mean-level value of the values of soft tissue image signal components representing the picture elements, which are located in the center region. Also, Qij, where i=1, 2, . . . , 8 and j=1, 2, 3, represents both the peripheral regions and the mean-level values representing the mean level of the values of the soft tissue image signal components representing the picture elements, which are located in each of the peripheral regions.

Thereafter, differences $\Delta ij$, where i=1, 2, . . . , 8 and j=1, 2, 3, between the mean-level value Q0 corresponding to the center region and the respective mean-level values Qij corresponding to the peripheral regions are calculated from the formula $$\Delta ij = Qij - Q0 \qquad (64)$$

For each of the lines Li, the maximum value $\Delta i$ of the differences $\Delta ij$ is then found. In this embodiment of the eighth abnormal pattern detecting apparatus in accordance with the present invention, the maximum value $\Delta i$ thus found is employed as the representative value.

A first characteristic value U is then found, which is representative of the maximum values $\Delta i$, where i=1, 2, . . . , 8, which have been found for the plurality of the lines Li. Also, a second characteristic value V is found, which represents the amount of dispersion in the maximum values $\Delta i$, where i=1, 2, . . . , 8. For this purpose, first, characteristic values U1, U2, U3, and U4, and characteristic values V1, V2, V3, and V4 are calculated from the formulas $$U1 = (\Delta 1 + \Delta 2 + \Delta 5 + \Delta 6)/4 \qquad (65)$$

$$U2 = (\Delta 2 + \Delta 3 + \Delta 6 + \Delta 7)/4 \qquad (66)$$

$$U3 = (\Delta 3 + \Delta 4 + \Delta 7 + \Delta 8)/4 \qquad (67)$$

$$U4 = (\Delta 4 + \Delta 5 + \Delta 8 + \Delta 1)/4 \qquad (68)$$

$$V1 = U1/U3 \qquad (69)$$

$$V2 = U2/U4 \qquad (70)$$

$$V3 = U3/U1 \qquad (71)$$

$$V4 = U4/U2 \qquad (72)$$

By way of example, the process for calculating the characteristic value U1 from Formula (65) has the effects described below. Specifically, the addition of the maximum values corresponding to two adjacent groups of peripheral regions, which are located on the same side with respect to the predetermined picture element P0, (i.e. the addition of $\Delta 1$ and $\Delta 2$, or the addition of $\Delta 5$ and $\Delta 6$) corresponds to a smoothing process. Also, the maximum values corresponding to peripheral regions, which are located on opposite sides with respect to the predetermined picture element P0, are added together (in the case of Formula (65), the sum of $\Delta 1$ and $\Delta 2$ and the sum of $\Delta 5$ and $\Delta 6$ are added together).

Such an addition is carried out in order that a tumor image can be detected even when it is present in a region where the image density changes sharply.

As for the calculation of the characteristic value V1 from Formula (69), the characteristic values U1 and U3 represent characteristics of the image in directions which are perpendicular to each other. Therefore, in cases where the shape of the tumor image is circular in FIG. 25, V1 will be approximately equal to 1.0. In cases where the predetermined picture element P0 is present in a linear image, V1 will not be equal to 1.0.

As the first characteristic value U, which is representative of the maximum values $\Delta i$, where i=1, 2, ..., 8, of the aforesaid differences, the maximum value of the characteristic values U1, U2, U3, and U4, i.e.

$$U = MAX\ (U1, U2, U3, U4) \quad (73)$$

is employed. Also, as the second characteristic value V, which represents the amount of dispersion in the maximum values $\Delta i$, where i=1, 2, ..., 8, of the aforesaid differences, the maximum value of the characteristic values V1, V2, V3, and V4, i.e.

$$V = MAX\ (V1, V2, V3, V4) \quad (74)$$

is employed. After the first characteristic value U and the second characteristic value V have been found in the manner described above, a characteristic value C9 is calculated and then used during the judgment as to whether a predetermined picture element P0 falls or does not fall within the region corresponding to the tumor image. As the characteristic value C9, the ratio of the first characteristic value U to the second characteristic value V is employed, which is expressed as $$C9 = \frac{U}{V} \quad (75)$$

The characteristic value C9 is then compared with a predetermined threshold value Th12. From whether $C9 \geq Th12$ or $C9 < Th12$, the judgment is made as to whether the predetermined picture element P0 falls or does not fall within the region corresponding to the tumor image.

In this example of the filter, as shown in FIG. 5, eight imaginary lines, L1 through L8, extend around a predetermined picture element P0 in a soft tissue image. However, the number of lines Li is not limited to eight, but may, for example, be 16. This also applies to the embodiment of the seventh abnormal pattern detecting apparatus in accordance with the present invention, which has been described above with reference to FIG. 27. Also, in the embodiment of the eighth abnormal pattern detecting apparatus in accordance with the present invention, which has been described above with reference to FIG. 5, the distances from the predetermined picture element P0 are not limited to the three distances (r1, r2, and r3). For example, in order for tumor images having various sizes to be detected more accurately, operations may be carried out for a plurality of distances whose lengths vary approximately continuously between the length of the distance r1 and the length of the distance r3.

By processing the soft tissue image signal with the spatial-domain filter described above, tumor images which appear, typically, as circular patterns in the X-ray image of the chest can be detected. However, it will often occur that regions composed of many linear patterns, such as blood vessel images, are also found as tumor images. Therefore, in this embodiment, judgments are made in the manner described below as to the level of the probability that the regions, which have once been found as tumor images, will be true tumor images. In this manner, the accuracy with which the tumor images are detected is kept high.

Judgment means

FIG. 9A is a diagram showing a region found as a tumor image, which region corresponds to a true tumor image, and profiles of the soft tissue image in the region along the x and y directions. FIG. 9B is a diagram showing a region found as a tumor image, which region is composed of many linear patterns, such as blood vessel images, and profiles of the soft tissue image in the region along the x and y directions. In each of FIGS. 9A and 9B, the region surrounded by the broken line 9, i.e. the region A, is the one which has been found as a tumor image. The graphs show the profiles of the soft tissue image (i.e. the distributions of the values of the soft tissue image signal S1) in the region A along the x and y directions.

As described above, by utilizing the difference in image profile, a judgment is made as to whether a region once found as a tumor image corresponds to true tumor image or to a region composed of many linear patterns. Specifically, calculations are carried out with Formulas (19), (20), and (21). The characteristic value C4 obtained with Formula (21) is then compared with a predetermined threshold value Th4. When $C4 \geq Th4$, it is judged that the region once found as a tumor image has a high probability of corresponding to a true tumor image. When $C4 < Th4$, it is judged that the region once found as a tumor image has a high probability of being a region composed of many linear patterns.

The characteristic value C4 need not necessarily be calculated with Formula (21), but may be calculated with, for example, one of Formulas (22) and (23). Also, in the example described above, calculations are carried out to find the first-order differences f(m+1,n)−f(m,n), f(m,n+1)−f(m,n) between the values of image signal components representing adjacent picture elements, which are located along each of the x and y directions in the region A. Alternatively, calculations may be made to find differences between the values of image signal components representing adjacent picture elements, which are located in the region A along oblique directions, which are not perpendicular to the x direction nor to the y direction. As another alternative, instead of calculating the mean value from the square values of the first-order differences, a mean value may be calculated from the absolute values of the first-order differences.

In the computer system 40 shown in FIG. 23, the judgments are made in the manner described above as to whether the regions, which have once been found as tumor images, correspond or do not correspond to true tumor images.

After regions having a high probability of being a tumor image are found, a visible image represented by the image signal is reproduced and displayed on the CRT display device 44 such that the images of the regions can be viewed clearly. Such a visible image can serve as an effective tool in, particularly, the efficient and accurate diagnosis of an illness.

In the aforesaid embodiments of the fourth through eighth abnormal pattern detecting apparatuses in accordance with the present invention, from an X-ray image of the chest of a human body, which image has been stored on a stimulable phosphor sheet, a tumor image is detected which appears, typically, as a circular pattern on the X-ray image. However, the fourth through eighth abnormal pattern detecting apparatuses in accordance with the present invention are not limited to the processing of X-ray images of chests. Also, recording media other than stimulable phosphor sheets may be used. The fourth through eighth abnormal pattern detecting apparatuses in accordance with the present invention are applicable widely when, from an image signal representing a radiation image of an object, abnormal patterns in the radiation image are detected.

An embodiment of the image finding apparatus in accordance with the present invention will be described hereinbelow. In this embodiment, an X-ray image is stored on a stimulable phosphor sheet, and an image of a tumor, which typically has an approximately spherical shape in the lungs of a human body, is detected from the X-ray image. In a visible image reproduced from the image signal S1, the tumor image typically appears as an approximately circular pattern having a lower density than the areas of the image surrounding the tumor image.

The image signal S1, which represents the X-ray image of the chest, is obtained from the A/D converter 33 shown in FIG. 4 in the same manner as that described above. The image signal S1 is then fed into the computer system 40 shown in FIG. 4. The computer system 40 is provided with an embodiment of the image finding apparatus in accordance with the present invention.

From the image signal S1 fed into the computer system 40, a tumor image in the X-ray image is found.

FIG. 5 is a diagram having a predetermined picture element P0 from an X-ray image in the middle, which diagram serves as an aid in explaining how a spatial-domain filter works. The spatial-domain filter is employed in a characteristic measure calculating means of the computer system 40 in order to find characteristic measures whose values vary in accordance with whether predetermined picture elements in the X-ray image fall or do not fall within the region corresponding to a tumor image. A characteristic measure is calculated for the predetermined picture element P0. The information about the characteristic measure is fed into a prospective tumor image finding means and used during the judgment as to whether the predetermined picture element P0 falls or does not fall within the region corresponding to the tumor image. The tumor image in the X-ray image can be detected by processing the image signal components representing the picture elements of the X-ray image with the filter illustrated in FIG. 5.

In the same manner as that described above with reference to FIGS. 5, 6, and 7, calculations are carried out with Formula (3), (4), and (5). The information about the characteristic value (characteristic measure) C1 is fed into the prospective tumor image finding means. The characteristic measure C1 is then compared with a predetermined threshold value Th1. From whether C1≧Th1 or C1<Th1, the judgment is made as to whether the predetermined picture element P0 falls or does not fall within the region corresponding to the tumor image.

The tumor image in the X-ray image can be found by processing the image signal components representing the picture elements of the X-rays with the spatial-domain filter described above, i.e. by making judgments as to whether predetermined picture elements in the X-ray image fall or do not fall within the region corresponding to the tumor image. During the processing with the filter, images which do not actually correspond to tumor images will also be found. Therefore, the patterns, which have been found with the processing, will herein be referred to as the prospective tumor images.

No limitation is imposed on the type of the filter, which is employed in the characteristic measure calculating means. For example, a filter described above with reference to FIGS. 5 and 8 may be employed wherein the gradients $\nabla f_{ij}$ of the image signal components $f_{ij}$ representing the picture elements $P_{ij}$, where $i=1, 2, \ldots, 8$ and $j=1, 2, 3$, which are shown in FIG. 5, are calculated, and the characteristic value (characteristic measure) C2 is calculated. The information about the characteristic measure C2 is fed into the prospective tumor image finding means. The characteristic measure C2 is then compared with a predetermined threshold value Th2. From whether C2≧Th2 or C2<Th2, a judgment is made as to whether the predetermined picture element P0 falls or does not fall within the region corresponding to the tumor image.

As another alternative, the filter, which has been described above with reference to FIG. 5 and which uses Formulas (7) through (18), may be employed in the characteristic measure calculating means. The information about the characteristic value (characteristic measure) C3 is fed into the prospective tumor image finding means. The characteristic measure C3 is then compared with a predetermined threshold value Th3. From whether C3≧Th3 or C3<Th3, the judgment is made as to whether the predetermined picture element P0 falls or does not fall within the region corresponding to the tumor image.

As described above, in the characteristic measure calculating means and the prospective tumor image finding means of the computer system 40 shown in FIG. 4, the image signal representing the X-ray image is processed with the spatial-domain filter, and a circular pattern, which is considered to be a tumor image, is detected.

Also, the characteristic measure calculating means of the image finding apparatus in accordance with the present invention may employ any of other filters. However, it is desirable that all of the prospective tumor images can be found regardless of whether noise (for example, patterns which are not actually the tumor images) is found together with them. Therefore, the characteristic measure calculating means should preferably employ a filter suitable for this purpose.

In the manner described above, the prospective abnormal pattern finding means finds prospective tumor images. However, it will often occur that regions composed of many linear patterns, such as blood vessel images, are also found as the prospective tumor images. In order for this problem to be eliminated, information about the positions of the prospective tumor images in the X-ray image is fed into a tumor image finding means. The tumor image finding means eliminates such regions from the prospective tumor images.

Specifically, in the same manner as that described above with reference to FIGS. 9A and 9B, the difference in image profile is utilized during the elimination of regions, which are composed of many linear patterns, from the prospective tumor images.

At this time, a difference calculating means, which is provided in the tumor image finding means of the computer system 40, calculates first-order differences between the values of image signal components representing adjacent picture elements, which are located along each of the x and y directions in the region A. Thereafter, a mean operation means, which is provided in the tumor image finding means of the computer system 40, calculates a mean value from the square values of the first-order differences with Formulas (19) and (20).

Thereafter, a judgment means, which is provided in the tumor image finding means of the computer system 40, calculates a characteristic value C4 which is used during the judgment as to whether a region is or is not to be eliminated from the prospective tumor images. The calculation is carried out with Formula (21). The characteristic value C4 is then compared with a predetermined threshold value Th4. When C4≧Th4, the region is not eliminated from the prospective tumor images. When C4<Th4, the region is eliminated from the prospective tumor images.

The characteristic value C4 need not necessarily be calculated with Formula (21), but may be calculated with, for example, one of Formulas (22) and (23). Also, in the example described above, calculations are carried out to find the first-order differences f(m+1,n)−f(m,n), f(m,n+1)−f(m,n) between the values of image signal components representing adjacent picture elements, which are located along each of the x and y directions in the region A. Alternatively, calculations may be made to find differences between the values of image signal components representing adjacent picture elements, which are located in the region A along oblique directions, which are not perpendicular to the x direction nor to the y direction.

Also, in the aforesaid embodiment of the image finding apparatus, calculations of the mean values Zx and Zy from the square values of the first-order differences need not necessarily be carried out for the image signal components corresponding to the whole region A, but may be carried out for, for example, only the image signal components corresponding to the picture elements, which are located along a single line extending along the x direction and along a single line extending along the y direction in the region A shown in FIG. 9A or FIG. 9B. As another alternative, instead of calculating the mean value from the square values of the first-order differences, a mean value may be calculated from the absolute values of the first-order differences.

In the computer system 40 shown in FIG. 4, in the manner described above, prospective tumor images are found by processing the image signal S1 with the spatial-domain filter and making judgments with one of the characteristic measures C1, C2, and C3. From the level of the characteristic value C4 calculated with Formula (21), judgments are made as to whether the prospective tumor images are or are not true tumor images. Accordingly, tumor images can be detected accurately.

In the aforesaid embodiment of the image finding apparatus in accordance with the present invention, from an X-ray image of the chest of a human body, which image has been stored on a stimulable phosphor sheet, a tumor image is detected which appears, typically, as a circular pattern on the X-ray image. However, the image finding apparatus in accordance with the present invention is not limited to the processing of X-ray images of chests. Also, recording media other than stimulable phosphor sheets may be used. The image finding apparatus in accordance with the present invention is applicable widely when, from an image signal representing a radiation image of a human body, tumor images in the radiation image are detected.

An embodiment of the image display apparatus in accordance with the present invention will be described hereinbelow.

Figure 29:
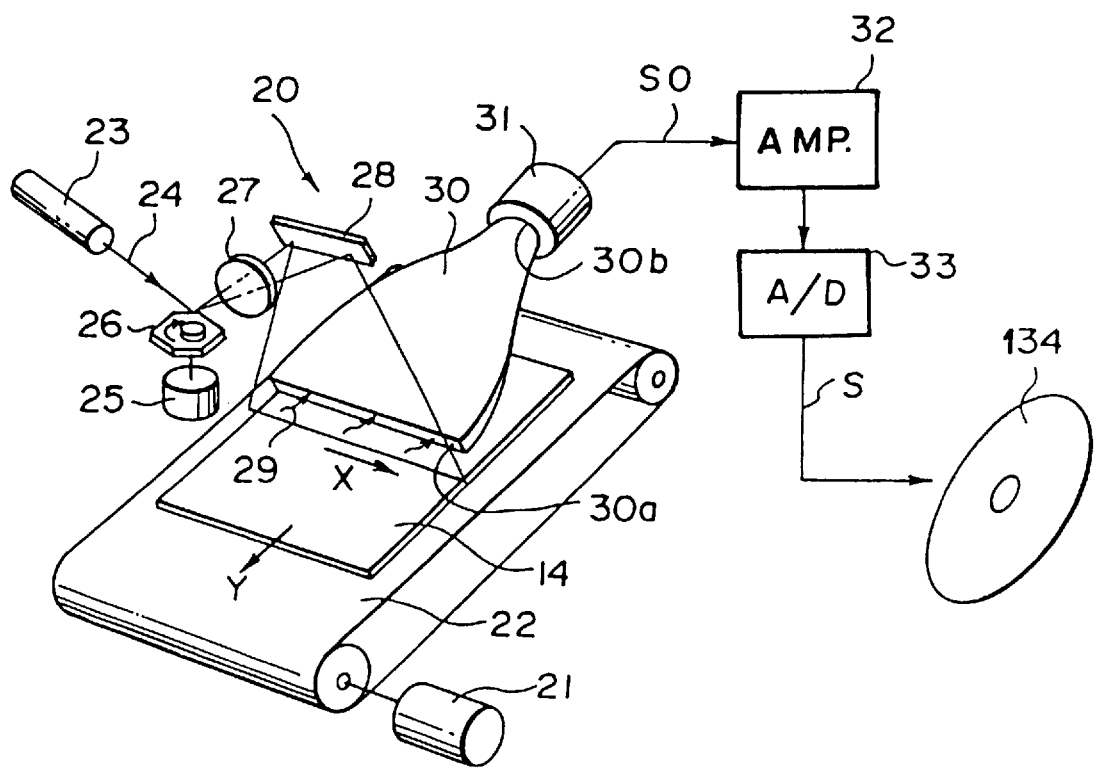
FIG. 29 is a perspective view showing an example of an image read-out apparatus.

FIG. 29 is a perspective view showing an image read-out apparatus, which is used to read out an image from a stimulable phosphor sheet, as an example of an apparatus for obtaining an image signal representing a stationary image. In FIG. 29, similar elements are numbered with the same reference numerals with respect to FIG. 4.

An analog output signal SO is generated by the photomultiplier 31 and logarithmically amplified by the logarithmic amplifier 32. The amplified signal is then digitized by the A/D converter 33 into an image signal S. The image signal S is stored on an optical disk 134.

FIG. 30 is a perspective view showing an embodiment of the image display apparatus in accordance with the present invention.

With reference to FIG. 30, the image display apparatus comprises a first image display apparatus 140 and a second image display apparatus 150. A communication line 161 connects the first image display apparatus 140 and the second image display apparatus 150.

The first image display apparatus 140 comprises an optical disk drive unit 141 for driving the optical disk 134 shown in FIG. 29, The optical disk 134 stores a plurality of image signals S, which represent a plurality of radiation images and which are obtained from the image read-out apparatus shown in FIG. 29. The first image display apparatus 140 also comprises a main body 142 in which a CPU and an internal memory are incorporated, a floppy disk drive unit 143 which operates a floppy disk serving as a subsidiary memory, and a CRT display device 144 which displays an image composed of a radiation image (stationary image) represented by an image signal S and other images, such as images of arrow marks or characters, superposed upon the stationary image. The first image display apparatus 140 further comprises a keyboard 145 from which various instructions or information are fed into the first image display apparatus 140. Such instructions include an image control signal which is designated by an operator when images of arrow marks, characters, or the like are to be superposed upon the stationary image represented by the image signal S or when part of the image is to be enlarged. The first image display apparatus 140 is also provided with a mouse 146 which is used when an image control signal for changing the position of a displayed arrow mark image is to be designated. The components of the first image display apparatus 140 other than the optical disk drive unit 141 are placed on a table 147.

The second image display apparatus 150 is constituted in the same manner as the first image display apparatus 140, except that the optical disk drive unit 141 and the mouse 146 are not provided. The second image display apparatus 150 comprises a main body 152, a floppy disk drive unit 153, a CRT display device 154, and a keyboard 155, which are placed on a table 157.

The keyboard 145 and the mouse 146 of the first image display apparatus 140 constitute an example of the input means of the image display apparatus in accordance with the present invention. The CRT display device 144 of the first image display apparatus 140 constitutes an example of the first display means of the image display apparatus in accordance with the present invention. The CRT display device 154 of the second image display apparatus 150 constitutes an example of the second display means of the image display apparatus in accordance with the present invention.

In this embodiment, after an optical disk is set in the optical disk drive unit 141, the keyboard 145 is operated and an image signal S representing a radiation image is stored in a frame memory of the main body 142. The image signal S is then read from the frame memory and fed into the CRT display device 144, and a visible image represented by the image signal S is reproduced and displayed by the CRT display device 144. Also, the image signal S, which has been fed from the optical disk into the main body 142, is fed through an interface, which is incorporated in the main body 142, and the communication line 161 into the second image display apparatus 150. In the second image display apparatus 150, the image signal S is stored in a frame memory of the main body 152. The image signal S is then read from the frame memory and fed into the CRT display device 154, and a visible image represented by the image signal S is reproduced and displayed by the CRT display device 154. The interface, which is incorporated in the first image display apparatus 140 and which is connected to the communication line 161, constitutes an example of the transmission means of the image display apparatus in accordance with the present invention. Also, the interface, which is incorporated in the second image display apparatus 150 and which is connected to the communication line 161, constitutes an example of the reception means of the image display apparatus in accordance with the present invention.

When an image control signal C representing characters is fed from the keyboard 145 of the first image display apparatus 140 into the main body 142, a character signal corresponding to the image control signal C is superposed upon the image signal S, which has been read from the frame memory. The signal comprising the character signal and the image signal S is fed into the CRT display device 144. The CRT display device 144 displays an image composed of an image, which is represented by the image signal S, and a character image superposed upon said image.

In the same manner, when an image control signal C representing an arrow mark is fed from the the keyboard 145 of the first image display apparatus 140, an arrow mark image is superposed upon the visible image displayed on the CRT display device 144. By operating the mouse 146, an image control signal C, which designates movement of the arrow mark image, can be fed into the main body 142. The arrow mark image moves in the image, which is displayed on the CRT display device 144, in accordance with the image control signal C.

The image control signals C, which have been fed from the keyboard 145 and the mouse 146, are sent to the second image display apparatus 150. In the main body 152 of the second image display apparatus 150, the character signal and the arrow mark signal are superposed upon the image signal S, which has already been received and stored in the frame memory, in accordance with the image control signals C. The resulting signal is fed into the CRT display device 154. The CRT display device 154 displays an image composed of an image, which is represented by the image signal S, and the character and arrow mark images superposed upon said image.

In cases where a region of interest (ROI) is to be designated and an enlarged image of the ROI is to be displayed, the ROI is designated by the mouse 146 and the keyboard 145 of the first image display apparatus 140. Also, an enlargement factor is designated. As a result, an image control signal C representing the enlargement factor is fed into the main body 142. In the main body 142, the image signal components of the image signal S stored in the frame memory, which correspond to the ROI, are subjected to enlargement processing. An enlarged image is then displayed on the CRT display device 144. The enlarged image can be scrolled (i.e. the ROI can be moved in the original image) by operating the mouse 146.

The image control signals C, which have been fed from the keyboard 145 and the mouse 146, are sent to the second image display apparatus 150. In the main body 152 of the second image display apparatus 150, the designation of the ROI and the enlargement processing are carried out on the image signal S, which has already been received and stored in the frame memory, in accordance with the image control signals C. The image represented by the resulting signal is displayed on the CRT display device 154. Thereafter, the displayed image is scrolled in accordance with the information about movement of the mouse. The combination of the hardware, such as the CPU's, and the software, which are incorporated in the main body 142 in order to carry out alteration of the image signal in accordance with the image control signals and to generate altered (e.g. enlarged) image signals in the first image display apparatus 140, constitutes an example of the first control means in the image display apparatus in accordance with the present invention. Also, the combination of the hardware, such as the CPU's, and the software, which are incorporated in the main body 152 in order to carry out alteration of the image signal in accordance with the image control signals and to generate altered (e.g. enlarged) image signals in the second image display apparatus 150, constitutes an example of the second control means in the image display apparatus in accordance with the present invention.

In this embodiment, the image signal representing a composite image, which is composed of an image represented by the image signal and a character or mark image superposed upon said image and which is displayed on the CRT 144 of the first image display apparatus 140, or an enlarged image, which is displayed on the CRT 144, is not directly sent to the second image display apparatus 150. An image signal representing a radiation image (stationary image) is first sent to the second image display apparatus 150. Thereafter, only the image control signal is sent thereto. In accordance with the image control signal fed into the main body 152 of the second image display apparatus 150, operations are carried out to generate an image signal representing a composite image comprising a stationary image and a character image, or the like, superposed thereupon, or an image signal representing an enlarged image. Therefore, transmission and reception of signals can be carried out efficiently.

In the image display apparatus in accordance with the present invention, various other types of processing may be carried out: e.g. image enhancement processing, such as frequency response processing or gradation processing; image modification processing, such as image size reduction or rotation; and operations between images, such as temporal (time difference) subtraction processing, energy subtraction processing, or processing of arbitrary tomographic layers. Also, a plurality of images are often used in a medical diagnosis. For example, a set of a plurality of images of an object are recorded at the same time and used during a diagnosis. Alternatively, a plurality of images of an object are recorded with the passage of time and used during a diagnosis. In such cases, a plurality of images are selectively displayed on a plurality of CRT display devices or on subdivisions, into which a single image screen of a CRT display device is divided. The aforesaid processing is meant to embrace the processing required in such cases.

The image display apparatus in accordance with the present invention is not limited to the display of a radiation image, but may be used to display ordinary types of images.

Instead of the optical disk drive unit 141 being used, an image signal may be fed directly from the image read-out apparatus into the image display apparatus in accordance with the present invention.

Also, both the first image display section and the second image display section should preferably be provided with the transmission means and the reception means.

We claim:

1. An abnormal pattern detecting apparatus wherein an abnormal pattern in a radiation image of an object is detected from an image signal made up of a series of image signal components representing the radiation image, the abnormal pattern detecting apparatus comprising:
i) prospective abnormal pattern finding means for receiving said image signal and finding prospective abnormal patterns from said image signal,
ii) information operating means for receiving said image signal and finding anatomical information concerning said object from said image signal, iii) characteristic measure calculating means for receiving said image signal and said prospective abnormal patterns and calculating a plurality of characteristic measures for each of said prospective abnormal patterns, the calculations being made from the image signal components of said image signal, which represent image information at positions in the vicinity of each of said prospective abnormal patterns, and iv) true abnormal pattern finding means which utilizes the plurality of said characteristic measures and said anatomical information to find a true abnormal pattern from said prospective abnormal patterns.

2. An abnormal pattern detecting apparatus as defined in claim 1 wherein said true abnormal pattern finding means is provided with a neural network, which receives information concerning the plurality of said characteristic measures and which outputs a measure representing the level of the probability that each of said prospective abnormal patterns will be a true abnormal pattern.

3. An abnormal pattern detecting apparatus as defined in claim 1 wherein said prospective abnormal pattern finding means includes means for findings said prospective abnormal patterns by processing said image signal with a spatial-domain filter.

4. An abnormal pattern detecting apparatus as defined in claim 1 wherein the plurality of said characteristic measures include at least one of the area, the shape, and the contrast of each of said prospective abnormal patterns.

5. An abnormal pattern detecting apparatus as defined in claim 1 wherein said radiation image of the object has been stored on a stimulable phosphor sheet.

6. An abnormal pattern detecting apparatus as defined in claim 5 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

7. An abnormal pattern detecting apparatus as defined in claim 6 wherein said stimulating rays are a laser beam.

8. An abnormal pattern detecting apparatus as defined in claim 1 wherein said radiation image of the object has been recorded on photographic film.

9. An abnormal pattern detecting apparatus wherein an abnormal pattern in a radiation image of an object is detected from an image signal made up of a series of image signal components representing the radiation image, the abnormal pattern detecting apparatus comprising:
i) first prospective abnormal pattern finding means for finding prospective abnormal patterns from said image signal,
ii) characteristic measure calculating means for calculating a plurality of characteristic measures for each of said prospective abnormal patterns, which have been found by said first prospective abnormal pattern finding means, the calculations being made from the image signal components of said image signal, which represent image information at positions in the vicinity of each of said prospective abnormal patterns,
iii) second prospective abnormal pattern finding means which utilizes the plurality of said characteristic measures, which have been calculated by said characteristic measure calculating means, in order to find a prospective abnormal pattern having a high probability of being a true abnormal pattern, from said prospective abnormal patterns, iv) display means which utilizes said image signal and information representing said prospective abnormal pattern, which has a high probability of being a true abnormal pattern, in order to display a visible image in which said prospective abnormal pattern is shown clearly, and v) input means with which information about whether said prospective abnormal pattern shown in said visible image is or is not a true abnormal patter is entered,
wherein said second prospective abnormal pattern finding means is provided with a learning function means for changing the operations for finding a prospective abnormal pattern having a high probability of being a true abnormal pattern from said prospective abnormal patterns found by said first prospective abnormal pattern finding means in accordance with said information entered with said input means.

10. An abnormal pattern detecting apparatus as defined in claim 9 wherein said second prospective abnormal pattern finding means is provided with a neural network means for performing a learning function by a back propagation method, in which said information entered with said input means is utilized as an instructor signal.

11. An abnormal pattern detecting apparatus as defined in claim 9 wherein said first prospective abnormal pattern finding means finds said prospective abnormal patterns by processing said image signal with a spatial-domain filter.

12. An abnormal pattern detecting apparatus as defined in claim 9 wherein the plurality of said characteristic measures include at least one of the area, the shape, and the contrast of each of said prospective abnormal patterns.

13. An abnormal pattern detecting apparatus as defined in claim 9 wherein said radiation image of the object has been stored on a stimulable phosphor sheet.

14. An abnormal pattern detecting apparatus as defined in claim 13 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

15. An abnormal pattern detecting apparatus as defined in claim 14 wherein said stimulating rays are a laser beam.

16. An abnormal pattern detecting apparatus as defined in claim 9 wherein said radiation image of the object has been recorded on photographic film.

17. An abnormal pattern detecting apparatus wherein an abnormal pattern in a radiation image of an object is detected from an image signal made up of a series of image signal components representing the radiation image, the abnormal pattern detecting apparatus comprising:
i) operation means for finding anatomical regions in the radiation image from said image signal,
ii) storage means for storing filtering characteristic information concerning a plurality of abnormal pattern detecting filters, which correspond to the anatomical regions, and
iii) detecting means for detecting an abnormal pattern by reading the characterizing information regarding said abnormal pattern detecting filters, which correspond to the anatomical regions found by said operation means, from said storage means, and processing the image signal components, which represent image information at the anatomical regions in the radiation image, with the corresponding abnormal pattern detecting filters.

18. An abnormal pattern detecting apparatus as defined in claim 17 wherein said radiation image of the object has been stored on a stimulable phosphor sheet.

19. An abnormal pattern detecting apparatus as defined in claim 18 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

20. An abnormal pattern detecting apparatus as defined in claim 19 wherein said stimulating rays are a laser beam.

21. An abnormal pattern detecting apparatus as defined in claim 17 wherein said radiation image of the object has been recorded on photographic film.

22. An abnormal pattern detecting apparatus wherein, from an image signal made up of a series of image signal components representing a radiation image of an object which is constituted of soft tissues and bones, an abnormal pattern appearing as an approximately circular pattern in the radiation image is detected, the abnormal pattern detecting apparatus comprising:
  i) image operation means for obtaining a soft tissue image signal, which is made up of a series of soft tissue image signal components primarily representing an image of the soft tissues in said object, from a plurality of image signals representing a plurality of radiation images of said object, which radiation images have been formed with at least two kinds of radiation having different energy distributions, and
  ii) abnormal pattern finding means for finding an abnormal pattern, which appears in a soft tissue image, by processing said soft tissue image signal with an abnormal pattern finding filter,
  wherein said abnormal pattern finding filter comprises:
    a) first means for calculating the differences, $\Delta ij = fij - f0$, between the value of a soft tissue image signal component f0 representing a predetermined picture element P0 in said soft tissue image and the values of soft tissue image signal components fij representing the picture elements Pij, which are located on each of a plurality of lines Li, where i=1, 2, . . . , n, extending from said predetermined picture element P0 to peripheral parts of said soft tissue image, said picture elements Pij being spaced a plurality of predetermined distances rij, where j=1, 2, . . . , m, from said predetermined picture element P0,
    b) second means for finding a representative value, which is representative of said differences $\Delta ij$, for each of said lines Li,
    c) third means for calculating a mean-level value of two said representative values for each set of two said lines which extend from said predetermined picture element P0 in approximately opposite directions, and
    d) fourth means for judging, from mean-level values, which have been calculated for a plurality of said sets of lines, whether said predetermined picture element P0 falls or does not fall within a region corresponding to said abnormal pattern.

23. An abnormal pattern detecting apparatus as defined in claim 22 further comprising a judgment means for calculating a plurality of differences between the values of the soft tissue image signal components representing adjacent picture elements in the abnormal pattern, which has been found by said abnormal pattern finding means, said picture elements being located along each of two different directions in said soft tissue image, means for calculating a mean-level value of the absolute values of the plurality of said differences for each of two said different directions, or a mean-level value of the square values of the plurality of said differences for each of two said different directions, and means for making, from mean-level values, which have been calculated for two said different directions, a judgment as to the level of the probability that said abnormal pattern, which has been found by said abnormal pattern finding means, will be a true abnormal pattern.

24. An abnormal pattern detecting apparatus as defined in claim 22 wherein said representative value is the maximum value of said differences $\Delta ij$, which have been found for each of said lines Li.

25. An abnormal pattern detecting apparatus as defined in claim 22 wherein said representative value is the minimum value of said differences $\Delta ij$, which have been found for each of said lines Li.

26. An abnormal pattern detecting apparatus as defined in claim 22 wherein said radiation image of the object has been stored on a stimulable phosphor sheet.

27. An abnormal pattern detecting apparatus as defined in claim 26 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

28. An abnormal pattern detecting apparatus as defined in claim 27 wherein said stimulating rays are a laser beam.

29. An abnormal pattern detecting apparatus as defined in claim 22 wherein said radiation image of the object has been recorded on photographic film.

30. An abnormal pattern detecting apparatus wherein, from an image signal made up of a series of image signal components representing a radiation image of an object which is constituted of soft tissues and bones, an abnormal pattern appearing as an approximately circular pattern in the radiation image is detected, the abnormal pattern detecting apparatus comprising:
  i) image operation means for obtaining a soft tissue image signal, which is made up of a series of soft tissue image signal components primarily representing an image of the soft tissues in said object, from a plurality of image signals representing a plurality of radiation images of said object, which radiation images have been formed with at least two kinds of radiation having different energy distributions, and
  ii) abnormal pattern finding means for finding an abnormal pattern, which appears in a soft tissue image, by processing said soft tissue image signal with an abnormal pattern finding filter,
  wherein said abnormal pattern finding filter comprises:
    a) first means for calculating the gradients $\nabla fi$ of soft tissue image signal components fi representing the picture elements Pi, which are located on a plurality of lines Li, wherein i=1, 2, . . . , n, extending from a predetermined picture element P0 in said soft tissue image to peripheral parts of said soft tissue image, said picture elements Pi being spaced a predetermined distance ri from said predetermined picture element P0, b) second means for calculating the normalized gradients $\nabla fi/|\nabla fi|$ by dividing said gradients $\nabla fi$ by their magnitudes $|\nabla fi|$, c) third means for calculating the projections of said normalized gradients $\nabla fi/|\nabla fi|$ on vectors directed from said picture elements Pi to said predetermined picture element P0, the projections being expressed as $\nabla fi/|\nabla fi|*ei$, where ei denotes the unit vectors directed from said picture elements Pi to said predetermined picture element P0, and * denotes the inner product, d) fourth means for calculating a mean-level value from the values of said projections $\nabla fi/|\nabla fi|*ei$, and e) fifth means for judging, from said mean-level value, whether said predetermined picture element P0 falls or does not fall within the region corresponding to said abnormal pattern.

31. An abnormal pattern detecting apparatus as defined in claim 30 further comprising a judgment means for calculating a plurality of differences between the values of the soft tissue image signal components representing adjacent picture elements in the abnormal pattern, which has been found by said abnormal pattern finding means, said picture elements being located along each of two different directions in said soft tissue image, means for calculating a mean-level value of the absolute values of the plurality of said differences for each of two said different directions, or a mean-level value of the square values of the plurality of said differences for each of two said different directions, and means for making, from mean-level values, which have been calculated for two said different directions, a judgment as to the level of the probability that said abnormal pattern, which has been found by said abnormal pattern finding means, will be a true abnormal pattern.

32. An abnormal pattern detecting apparatus as defined in claim 30 wherein said radiation image of the object has been stored on a stimulable phosphor sheet.

33. An abnormal pattern detecting apparatus as claimed in claim 32 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

34. An abnormal pattern detecting apparatus as defined in claim 33 wherein said stimulating rays are a laser beam.

35. An abnormal pattern detecting apparatus as defined in claim 30 wherein said radiation image of the object has been recorded on photographic film.

36. An abnormal pattern detecting apparatus wherein, from an image signal made up of a series of image signal components representing a radiation image of an object which is constituted of soft tissues and bones, an abnormal pattern appearing as an approximately circular pattern in the radiation image is detected, the abnormal pattern detecting apparatus comprising:

i) image operation means for obtaining a soft tissue image signal, which is made up of a series of soft tissue image signal components primarily representing an image of the soft tissues in said object, from a plurality of image signals representing a plurality of radiation images of said object, which radiation images have been formed with at least two kinds of radiation having different energy distributions, and ii) abnormal pattern finding means for finding an abnormal pattern, which appears in a soft tissue image, by processing said soft tissue image signal with an abnormal pattern finding filter, wherein said abnormal pattern finding filter comprises:

a) first means for calculating the gradients $\nabla fij$ of soft tissue image signal components fij representing the picture elements Pij, which are located on each of a plurality of lines Li, where $i=1, 2, \ldots, n$, extending from a predetermined picture element P0 in said soft tissue image to peripheral parts of said soft tissue image, and which are spaced a plurality of predetermined distances rij, where $j=1, 2, \ldots, m$, from said predetermined picture element P0, b) second means for calculating the normalized gradients $\nabla fij/|\nabla fij|$ by dividing said gradients $\nabla fij$ by their magnitudes $|\nabla fij|$, c) third means for calculating the projections of said normalized gradients $\nabla fij/|\nabla fij|$ on vectors which are directed from said picture elements Pij to said predetermined picture element P0, the projections being expressed as $\nabla fij/|\nabla fij|*ei$, where ei denotes the unit vectors directed from said picture elements Pij to said predetermined picture element P0, and * denotes the inner product, d) fourth means for finding a representative value $\{\nabla fij/|\nabla fij|*ei\}r$, which is representative of said projections $\nabla fij/|\nabla fij|*ei$, for each of said lines Li, e) fifth means for calculating a mean-level value of said representative values $\{\nabla fij/|\nabla fij|*ei\}r$, which have been found for the plurality of said lines Li, and f) sixth means for judging from said mean-level value, whether said predetermined picture element P0 falls or does not fall within the region corresponding to said abnormal pattern.

37. An abnormal pattern detecting apparatus as defined in claim 36 further comprising a judgment means for calculating a plurality of differences between the values of the soft tissue image signal components representing adjacent picture elements in the abnormal pattern, which has been found by said abnormal pattern finding means, said picture elements being located along each of two different directions in said soft tissue image, means for calculating a mean-level value of the absolute values of the plurality of said differences for each of two said different directions, or a mean-level value of the square values of the plurality of said differences for each of two said different directions, and means for making, from mean-level values, which have been calculated for two said different directions, a judgment as to the level of the probability that said abnormal pattern, which has been found by said abnormal pattern finding means, will be a true abnormal pattern.

38. An abnormal pattern detecting apparatus as defined in claim 36 wherein said representative value is the maximum value of said projections $\nabla fij/|\nabla fij|*ei$, which have been found for each of said lines Li.

39. An abnormal pattern detecting apparatus as defined in claim 36 wherein said representative value is the minimum value of said projections $\nabla fij/|\nabla fij|* e i$, which have been found for each of said lines Li.

40. An abnormal pattern detecting apparatus as defined in claim 36 wherein said radiation image of the object has been stored on a stimulable phosphor sheet.

41. An abnormal pattern detecting apparatus as defined in claim 40 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

42. An abnormal pattern detecting apparatus as defined in claim 41 wherein said stimulating rays are a laser beam.

43. An abnormal pattern detecting apparatus as defined in claim 36 wherein said radiation image of the object has been recorded on photographic film.

44. An abnormal pattern detecting apparatus wherein, from an image signal made up of a series of image signal components representing a radiation image of an object which is constituted of soft tissues and bones, an abnormal pattern appearing as an approximately circular pattern in the radiation image is detected, the abnormal pattern detecting apparatus comprising:
 i) image operation means for obtaining a soft tissue image signal, which is made up of a series of soft tissue image signal components primarily representing an image of the soft tissues in said object, from a plurality of image signals representing a plurality of radiation images of said object, which radiation images have been formed with at least two kinds of radiation having different energy distributions, and
 ii) abnormal pattern finding means for finding an abnormal pattern, which appears in a soft tissue image, by processing said soft tissue image signal with an abnormal pattern finding filter,
wherein said abnormal pattern finding filter comprises:
 a) first means for calculating:
  (1) a mean-level value Q0 from the values of soft tissue image signal components representing a plurality of picture elements, which are located in a center region including a predetermined picture element P0 in said soft tissue image, and
  (2) mean-level values Qi, wherein i=1, 2, ..., n, each representing the mean level of the values of soft tissue image signal components representing a plurality of picture elements, which are located in each of a plurality of peripheral regions surrounding said center region,
 b) second means for calculating the differences $\Delta i$, where i=1, 2, ..., n, between said mean-level value Q0 corresponding to said center region and the respective mean-level values Qi, wherein i=1, 2, ..., n, corresponding to said peripheral regions,
 c) third means for finding a first characteristic value, which is representative of said differences $\Delta i$, and a second characteristic value, which represents the amount of dispersion in said differences $\Delta i$,
 d) fourth means for calculating the ratio of said first characteristic value to said second characteristic value,
 e) fifth means for comparing said ratio with a predetermined threshold value, and
 f) sixth means for judging, from the results of the comparison, whether said predetermined picture element P0 falls or does not fall within the region corresponding to said abnormal pattern.

45. An abnormal pattern detecting apparatus as defined in claim 44 further comprising a judgment means for calculating a plurality of differences between the values of the soft tissue image signal components representing adjacent picture elements in the abnormal pattern, which has been found by said abnormal pattern finding means, said picture elements being located along each of two different directions in said soft tissue image,
 means calculating a mean-level value of the absolute values of the plurality of said differences for each of two said different directions, or a mean-level value of the square values of the plurality of said differences for each of two said different directions, and
 means for making, from mean-level values, which have been calculated for two said different directions, a judgment as to the level of the probability that said abnormal pattern, which has been found by said abnormal pattern finding means, will be a true abnormal pattern.

46. An abnormal pattern detecting apparatus as defined in claim 44 wherein said first characteristic value is the mean-level value of said differences $\Delta i$.

47. An abnormal pattern detecting apparatus as defined in claim 44 wherein said radiation image of the object has been stored on a stimulable phosphor sheet.

48. An abnormal pattern detecting apparatus as defined in claim 47 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

49. An abnormal pattern detecting apparatus as defined in claim 48 wherein said stimulating rays are a laser beam.

50. An abnormal pattern detecting apparatus as defined in claim 44 wherein said radiation image of the object has been recorded on photographic film.

51. An abnormal pattern detecting apparatus wherein, from an image signal made up of a series of image signal components representing a radiation image of an object which is constituted of soft tissues and bones, an abnormal pattern appearing as an approximately circular pattern in the radiation image is detected, the abnormal pattern detecting apparatus comprising:
 i) image operation means for obtaining a soft tissue image signal, which is made up of a series of soft tissue image signal components primarily representing an image of the soft tissues in said object, from a plurality of image signals representing a plurality of radiation images of said object, which radiation images have been formed with at least two kinds of radiation having different energy distributions, and
 ii) abnormal pattern finding means for finding an abnormal pattern, which appears in a soft tissue image, by processing said soft tissue image signal with an abnormal pattern finding filter,
wherein said abnormal pattern finding filter comprises:
 a) first means for calculating:
  (1) a mean-level value Q0 of the values of soft tissue image signal components representing a plurality of picture elements, which are located in a center region including a predetermined picture element P0 in said soft tissue image, and
  (2) mean-level values Qij, each representing the mean level of the values of soft tissue image signal components representing a plurality of picture elements located in each of a plurality of peripheral regions, each said peripheral region including each of picture elements Pij, which are located on each of a plurality of lines Li, where i=1, 2, . . . , n, extending from said predetermined picture element P0 to peripheral parts of said soft tissue image, said picture elements Pij being spaced a plurality of predetermined distances rij, where j=1, 2, . . . , m, from said predetermined picture element P0, b) second means for finding a representative value Qi, which is representative of said mean-level values, for each said lines Li, c) third means for calculating the differences Δi, where i=1, 2, . . . , n, between said mean-level value Q0 corresponding to said center region and the respective representative values Qi, which have been found for the plurality of said lines Li, d) fourth means for finding a first characteristic value, which is representative of said differences Δi, and a second characteristic value, which represents the amount of dispersion in said differences Δi, e) fifth means for calculating the ratio of said first characteristic value to said second characteristic value, f) sixth means for comparing said ratio with a predetermined threshold value, and g) seventh means for judging, from the results of the comparison, whether said predetermined picture element P0 falls or does not fall within the region corresponding to said abnormal pattern.

52. An abnormal pattern detecting apparatus as defined in claim 51 further comprising a judgment means for calculating a plurality of differences between the values of the soft tissue image signal components representing adjacent picture elements in the abnormal pattern, which has been found by said abnormal pattern finding means, said picture elements being located along each of two different directions in said soft tissue image, means for calculating a mean-level value of the absolute values of the plurality of said differences for each of two said different directions, or a mean-level value of the square values of the plurality of said differences for each of two said different directions, and means for making, from mean-level values, which have been calculated for two said different directions, a judgment as to the level of the probability that said abnormal pattern, which has been found by said abnormal pattern finding means, will be a true abnormal pattern.

53. An abnormal pattern detecting apparatus as defined in claim 51 wherein said representative value Qi is the maximum value of said mean-level values Qij corresponding to the peripheral regions located along each of said lines Li.

54. An abnormal pattern detecting apparatus as defined in claim 51 wherein said representative value Qi is the minimum value of said mean-level values Qij corresponding to the peripheral regions located along each of said lines Li.

55. An abnormal pattern detecting apparatus as defined in claim 51 wherein said radiation image of the object has been stored on a stimulable phosphor sheet.

56. An abnormal pattern detecting apparatus as defined in claim 55 further including read-out means for obtaining said image signal from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

57. An abnormal pattern detecting apparatus as defined in claim 56 wherein said stimulating rays are a laser beam.

58. An abnormal pattern detecting apparatus as defined in claim 51 wherein said radiation image of the object has been recorded on photographic film.

59. An image finding apparatus wherein, from an image signal made up of a series of image signal components representing a radiation image of a human body, a tumor image in the radiation image is found, the image finding apparatus comprising:

i) characteristic measure calculating means for calculating characteristic measures for a plurality of picture elements in said radiation image by processing said image signal with a spatial-domain filter, which yields the characteristic measures whose values vary in accordance with whether a predetermined picture element in said radiation image falls or does not fall within the region corresponding to said tumor image, ii) prospective tumor image finding means for finding prospective tumor images from said characteristic measures, and iii) tumor image finding means for finding a tumor image from said prospective tumor images;

wherein said tumor image finding means is provided with:

a) difference calculating means for calculating a plurality of differences between the values of the image signal components representing adjacent picture elements in a region corresponding to each said prospective tumor image, said picture elements being located along each of two different directions in said radiation image, b) mean calculating means for calculating a mean-level value of the absolute values of the plurality of said differences for each of two said different directions, or a mean-level value of the square values of the plurality of said differences for each of two said different directions, and c) judgment means for judging, from mean-level values, which have been calculated for two said different directions, whether said prospective tumor image is or is not a true tumor image.

60. An image display apparatus comprising:

i) a first image display section which is provided with:

a) means for entering an image control signal, b) first image processing means for processing an original image signal in accordance with said image control signal, c) first display means for displaying an image represented by an image signal, which has been processed by said first image processing means, and d) transmission means for transmitting both said original image signal and said image control signal independently of each other, and ii) a second image display section which is provided with:

e) reception means for independently receiving both said original image signal and said image control signal, which are transmitted by said transmission means, f) second image processing means for processing said original image signal in accordance with the received image control signal, and g) second display means for displaying an image represented by an image signal, which has been processed by said second image processing means.

61. An image display apparatus as defined in claim 60 wherein said image control signal represents the information about the positions of an abnormal pattern in an image represented by said original image signal.

62. An image display apparatus as defined in claim 60 wherein said original image signal is obtained by reading out a radiation image which has been stored on a stimulable phosphor sheet.

63. An image display apparatus as defined in claim 62 wherein said original image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

64. An image display apparatus as defined in claim 63 wherein said stimulating rays are a laser beam.

65. An image display apparatus as defined in claim 60 wherein said original image signal is obtained by reading out a radiation image which has been recorded on photographic film.

* * * * *